US012455517B2

(12) United States Patent
Sato et al.

(10) Patent No.: US 12,455,517 B2
(45) Date of Patent: Oct. 28, 2025

(54) CONTAINER HAVING A SHUTTER AND A CAP MOUNTED TO THE SHUTTER TO COVER AN END PORTION OF THE CONTAINER

(71) Applicant: CANON KABUSHIKI KAISHA, Tokyo (JP)

(72) Inventors: Mitsuhiro Sato, Tokyo (JP); Hiroyuki Munetsugu, Kanagawa (JP); Sohta Sugimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/609,077

(22) Filed: Mar. 19, 2024

(65) Prior Publication Data

US 2024/0264552 A1 Aug. 8, 2024

Related U.S. Application Data

(63) Continuation of application No. PCT/JP2022/036880, filed on Sep. 27, 2022.

(30) Foreign Application Priority Data

Sep. 28, 2021 (JP) ................................ 2021-158542

(51) Int. Cl.
*G03G 15/08* (2006.01)
*B41J 2/00* (2006.01)
(Continued)

(52) U.S. Cl.
CPC ........ *G03G 15/0886* (2013.01); *B41J 2/1754* (2013.01); *B65B 7/2835* (2013.01);
(Continued)

(58) Field of Classification Search
CPC ........... G03G 15/0865; G03G 15/0874; G03G 15/0886; G03G 2215/0682;
(Continued)

(56) References Cited

U.S. PATENT DOCUMENTS 3,382,887 A * 5/1968 Erickson ................. F16K 31/02 137/263
5,848,516 A * 12/1998 Ban .................... G03G 15/0875 53/423
(Continued)

FOREIGN PATENT DOCUMENTS

JP 11119536 A * 4/1999 ......... G03G 15/0874
JP 2003-107875 A 4/2003
(Continued)

OTHER PUBLICATIONS

International Search Report and Written Opinion for International Patent Application No. PCT/JP2022/036880.
(Continued)

*Primary Examiner* — Robert B Beatty
(74) *Attorney, Agent, or Firm* — Venable LLP

(57) ABSTRACT

[Problem] To provide a form of a container for use with an image forming apparatus
[Solution] A container for use with an image forming apparatus and for accommodating a content of powder or a liquid, the container includes an accommodating portion configured to accommodate the content; an end portion including a discharging portion which includes a discharge opening for permitting discharge of the content to an outside of the container and a passage configured so that the content passes through the passage toward the discharge opening, and including a shutter configured to be movable relative to the discharging portion between a shielding position where the shutter shields the discharge opening and an open position where the shutter opens the discharge opening; and a cap mounted to the end portion so as to cover at least a part of the end portion and configured to be dismounted from the end portion by being rotated relative to the end portion.

32 Claims, 40 Drawing Sheets

(51) Int. Cl.

| | |
|---|---|
| ***B41J 2/175*** | (2006.01) |
| ***B65B 7/00*** | (2006.01) |
| ***B65B 7/28*** | (2006.01) |
| ***B65D 41/04*** | (2006.01) |
| ***B65D 47/00*** | (2006.01) |
| ***B65D 47/12*** | (2006.01) |
| ***B65D 47/14*** | (2006.01) |

(52) U.S. Cl.

CPC ........... *B65D 41/04* (2013.01); *B65D 47/122* (2013.01); *B65D 47/142* (2013.01); *G03G 15/0865* (2013.01); *G03G 15/0874* (2013.01); *B41J 2002/17516* (2013.01); *G03G 2215/0682* (2013.01); *G03G 2215/0692* (2013.01)

(58) Field of Classification Search

CPC .......... G03G 2215/0692; B41J 2/17503; B41J 2/1754; B41J 2002/17516; B65B 7/2828; B65B 7/2835; B65D 1/0246; B65D 41/04; B65D 47/122; B65D 47/142

USPC ........... 399/262; 222/DIG. 1, 551, 552, 562; 347/86

See application file for complete search history.

(56) References Cited

U.S. PATENT DOCUMENTS

| | | | | |
|---|---|---|---|---|
| 6,934,495 | B2 | 8/2005 | Yoshino et al. | |
| 7,043,173 | B2 * | 5/2006 | Grune ................ | G03G 15/0882 222/DIG. 1 |
| 7,158,736 | B2 | 1/2007 | Sato et al. | |
| 7,349,657 | B2 | 3/2008 | Sato et al. | |
| 7,412,193 | B2 | 8/2008 | Sato et al. | |
| 8,160,478 | B2 | 4/2012 | Munetsugu et al. | |
| 8,165,493 | B2 | 4/2012 | Chadani et al. | |
| 9,213,306 | B2 | 12/2015 | Morioka et al. | |
| 9,377,714 | B2 | 6/2016 | Nakazawa et al. | |
| 10,386,786 | B2 | 8/2019 | Sato et al. | |
| 10,459,402 | B2 | 10/2019 | Kashiide et al. | |
| 10,534,313 | B2 | 1/2020 | Sugimoto et al. | |
| 10,635,047 | B2 | 4/2020 | Kamoshida et al. | |
| 10,705,481 | B2 | 7/2020 | Sugimoto et al. | |
| 10,782,647 | B2 | 9/2020 | Kashiide et al. | |
| 10,824,110 | B2 | 11/2020 | Sugimoto et al. | |
| 11,067,950 | B2 | 7/2021 | Kashiide et al. | |
| 11,131,960 | B2 | 9/2021 | Sato et al. | |
| 11,175,624 | B2 | 11/2021 | Sugimoto et al. | |
| 11,307,529 | B2 | 4/2022 | Sato et al. | |
| 11,314,199 | B2 | 4/2022 | Sato et al. | |
| 11,353,822 | B2 | 6/2022 | Kashiide et al. | |
| 11,392,082 | B2 | 7/2022 | Nishida et al. | |
| 11,567,445 | B2 | 1/2023 | Munetsugu et al. | |
| 11,573,524 | B2 | 2/2023 | Sugimoto et al. | |
| 11,592,766 | B2 | 2/2023 | Ozaki et al. | |
| 11,662,673 | B2 | 5/2023 | Ozaki et al. | |
| 11,662,687 | B2 | 5/2023 | Kashiide et al. | |
| 11,693,355 | B2 | 7/2023 | Sato et al. | |
| 11,698,601 | B2 | 7/2023 | Sato et al. | |
| 11,796,958 | B2 | 10/2023 | Munetsugu et al. | |
| 11,822,265 | B2 | 11/2023 | Ozaki et al. | |
| 11,960,239 | B2 | 4/2024 | Kashiide et al. | |
| 11,977,344 | B2 | 5/2024 | Toba et al. | |
| 2003/0103782 | A1 * | 6/2003 | Dilanni .............. | G03G 15/0868 399/262 |
| 2004/0126144 | A1 * | 7/2004 | Yoshino ............. | G03G 15/0872 399/262 |
| 2007/0140746 | A1 | 6/2007 | Kaiho | |
| 2012/0213555 | A1 | 8/2012 | Komatsu et al. | |
| 2020/0070523 | A1 | 3/2020 | Fukasawa et al. | |
| 2020/0133163 | A1 * | 4/2020 | Suenaga ............ | G03G 15/0886 |
| 2020/0307224 | A1 * | 10/2020 | Ohara ................. | B29C 65/0672 |
| 2021/0103242 | A1 | 4/2021 | Umeda et al. | |
| 2022/0016892 | A1 * | 1/2022 | Nagai .................. | B41J 2/17513 |
| 2022/0050417 | A1 | 2/2022 | Nishida et al. | |
| 2022/0339943 | A1 * | 10/2022 | Hattori ................. | B41J 2/17513 |
| 2023/0096202 | A1 | 3/2023 | Sato et al. | |
| 2023/0096298 | A1 * | 3/2023 | Sato ................... | G03G 21/1676 399/260 |
| 2023/0152729 | A1 * | 5/2023 | Toba .................. | G03G 15/0886 399/262 |
| 2023/0176503 | A1 | 6/2023 | Fukui et al. | |
| 2023/0205113 | A1 * | 6/2023 | Munetsugu ........ | G03G 15/0886 399/260 |
| 2023/0205128 | A1 | 6/2023 | Sugimoto et al. | |
| 2023/0205129 | A1 | 6/2023 | Suetsugu et al. | |
| 2023/0244157 | A1 | 8/2023 | Kubo et al. | |
| 2023/0266695 | A1 | 8/2023 | Munetsugu et al. | |
| 2023/0297024 | A1 | 9/2023 | Sato et al. | |
| 2023/0324829 | A1 | 10/2023 | Munetsugu et al. | |
| 2023/0408970 | A1 | 12/2023 | Munetsugu et al. | |
| 2024/0036496 | A1 | 2/2024 | Ozaki et al. | |
| 2024/0045367 | A1 | 2/2024 | Uoo et al. | |
| 2024/0142913 | A1 | 5/2024 | Sato et al. | |
| 2024/0168425 | A1 | 5/2024 | Munetsugu | |

FOREIGN PATENT DOCUMENTS

| | | | | | |
|---|---|---|---|---|---|
| JP | 2004-196322 | A | | 7/2004 | |
| JP | 2014-112120 | A | | 6/2014 | |
| JP | 2021-026199 | A | | 2/2021 | |
| KR | 2009112372 | A | * | 10/2009 | |
| KR | 2017122966 | A | * | 11/2017 | ............. A45D 34/00 |

OTHER PUBLICATIONS

U.S. Appl. No. 18/603,393, filed Mar. 13, 2024.
U.S. Appl. No. 18/648,713, filed Apr. 29, 2024.
U.S. Appl. No. 18/648,727, filed Apr. 29, 2024.
U.S. Appl. No. 18/675,292, filed May 28, 2024.
U.S. Appl. No. 18/749,774, filed Jun. 21, 2024.
U.S. Appl. No. 18/628,926, filed Apr. 8, 2024.
Aug. 14, 2025 Extended Search Report in European Patent Application No. 22 876 589.7.

* cited by examiner (a)

(b)

(a)

(b)

(a)

(b)

(a)

(b)

(c)

(d)

(a)

(b)

(a)

(b)

CONTAINER HAVING A SHUTTER AND A CAP MOUNTED TO THE SHUTTER TO COVER AN END PORTION OF THE CONTAINER

TECHNICAL FIELD

The present invention relates to a container for use with an image forming apparatus.

BACKGROUND ART

In general, an image forming apparatus of an electrophotographic type forms an image by transferring a toner image, formed on a surface of a photosensitive drum, onto a transfer material as a transfer medium. Further, as a toner supplying type, for example, a process cartridge type or a toner supplying (replenishing) type has been known. The process cartridge type is a type in which the photosensitive drum and a developing (developer) container are integrally assembled as a process cartridge and in which the process cartridge is exchanged with a new one when toner runs out.

On the other hand, the toner supplying type is a type in which when the toner runs out, toner is newly supplied (replenished) to a developing container. For example, in Japanese Laid-Open Patent Application No. 2021-26199, an image forming apparatus in which the toner is supplied to the developing container by using a toner pouch mountable to a mounting portion provided on the developing container is disclosed.

Problem to be Solved by the Invention

In recent years, the image forming apparatus has been required by a user to employ various using manners such as the above-described process cartridge type, the above-described toner supplying type, and the like.

The present invention aims to provide a form of a container.

Means for Solving the Problem

The present invention is a container for use with an image forming apparatus and for accommodating a content of powder or a liquid, the container comprising: an accommodating portion configured to accommodate the content; an end portion including a discharging portion which includes a discharge opening for permitting discharge of the content to an outside of the container and a passage configured so that the content passes through the passage toward the discharge opening, and including a shutter configured to be movable relative to the discharging portion between a shielding position where the shutter shields the discharge opening and an open position where the shutter opens the discharge opening; and a cap mounted to the end portion so as to cover at least a part of the end portion and configured to be dismounted from the end portion by being rotated relative to the end portion.

Further, the present invention is a container for use with an image forming apparatus and for accommodating a content of powder or a liquid, the container comprising: an accommodating portion configured to accommodate the content; an end portion including a discharging portion which includes a discharge opening for permitting discharge of the content to an outside of the container and a passage configured so that the content passes through the passage toward the discharge opening, and including a shutter configured to be movable relative to the discharging portion between a shielding position where the shutter shields the discharge opening and an open position where the shutter opens the discharge opening; and a cap mounted to the shutter so as to cover at least a part of the end portion.

Further, the present invention is a toner container comprising: a toner accommodating portion configured to accommodate toner; a nozzle communicating with the toner accommodating portion and aligned with the toner accommodating portion in a first direction, the nozzle being provided with an opening forming a part of a discharging passage for permitting discharge of the toner to an outside of the toner container; a shutter configured to move between an open position where the shutter opens the opening and a closed position where the shutter closes the opening; and a cap mounted to the shutter so as to cover at least a part of the shutter and configured to engage with the shutter and to disengage with the shutter, wherein the opening of the nozzle is provided at a side surface extending along the first direction of the nozzle, and wherein in a second direction perpendicular to the first direction, the shutter is provided outside the side surface of the nozzle.

Further, the present invention is a toner container comprising: a toner accommodating portion configured to accommodate toner; a nozzle communicating with the toner accommodating portion and aligned with the toner accommodating portion in a first direction, the nozzle being provided with an opening forming a part of a discharging passage for permitting discharge of the toner to an outside of the toner container; a shutter configured to move between an open position where the shutter opens the opening and a closed position where the shutter closes the opening; and a cap detachably mounted to the shutter so as to cover at least a part of the shutter, wherein the cap is configured so that by rotation of the cap relative to the shutter about a rotational axis extending in the first direction, the cap engages with the shutter and disengages with the shutter.

Effect of the Invention

According to the present invention, it is possible to provide a form of a container.

BRIEF DESCRIPTION OF THE DRAWINGS

Part (a) of FIG. 1 is a schematic view showing an image forming apparatus according to a first embodiment, and part (b) of FIG. 1 is a perspective view showing the image forming apparatus.

Figure 3:
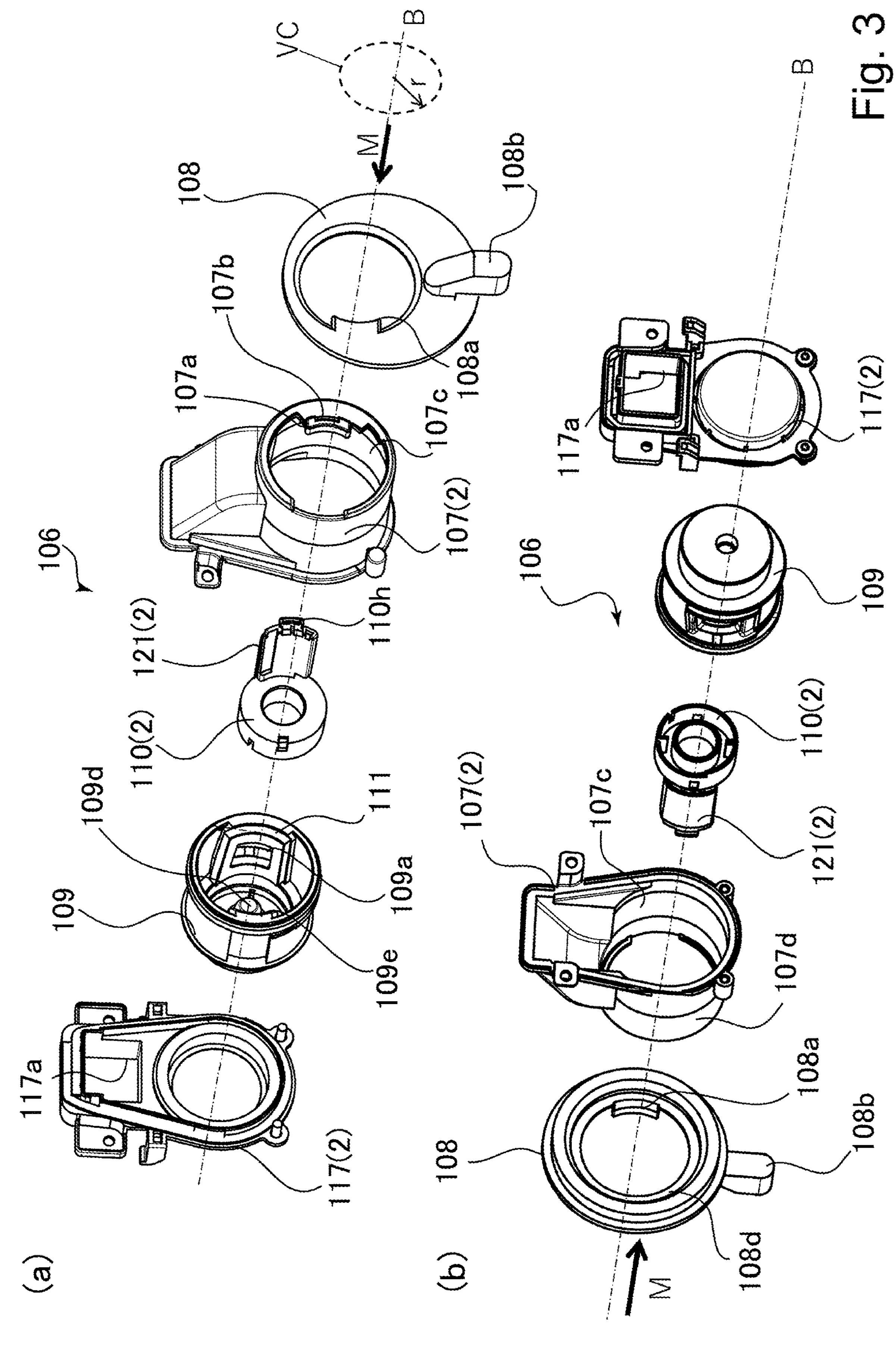

Part (a) of FIG. 3 is an exploded perspective view of a mounting portion, and part (b) of FIG. 3 is an exploded perspective view of the mounting portion as viewed in a direction different from the direction in part (a) of FIG. 3.

Figure 4:
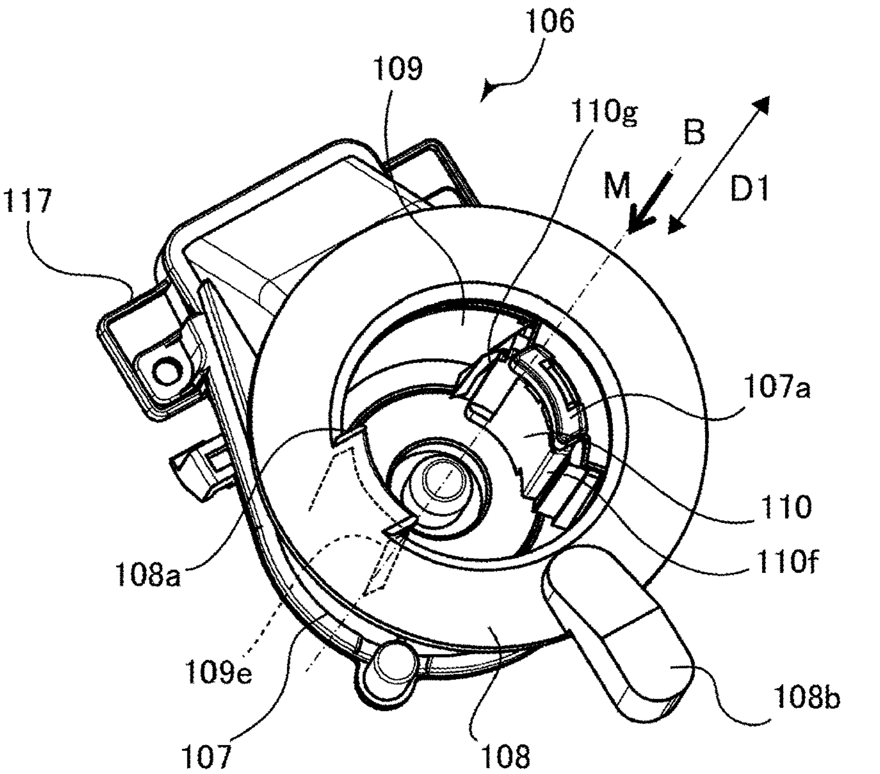
Figure 4:
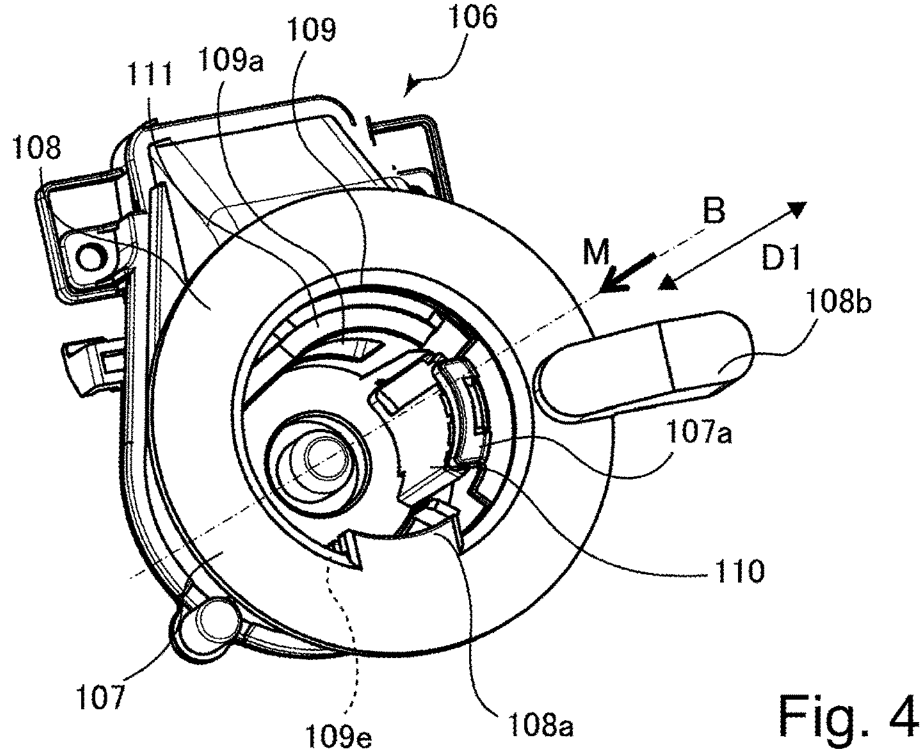

Part (a) of FIG. 4 is a perspective view showing an outer appearance of the mounting portion when an operating lever is in a closed position, and part (b) of FIG. 4 is a perspective view showing an outer appearance of the mounting portion when the operating lever is in an open position.

Figure 5:
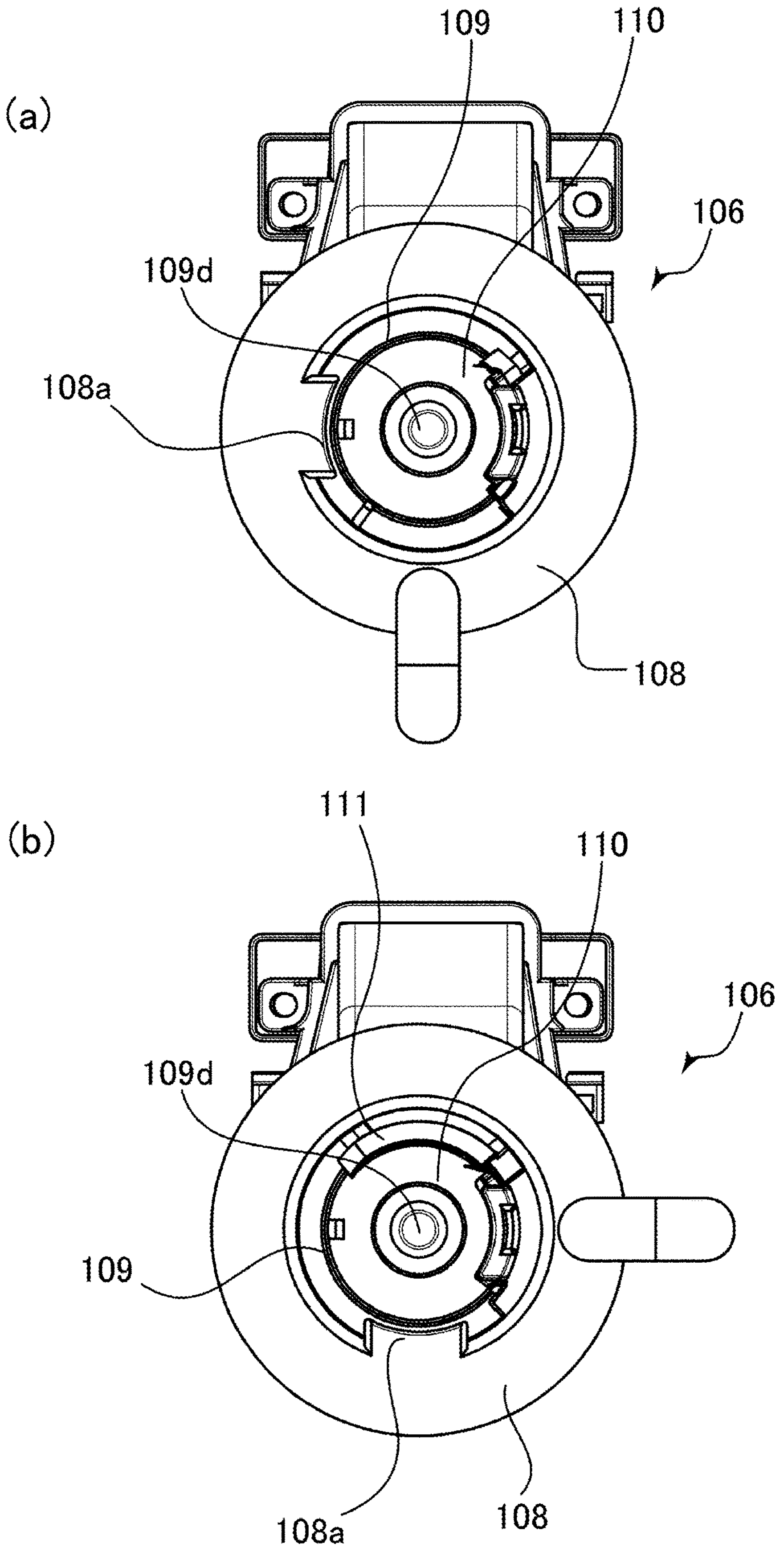

Part (a) of FIG. 5 is a plan view showing the outer appearance of the mounting portion when the operating lever is in the closed position, and part (b) of FIG. 5 is a plan view showing the outer appearance of the mounting portion when the operating lever is in the open position.

Figure 6:
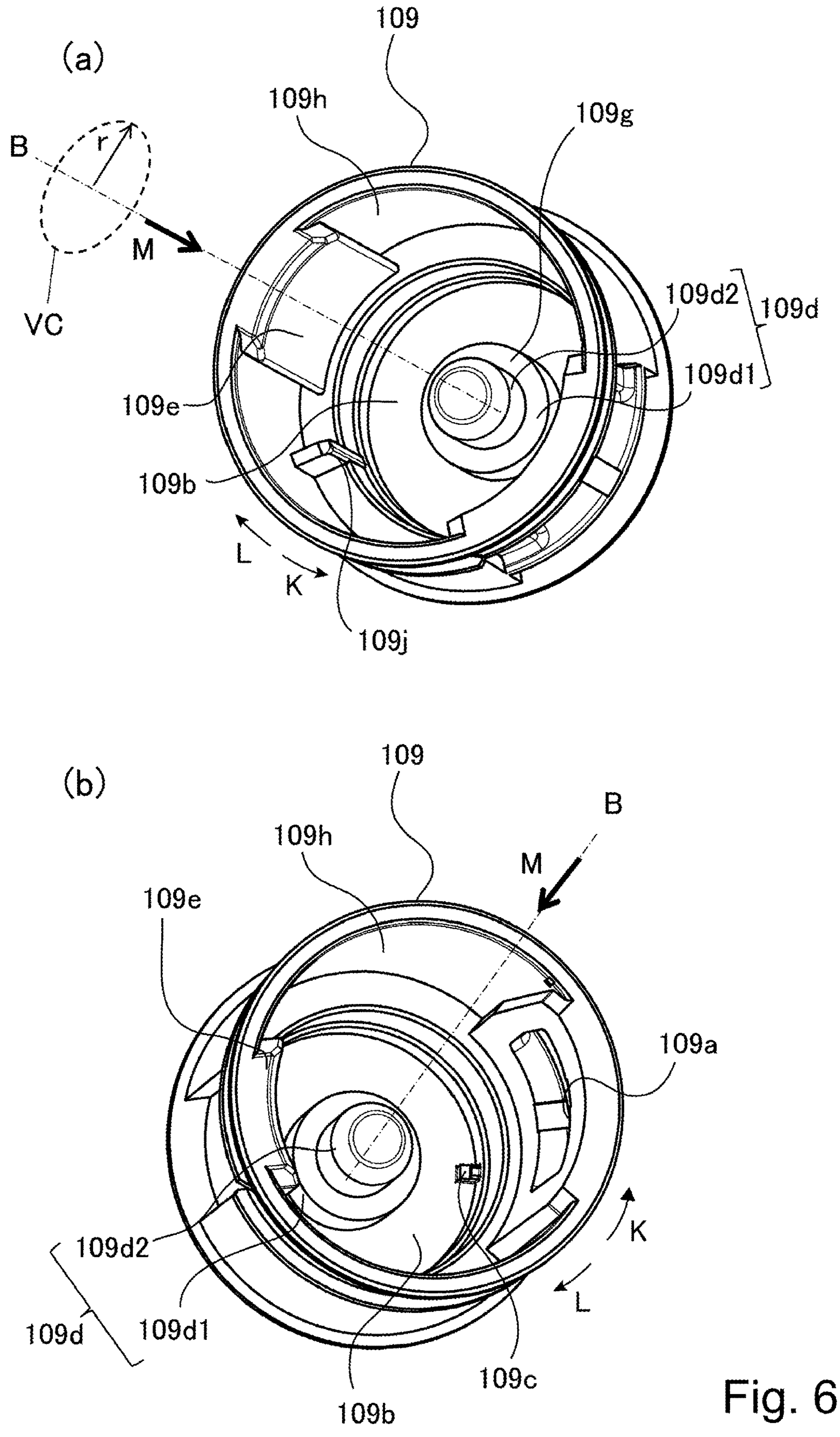

Part (a) of FIG. 6 is a perspective view of an apparatus-side shutter as viewed from an upstream side of a mounting direction, and part (b) of FIG. 6 is a perspective view of the apparatus-side shutter different in point of view from part (a) of FIG. 6.

Figure 7:
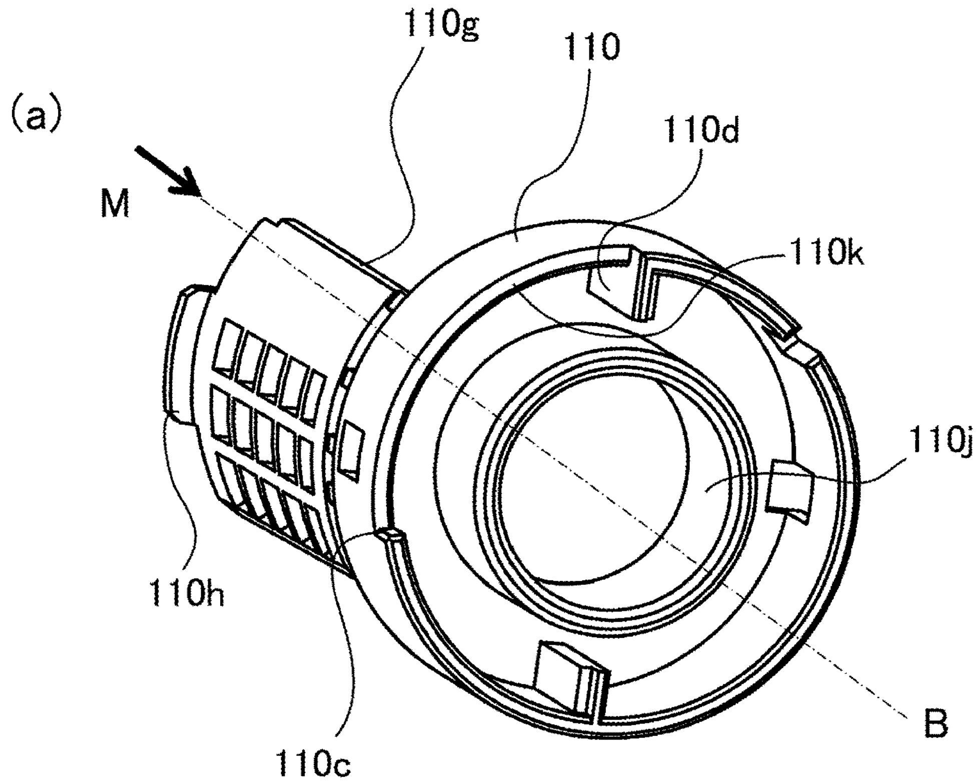
Figure 7:
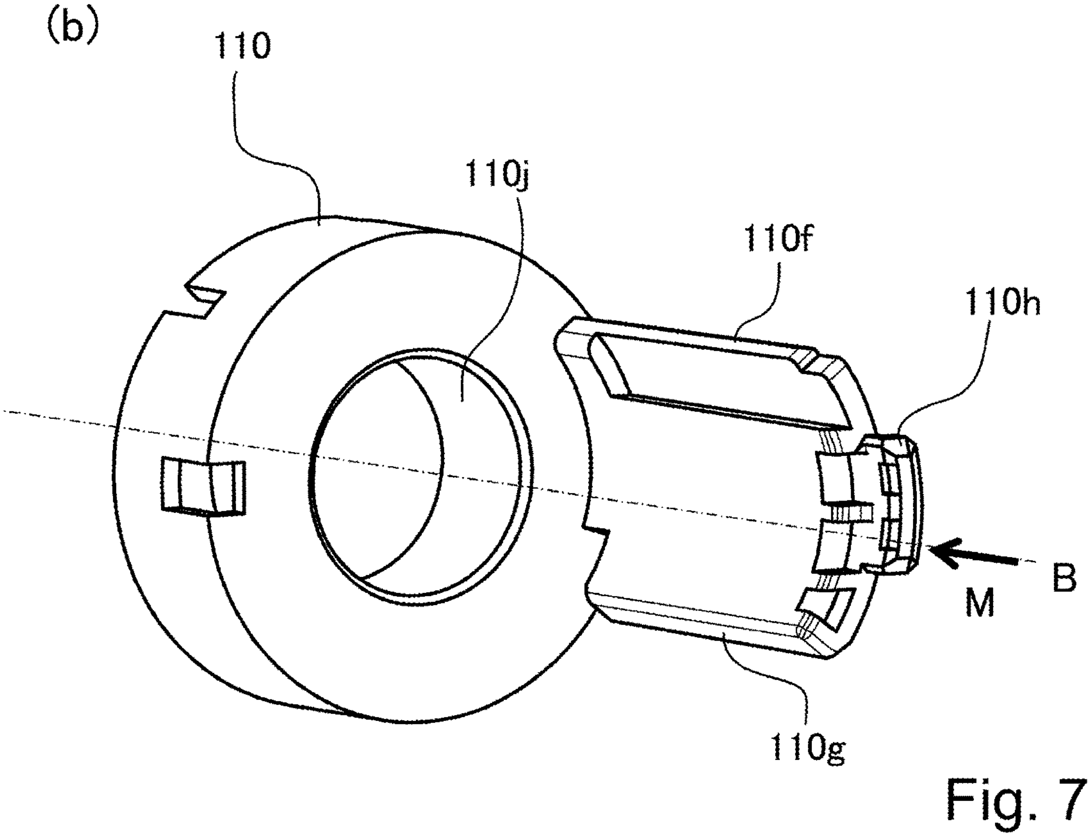

Part (a) of FIG. 7 is a perspective view of a cover as viewed from a downstream side of the mounting direction, and part (b) of FIG. 7 is a perspective view of the cover as viewed from the upstream side of the mounting direction.

Figure 8:
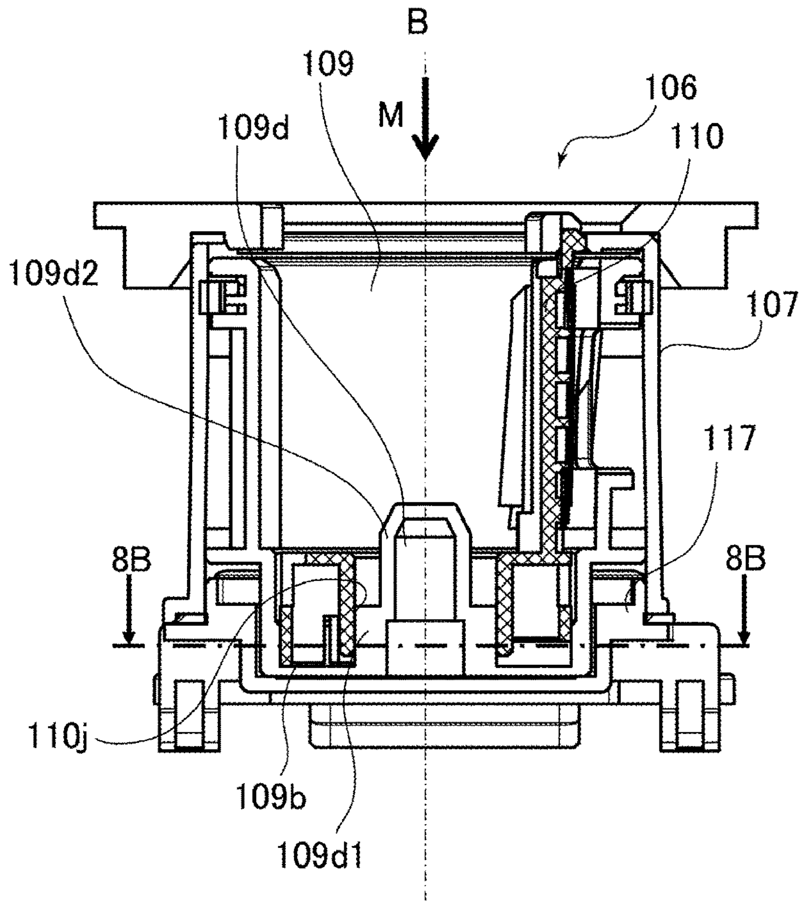
Figure 8:
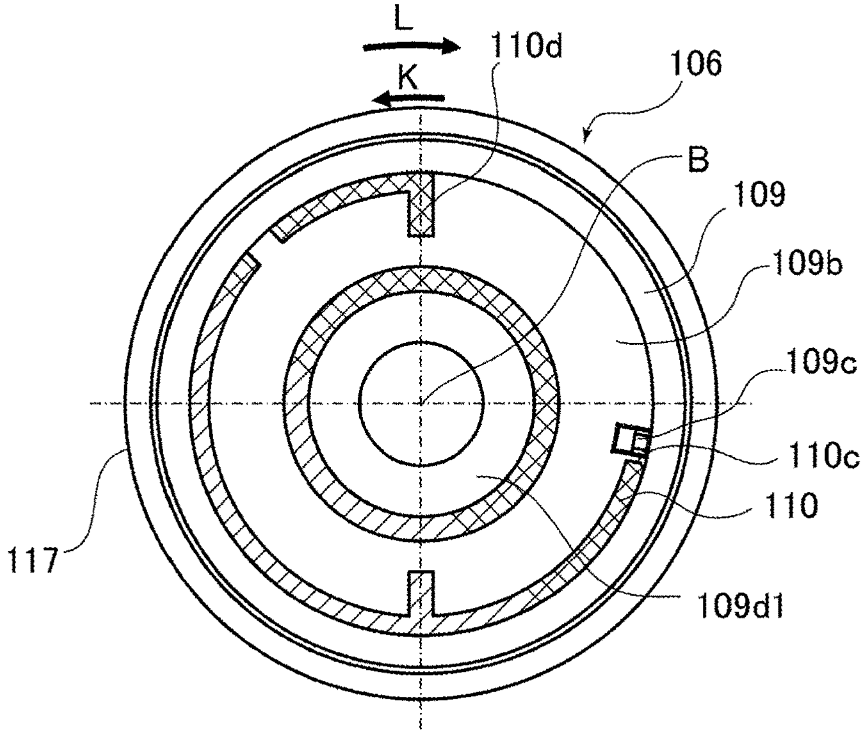

Part (a) of FIG. 8 is a sectional view showing the mounting portion, and part (b) of FIG. 8 is a sectional view showing a 8B-8B cross section.

Figure 9:
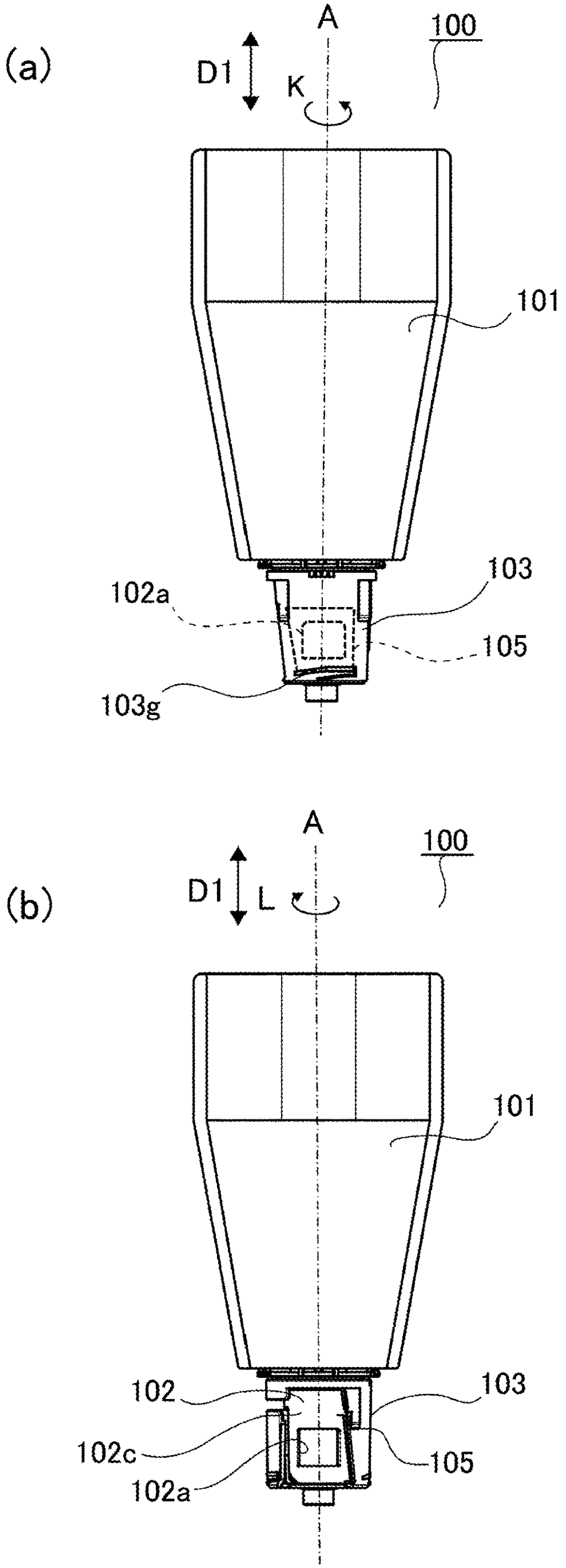

Part (a) of FIG. 9 is a side view of a toner pack when a pack-side shutter is in a shielding position and part (b) of FIG. 9 is a side view of the toner pack when the pack-side shutter is in an open position.

Figure 10:
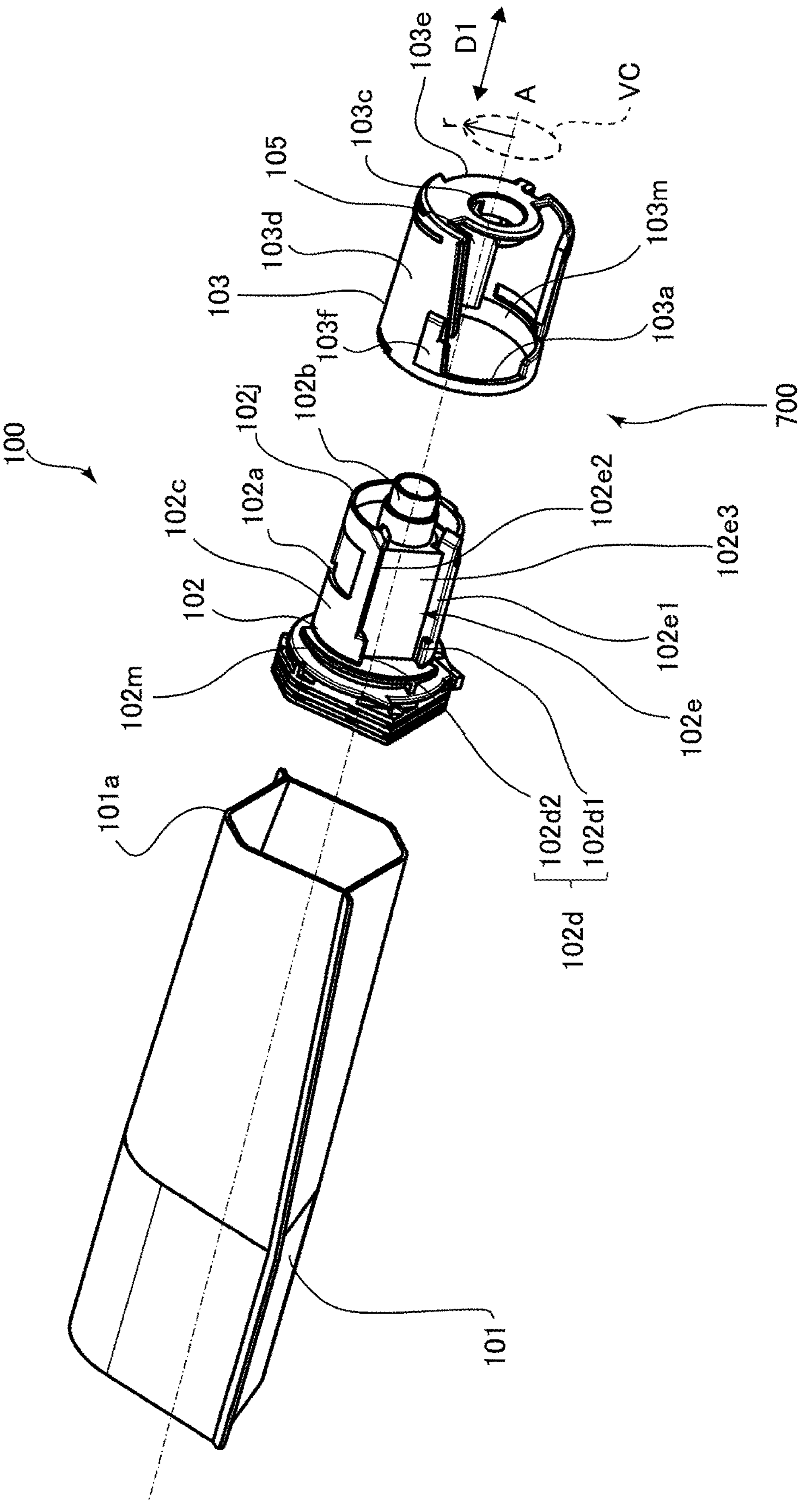

FIG. 10 is a perspective view showing the toner pack when the pack-side shutter is in the shielding position.

Figure 11:
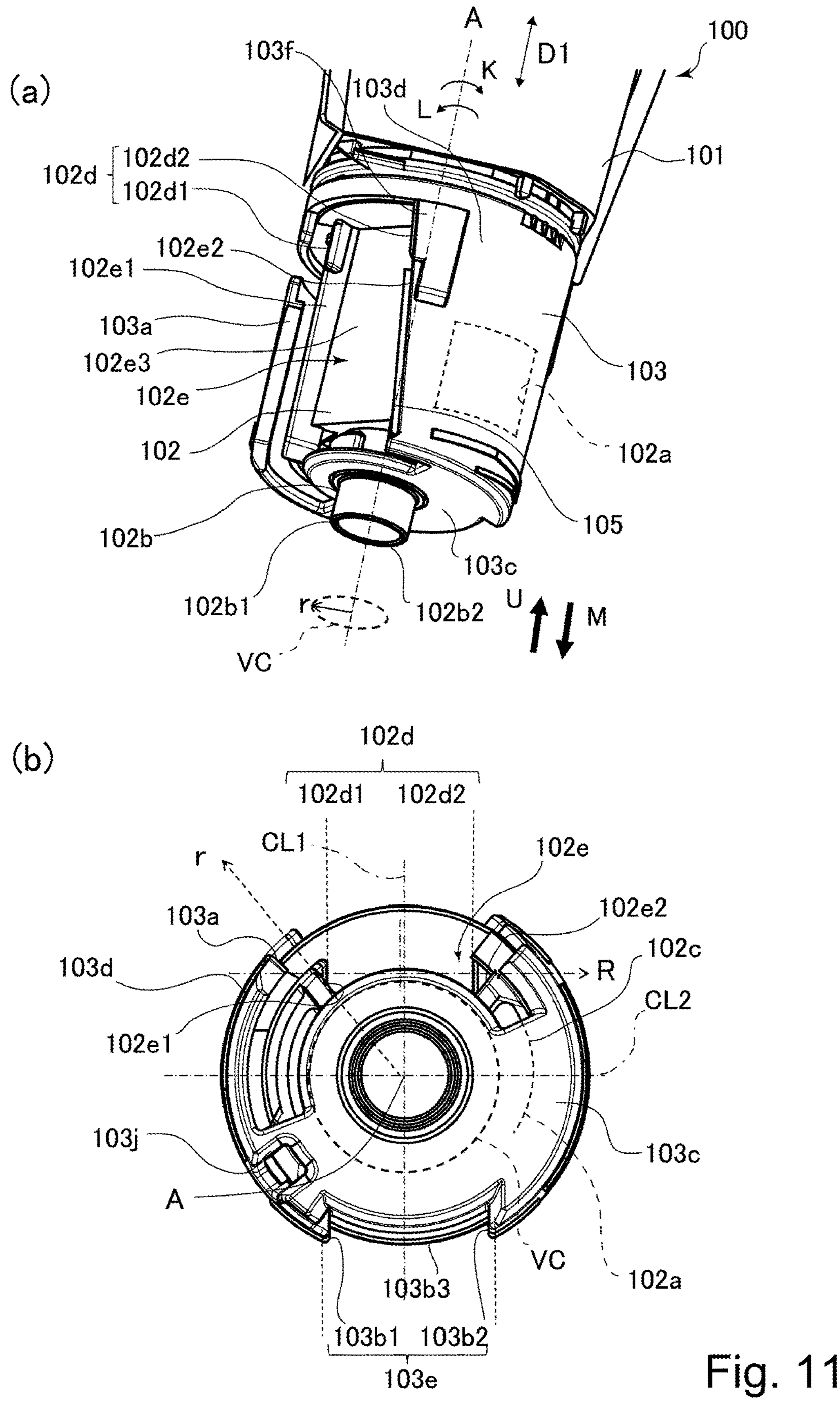

Part (a) of FIG. 11 is an enlarged perspective view showing a neighborhood of a nozzle when the pack-side shutter is in the shielding position, and part (b) of FIG. 11 is a view of the toner pack as viewed in a dismounting direction.

Figure 12:
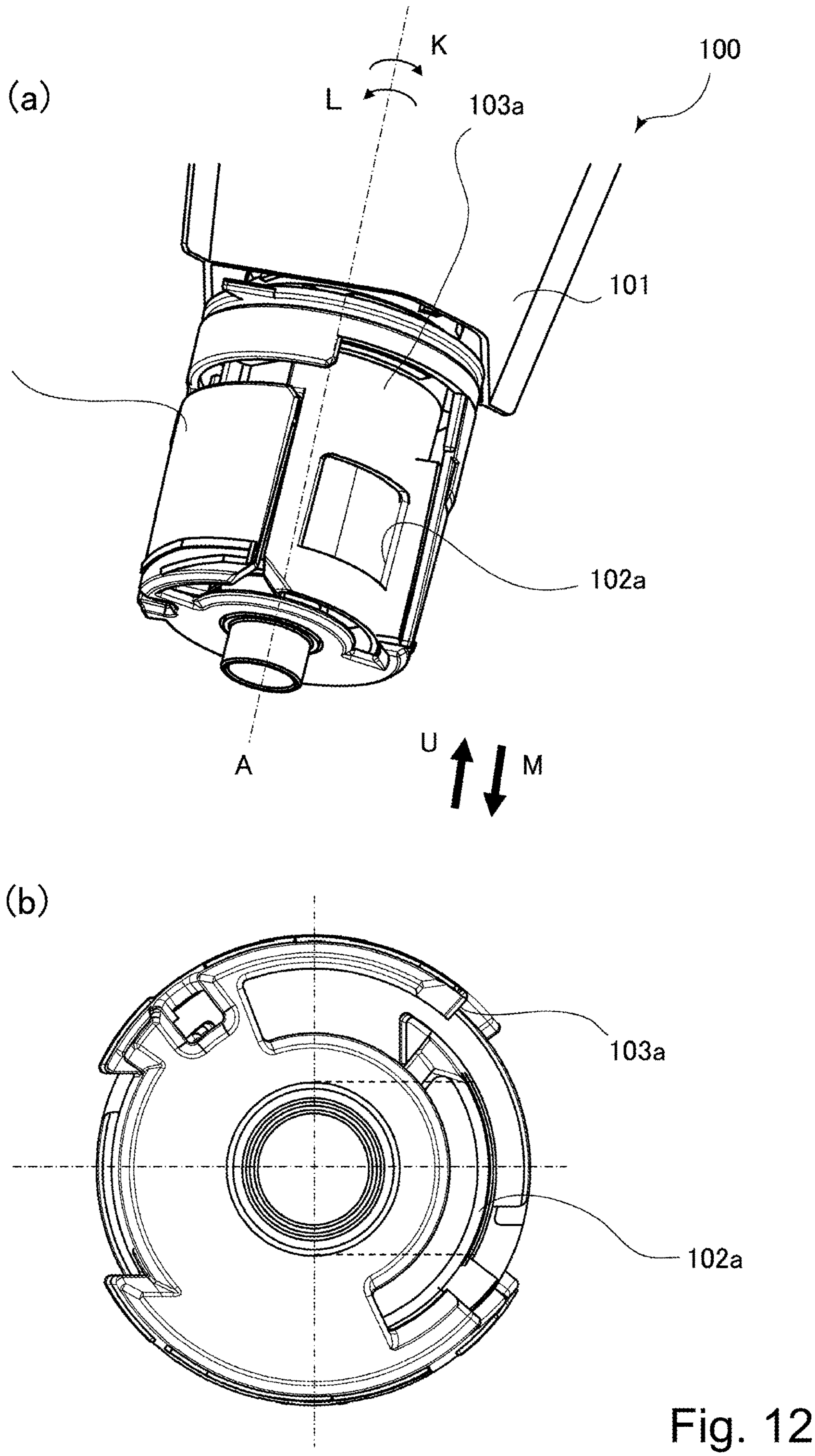

Part (a) of FIG. 12 is an enlarged perspective view showing a neighborhood of a nozzle when the pack-side shutter is in the open position, and part (b) of FIG. 12 is a view of the toner pack as viewed in the dismounting direction U.

Figure 13:
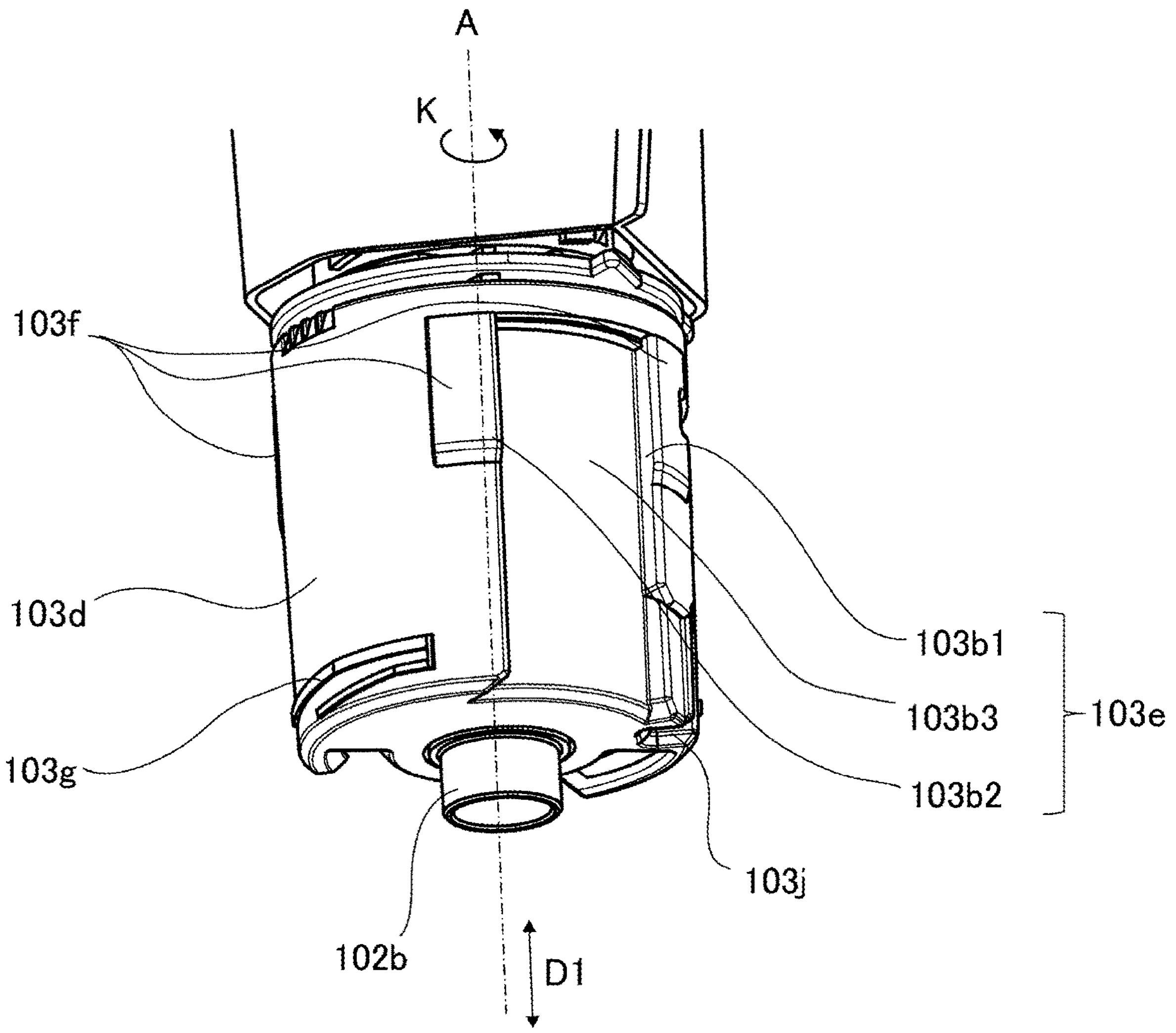

FIG. 13 is an enlarged perspective view showing a neighborhood of the nozzle.

Figure 14:
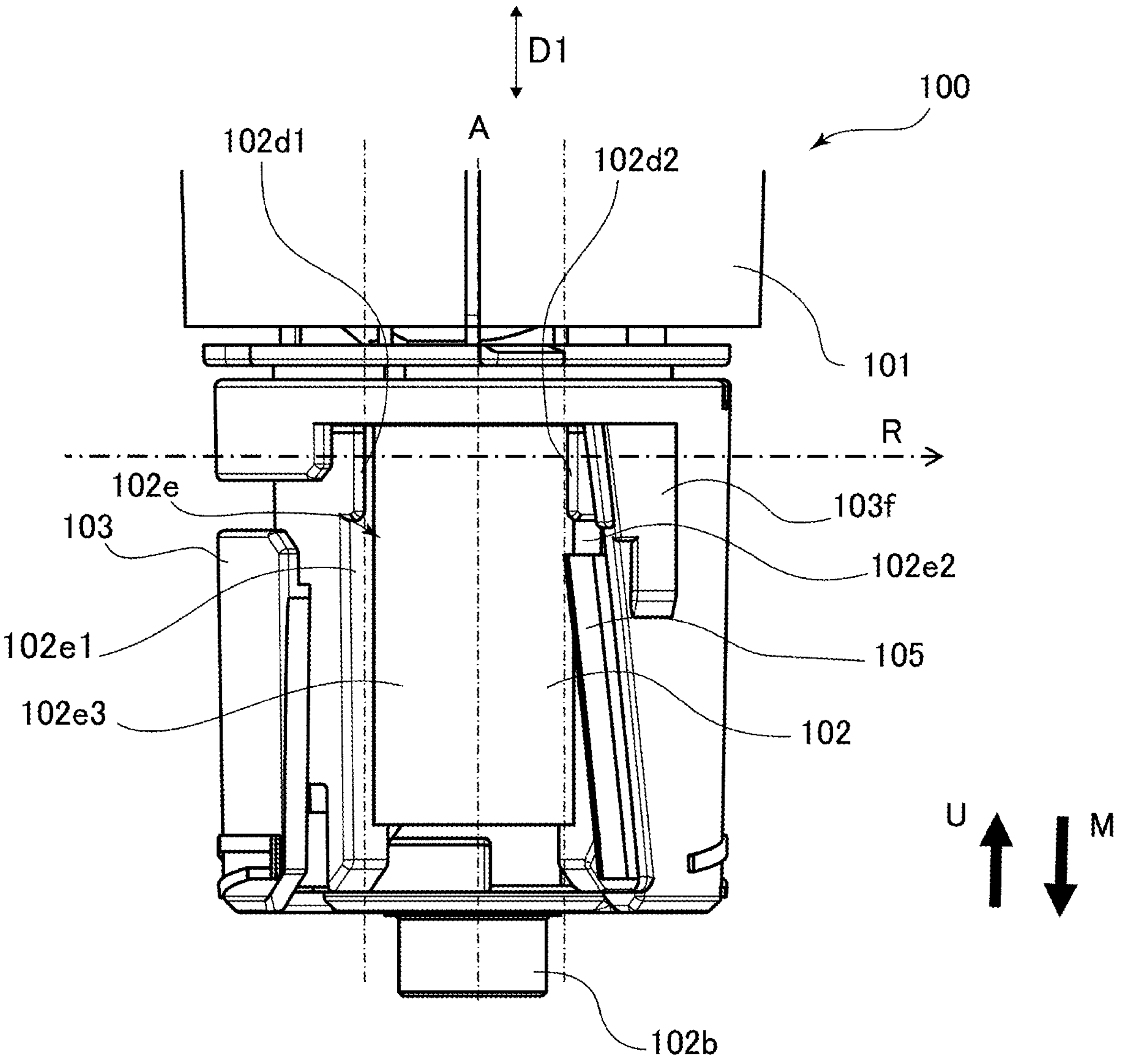

FIG. 14 is a side view showing the nozzle and the pack-side shutter.

Figure 15:
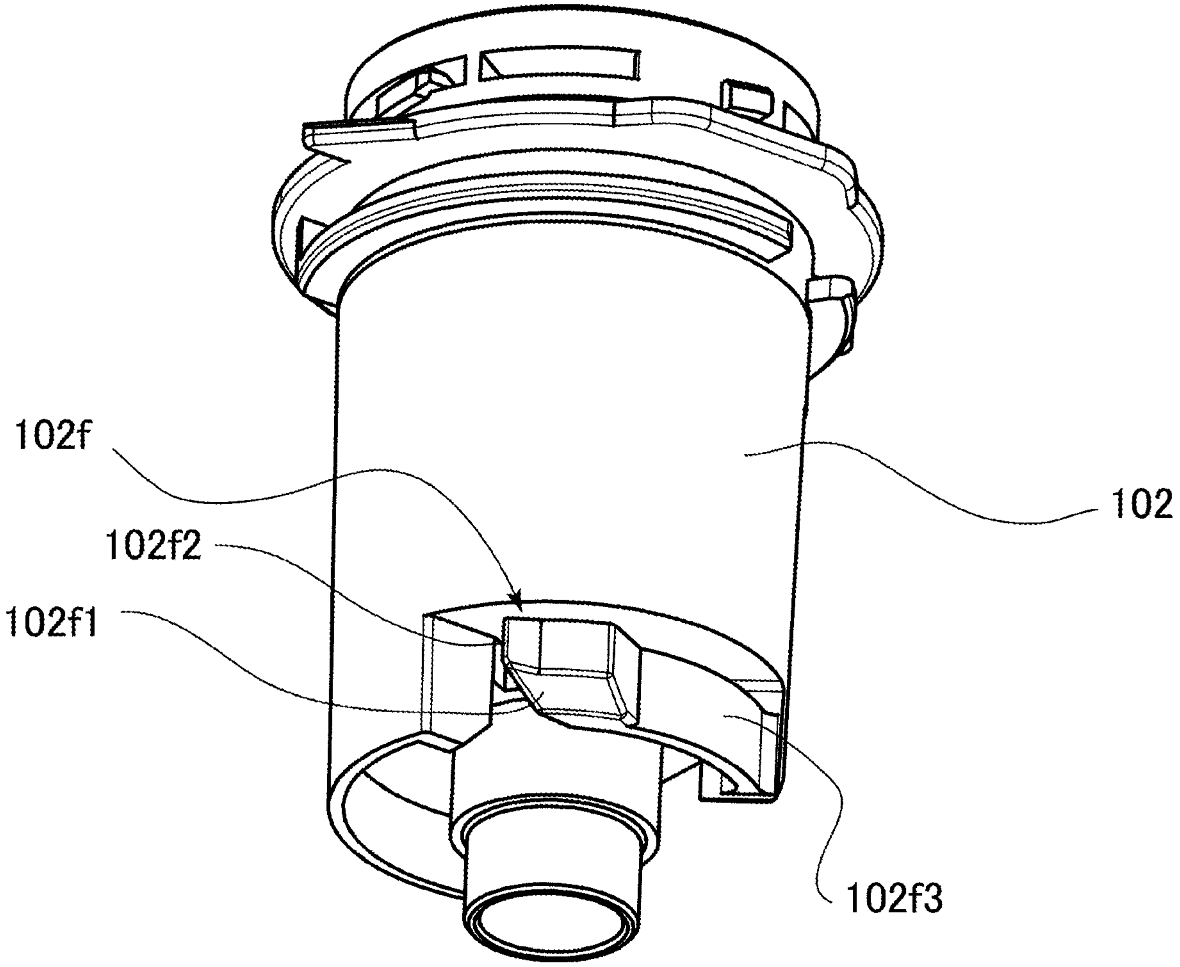

FIG. 15 is a perspective view showing a claw portion provided on the nozzle.

Figure 16:
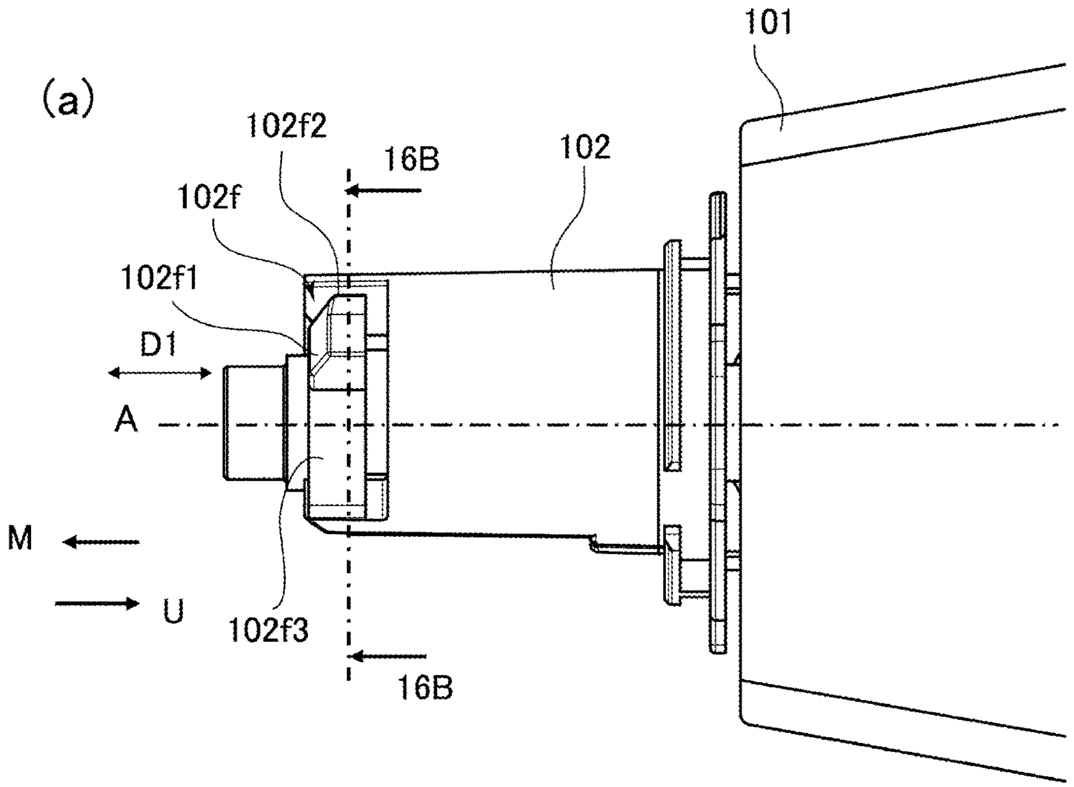
Figure 16:
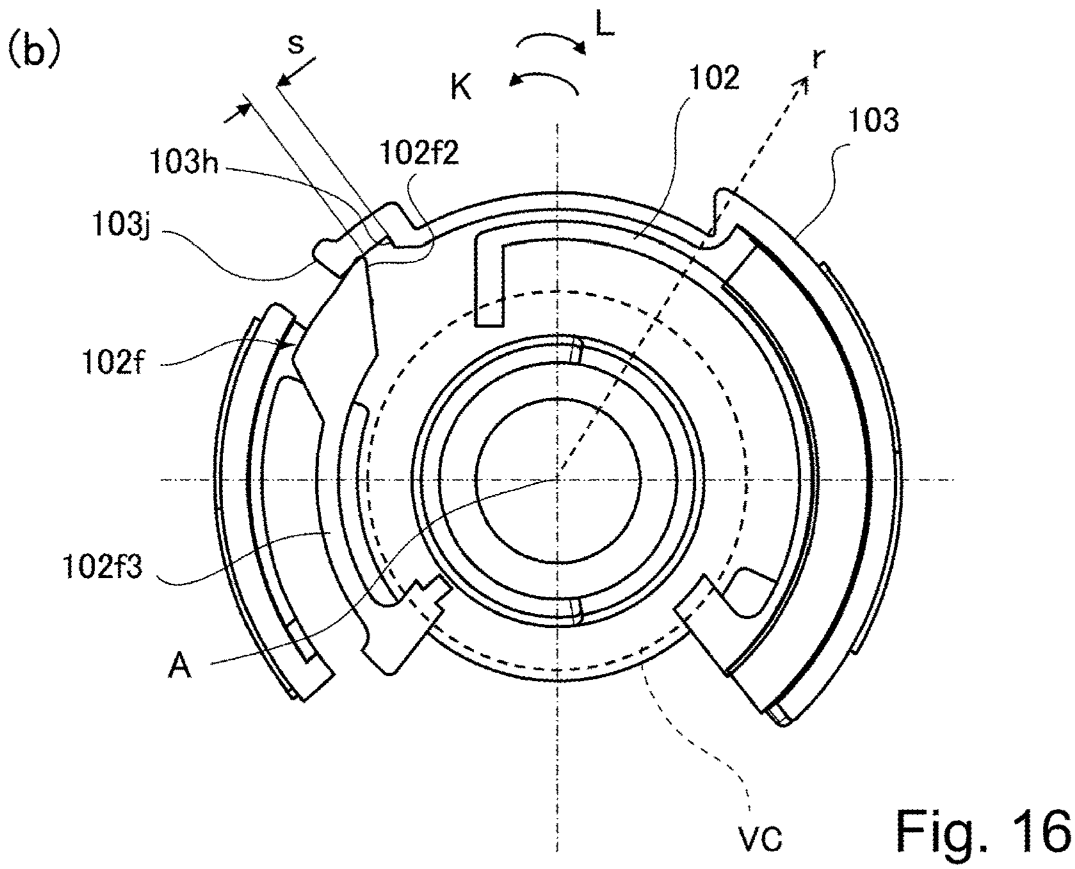

Part (a) of FIG. 16 is a front view showing the claw portion and part (b) of FIG. 16 is a sectional view showing a 16B-16B cross section of part (a) of FIG. 16.

Figure 17:
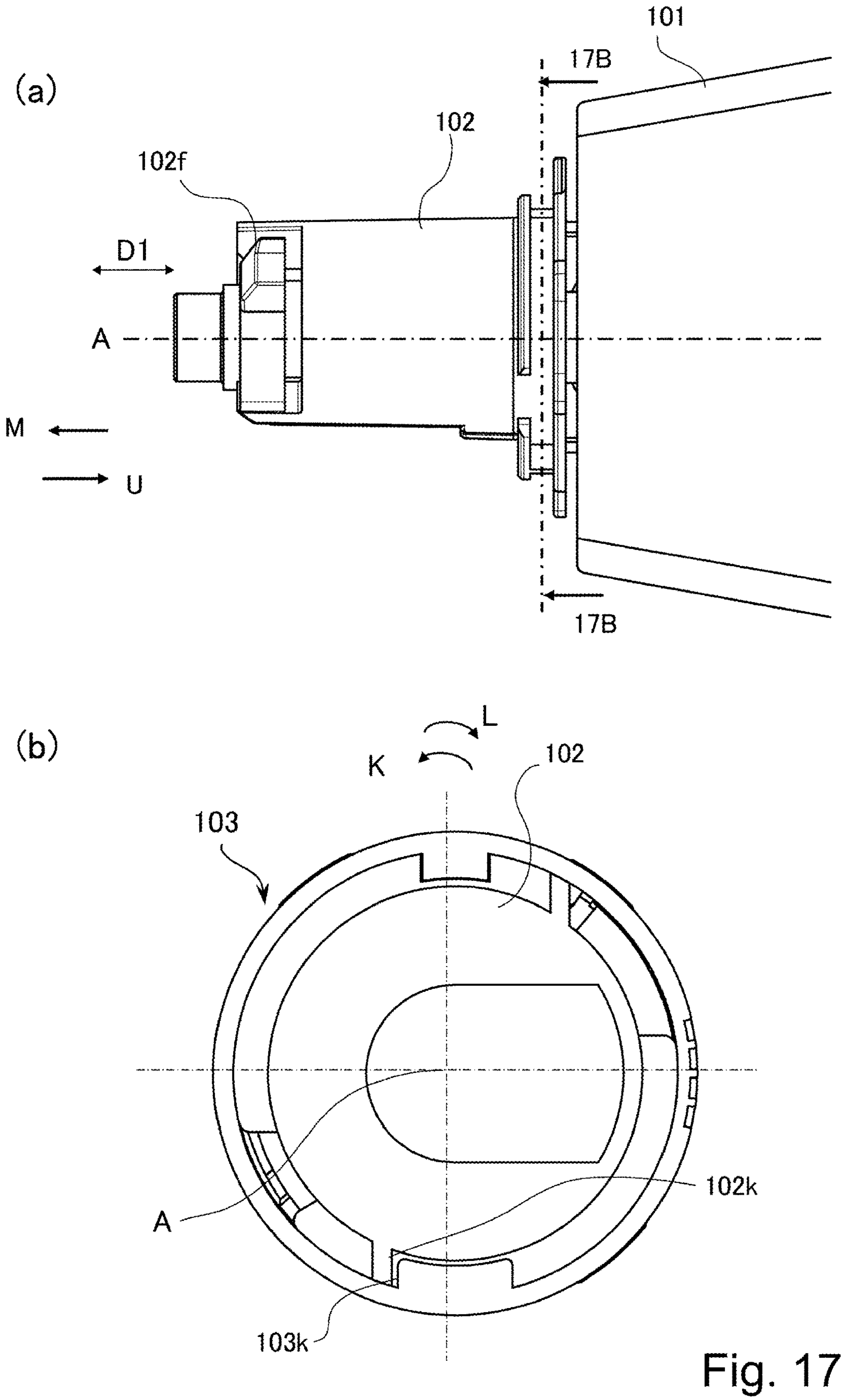

Part (a) of FIG. 17 is a front view showing the claw portion, and part (b) of FIG. 17 is a sectional view showing a 17B-17B cross section of part (a) of FIG. 17.

Figure 18:
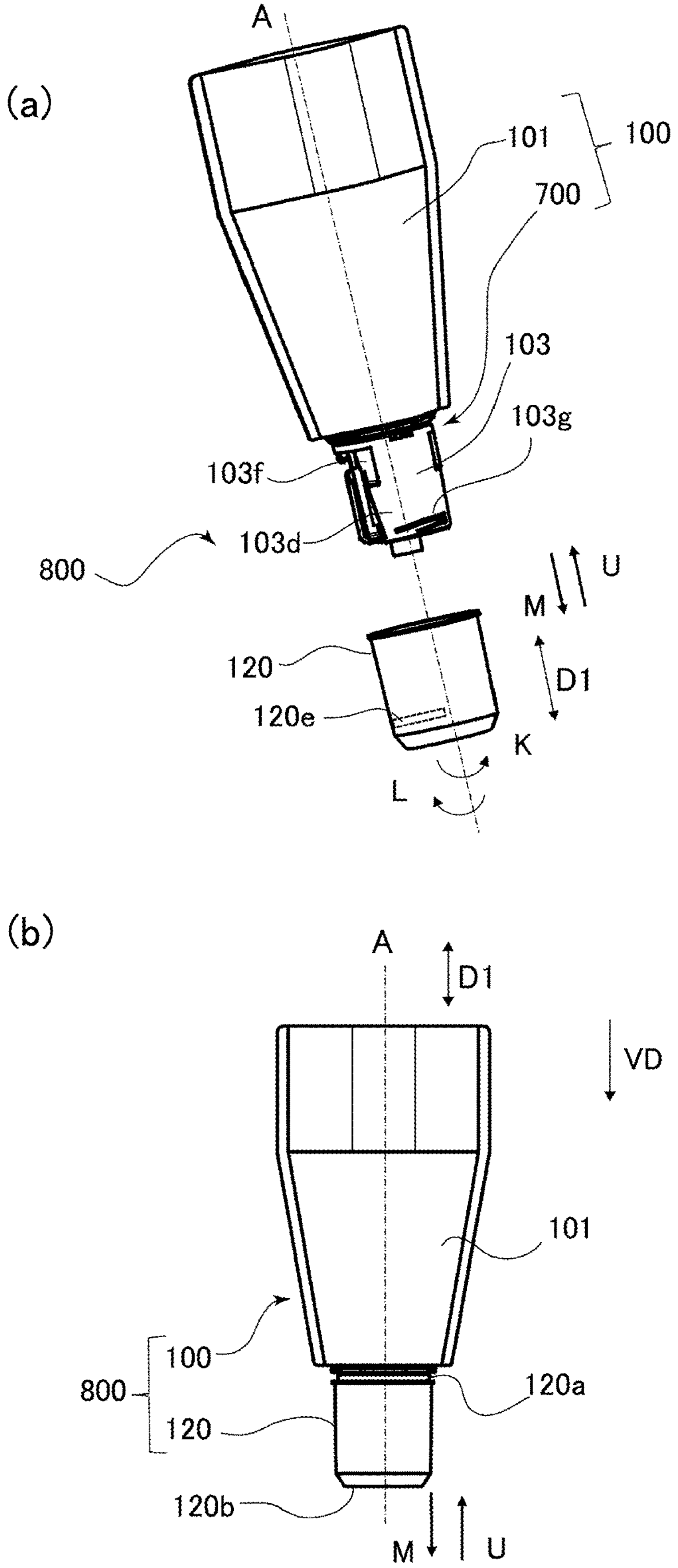

Part (a) of FIG. 18 is a perspective view showing a cap and the toner pack, and part (b) of FIG. 18 is a front view showing a state in which the cap is mounted to the toner pack.

Figure 19:
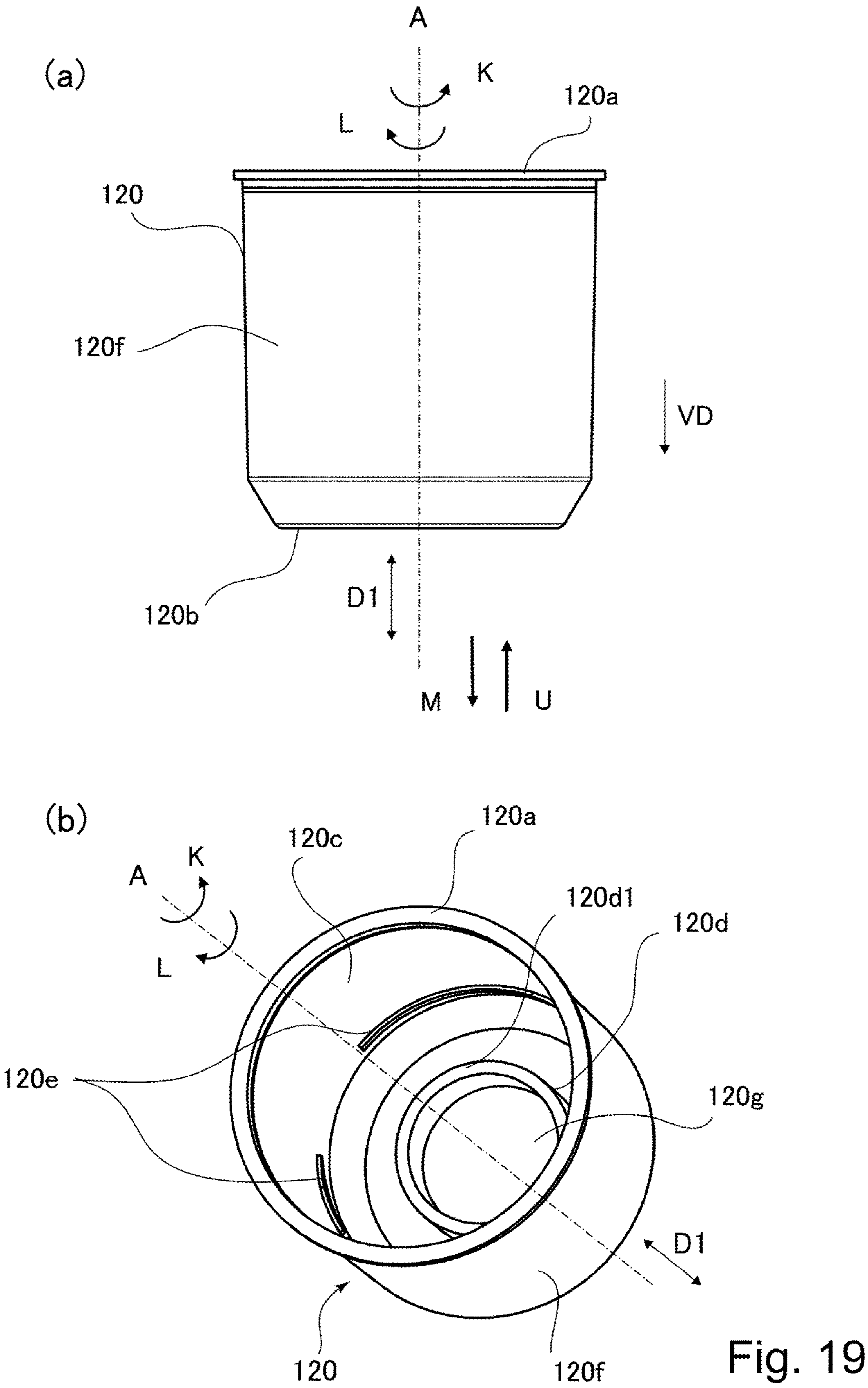

Part (a) of FIG. 19 is a front view showing the cap, and part (b) of FIG. 19 is a perspective view the cap.

Figure 20:
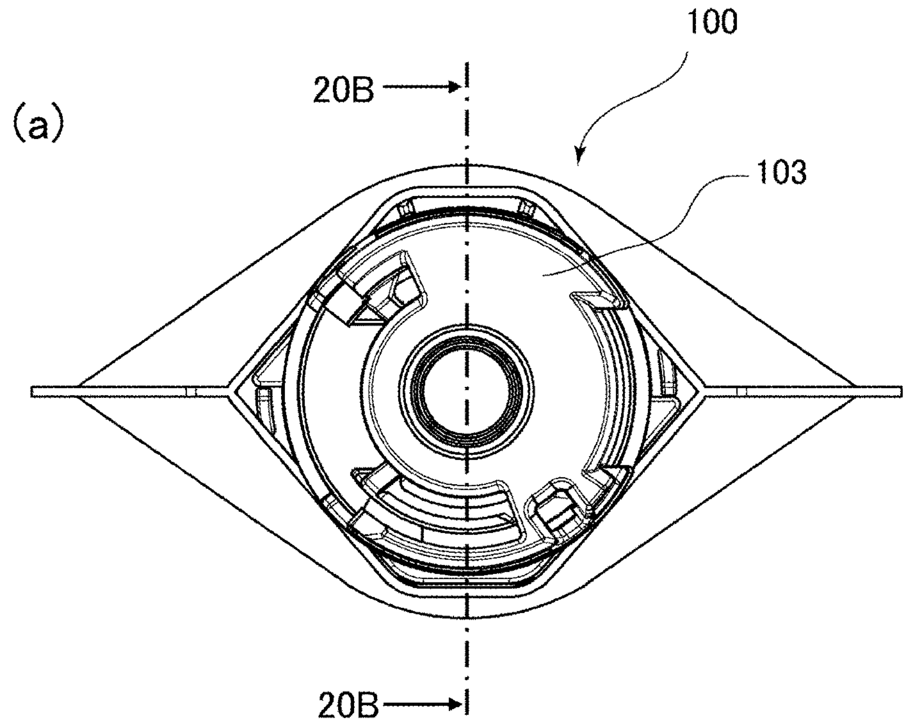
Figure 20:
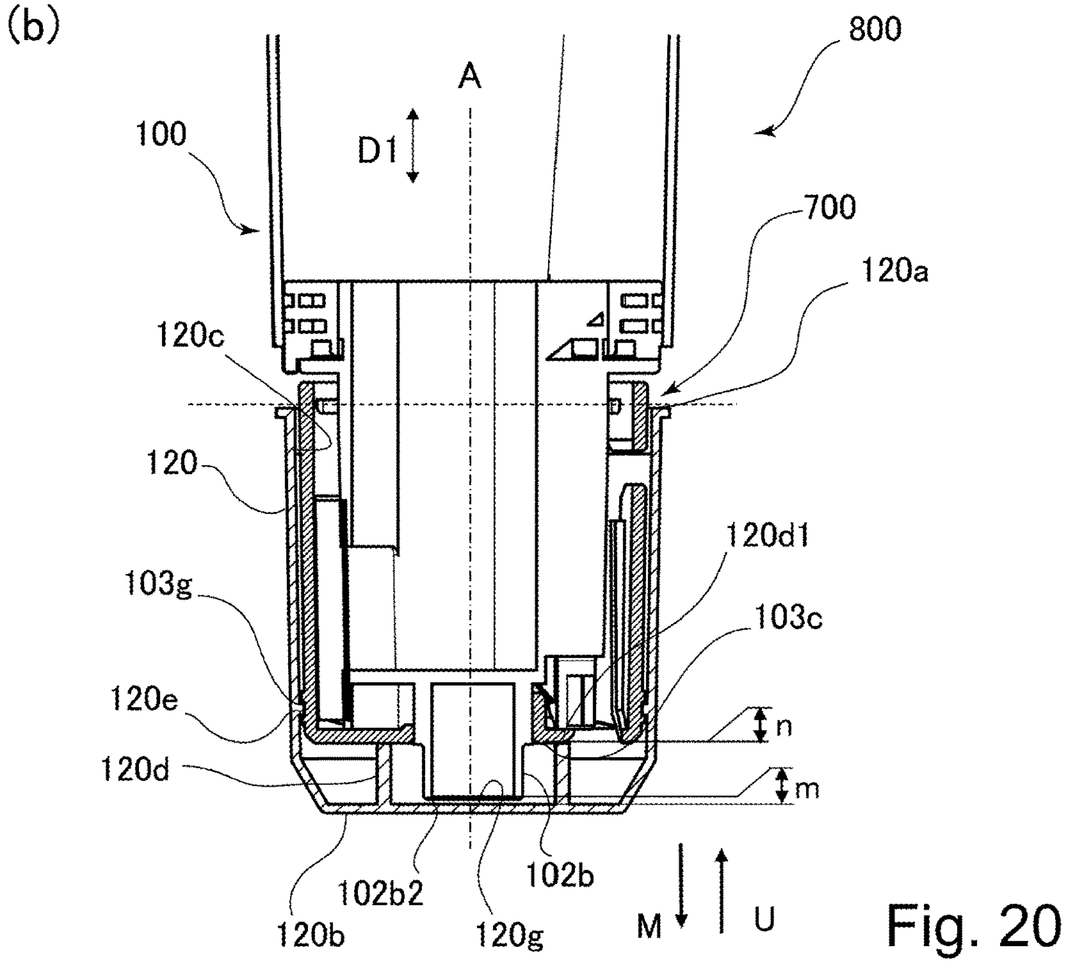

Part (a) of FIG. 20 is a view of the toner pack as viewed in the dismounting direction, and part (b) of FIG. 20 is a sectional view showing a 20B-20B cross section of part (a) of FIG. 20.

Figure 21:
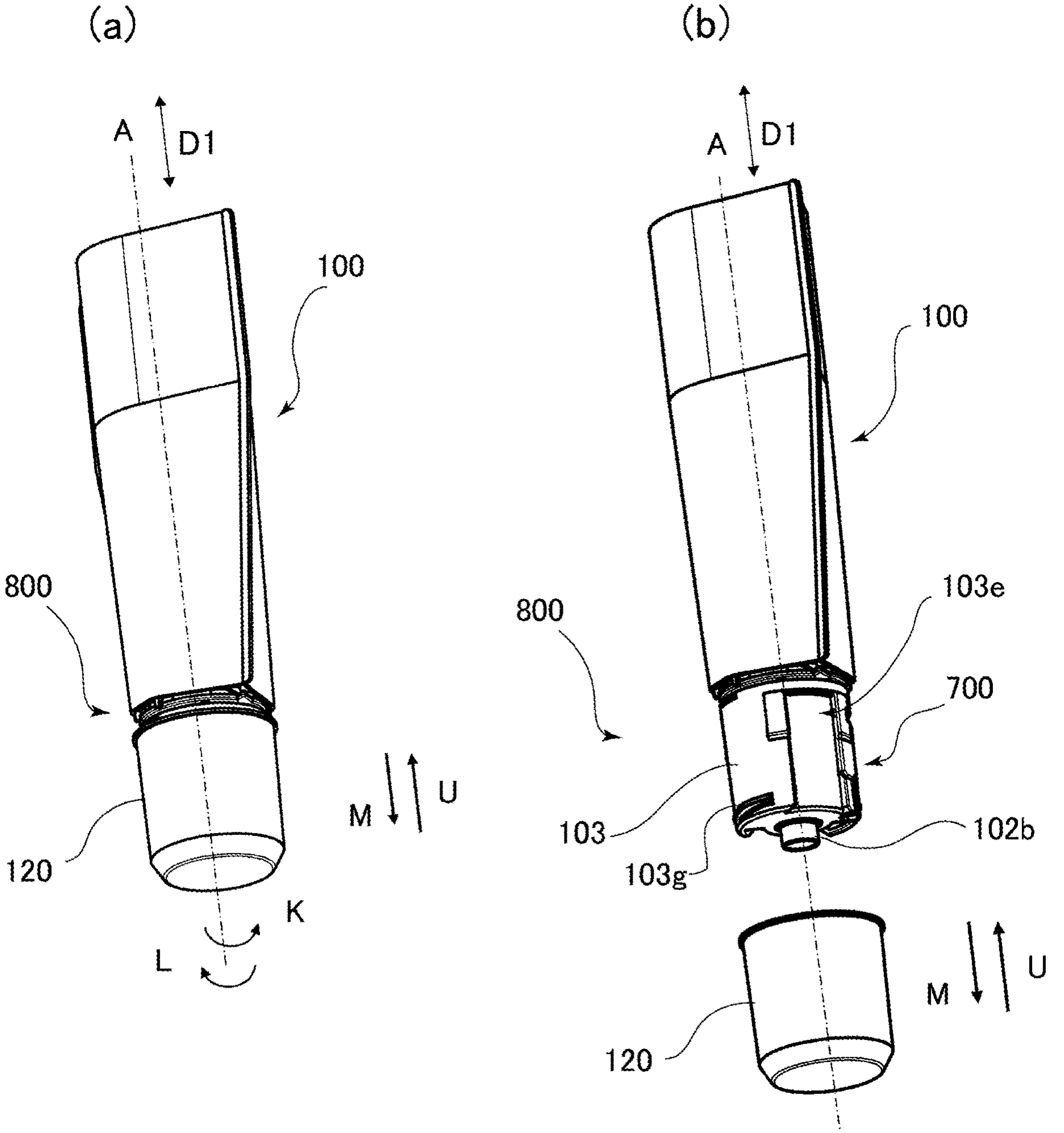

Part (a) of FIG. 21 is a sectional view showing the toner pack to which the cap is mounted, part (b) of FIG. 21 is a perspective view showing a state in which the cap is dismounted from the toner pack.

Figure 22:
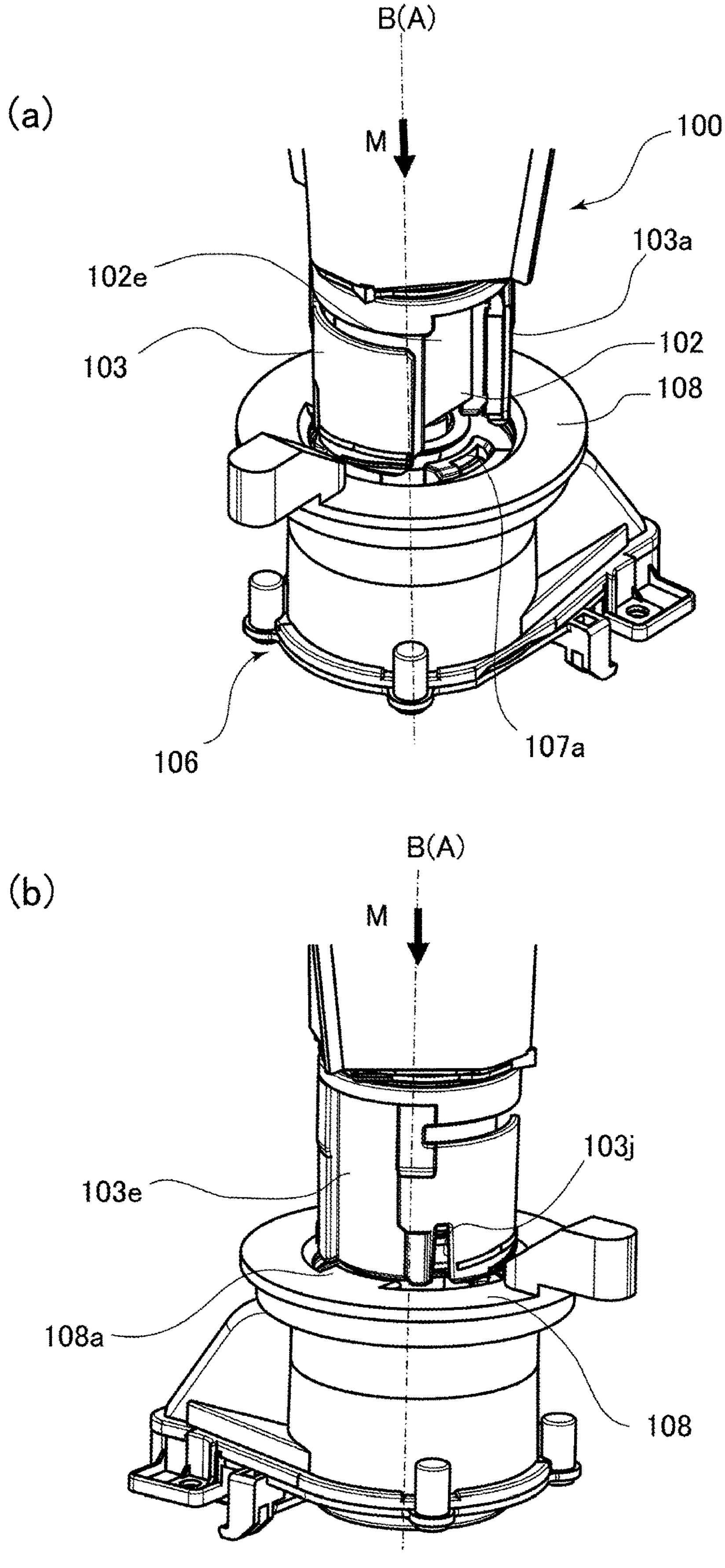

Part (a) of FIG. 22 is a perspective view showing a state in which the toner pack is being mounted toward the mounting portion, and part (b) of FIG. 22 is a perspective view showing the state in which the toner pack is being mounted toward the mounting portion as viewed from another angle.

Figure 23:
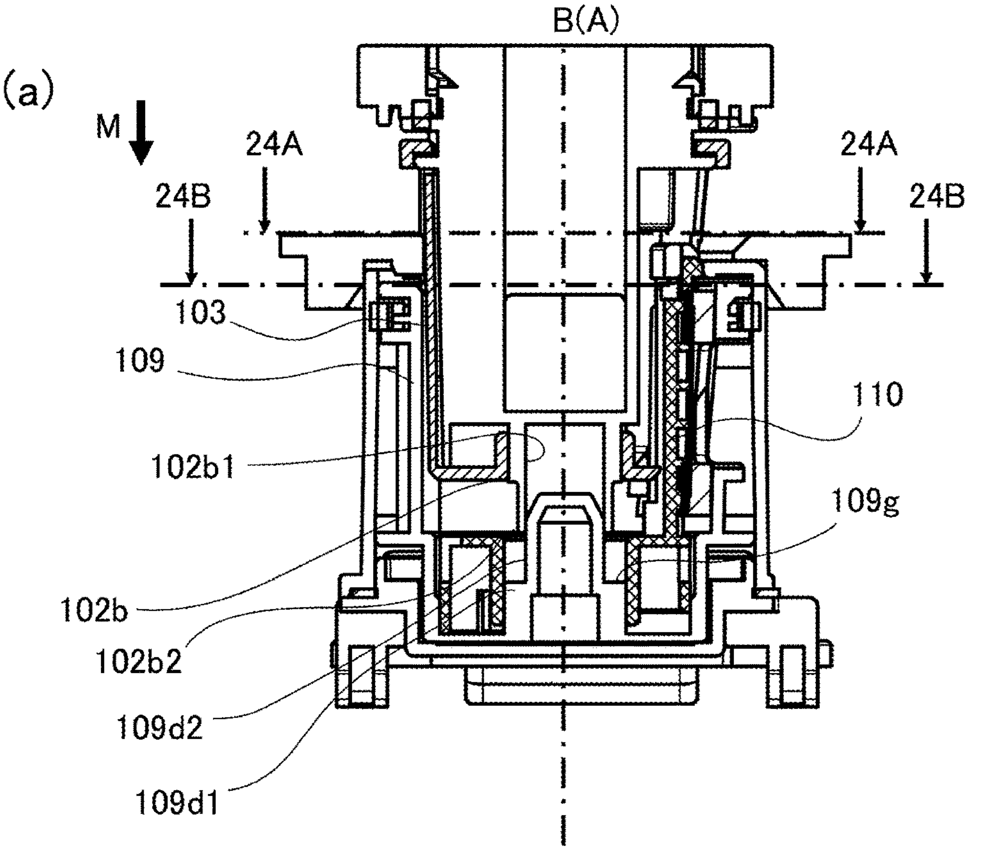
Figure 23:
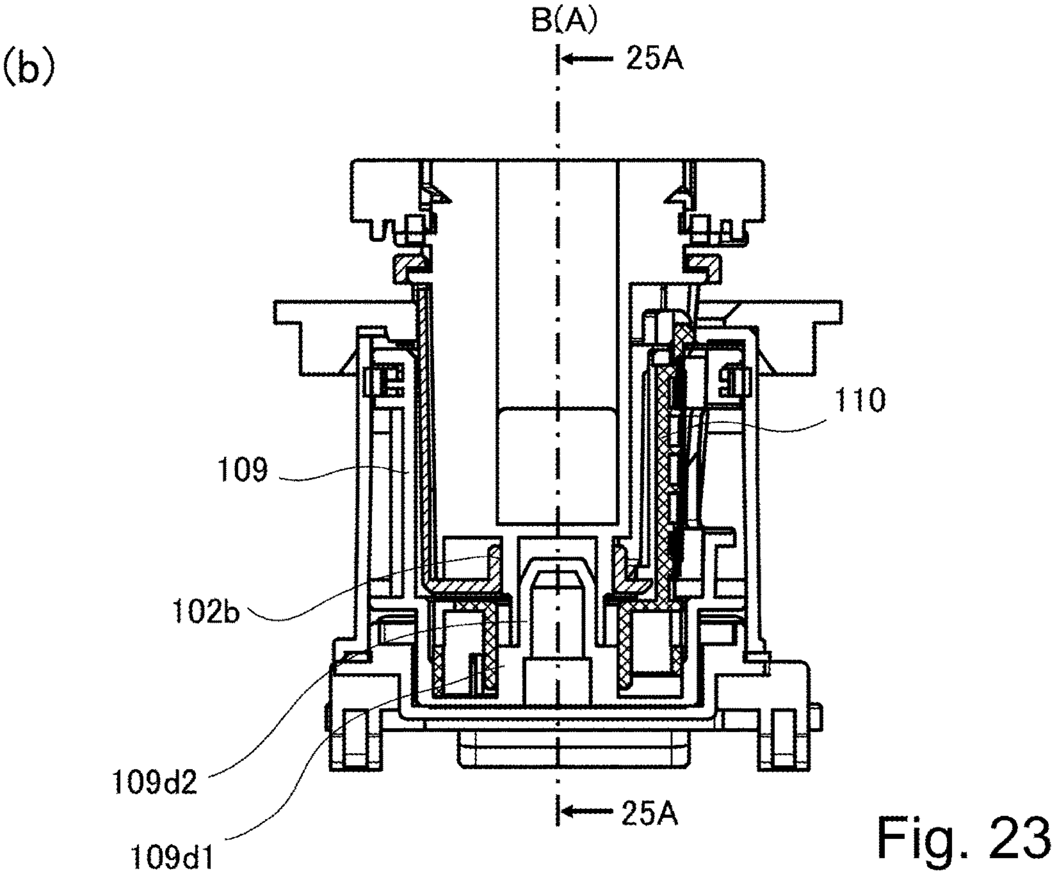

Part (a) of FIG. 23 is a sectional view showing the state when the toner pack is being mounted toward the mounting portion, and part (b) of FIG. 23 is a sectional view showing a state when the mounting of the toner pack to the mounting portion is completed.

Figure 24:
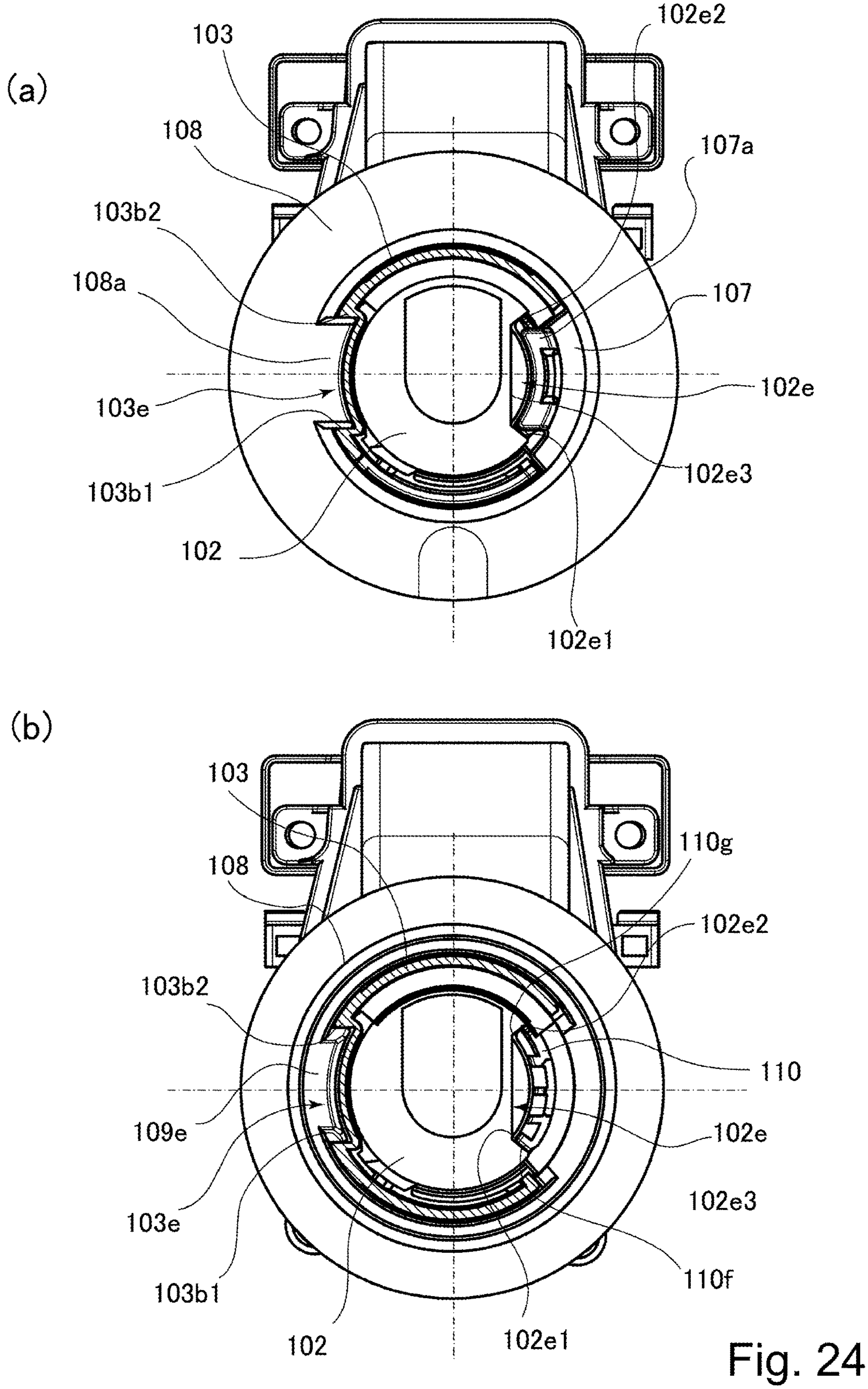

Part (a) of FIG. 24 is a sectional view showing a 24A-24A cross section of part (a) of FIG. 23, and part (b) of FIG. 24 is a sectional view showing a 24B-24B cross section of part (a) of FIG. 23.

Figure 25:
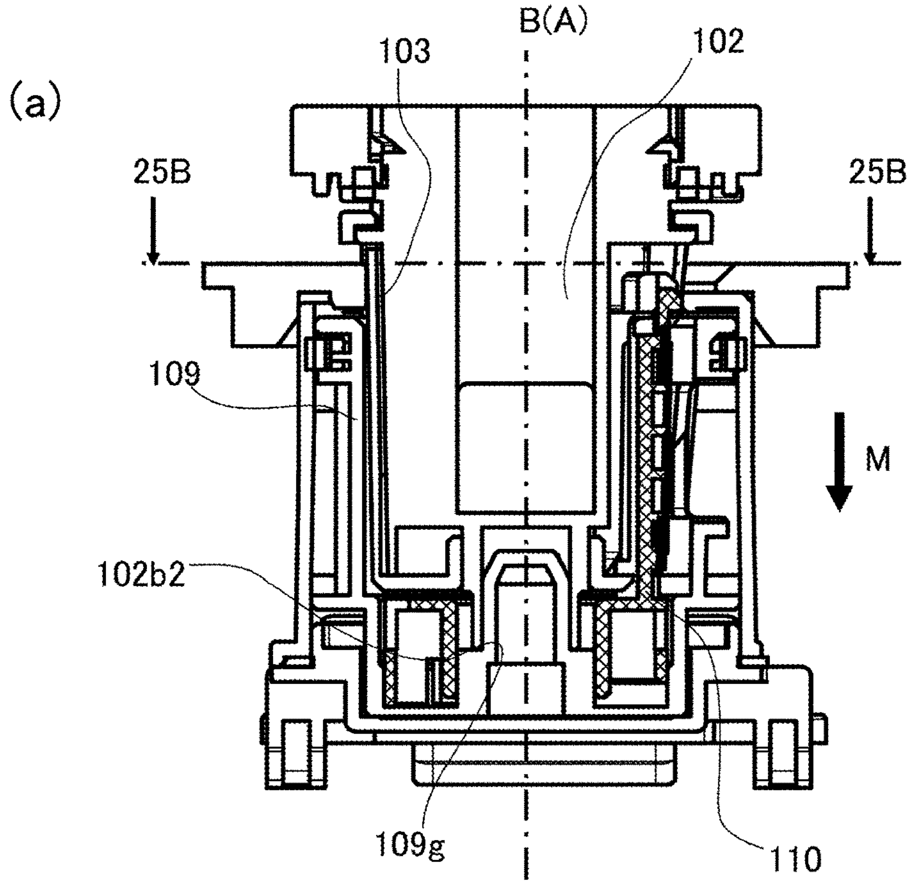
Figure 25:
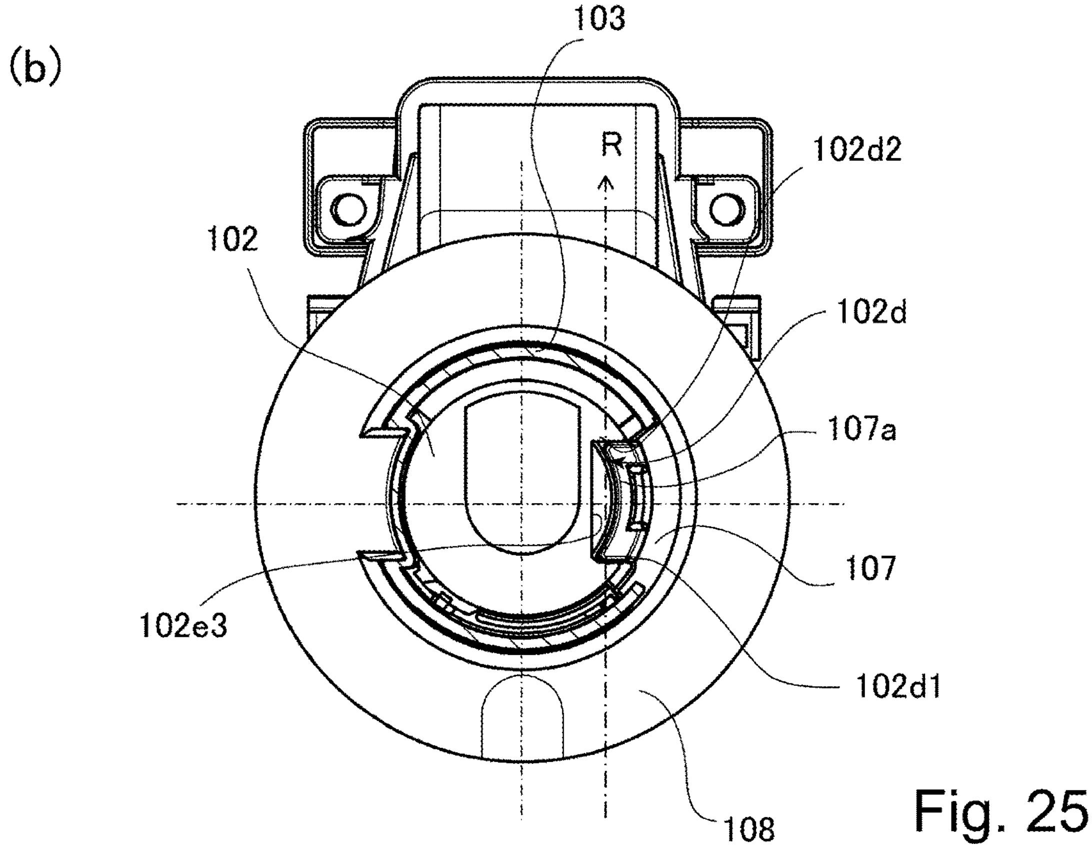

Part (a) of FIG. 25 is a sectional view showing a 25A-25A cross section of part (b) of FIG. 23, and part (b) of FIG. 25 is a sectional view showing a 25B-25B cross section of part (a) of FIG. 25.

Figure 26:
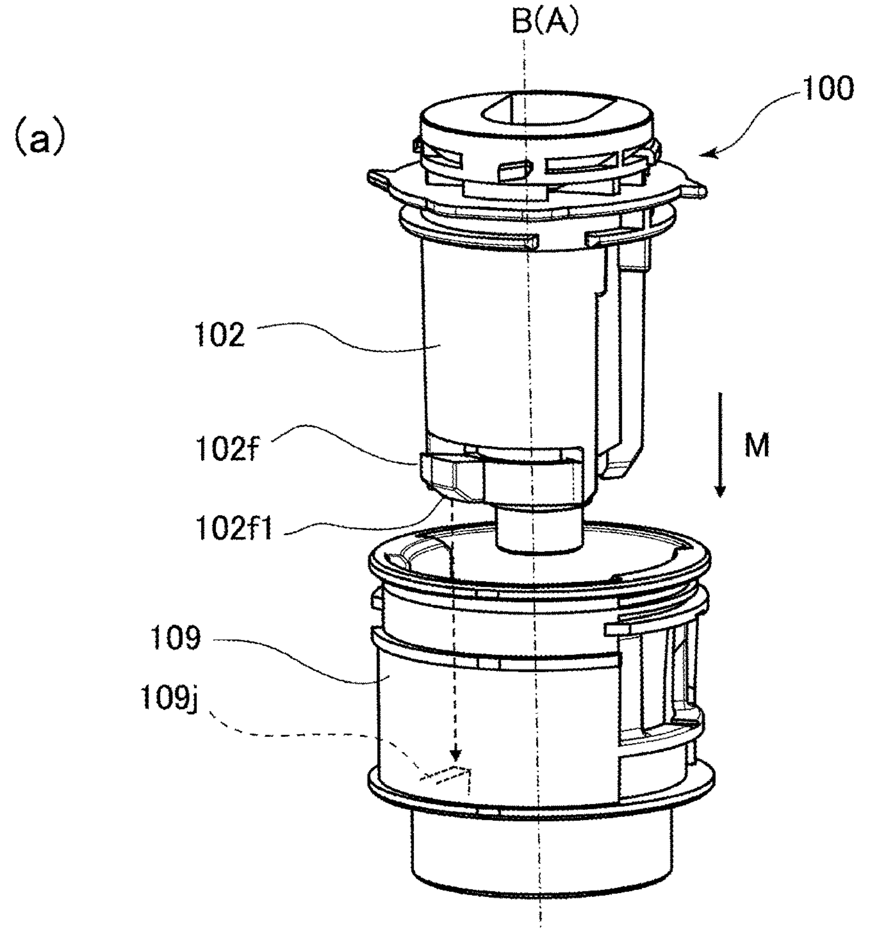
Figure 26:
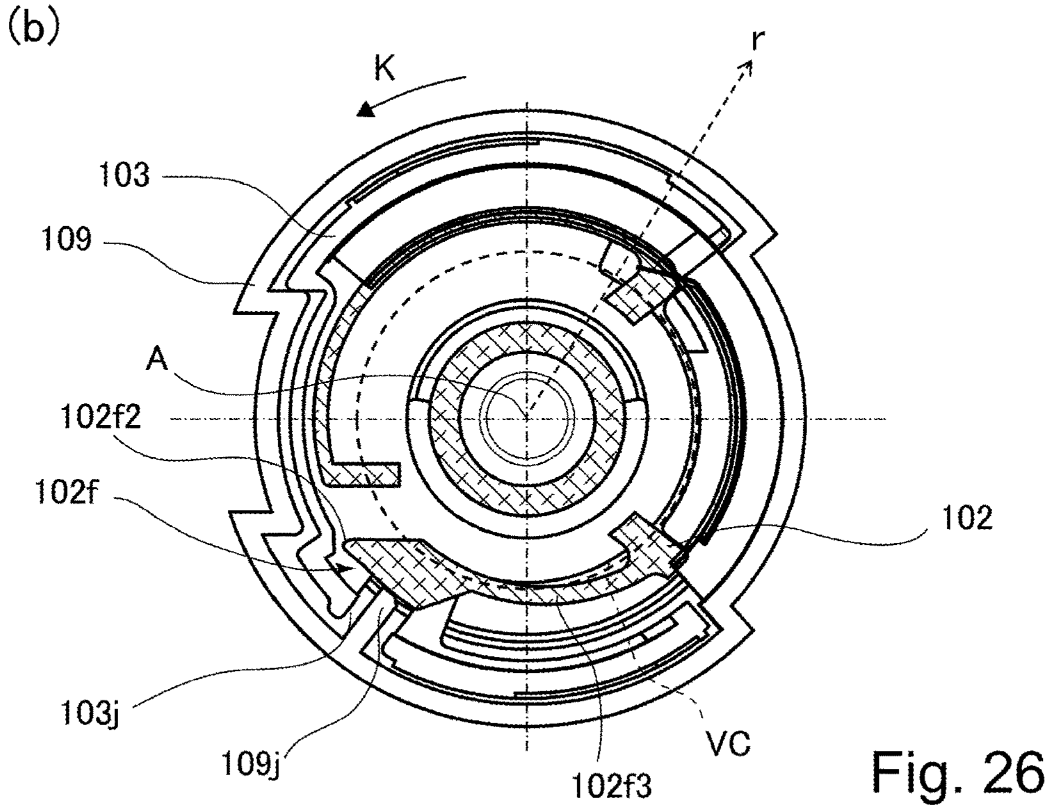

Part (a) of FIG. 26 is a perspective view showing a state when the toner pack is being mounted toward the apparatus-side shutter, and part (b) of FIG. 26 is a sectional view showing a 17B-17B cross section of part (a) of FIG. 17 in a state in which the mounting of the toner pack to the mounting portion is completed.

Figure 27:
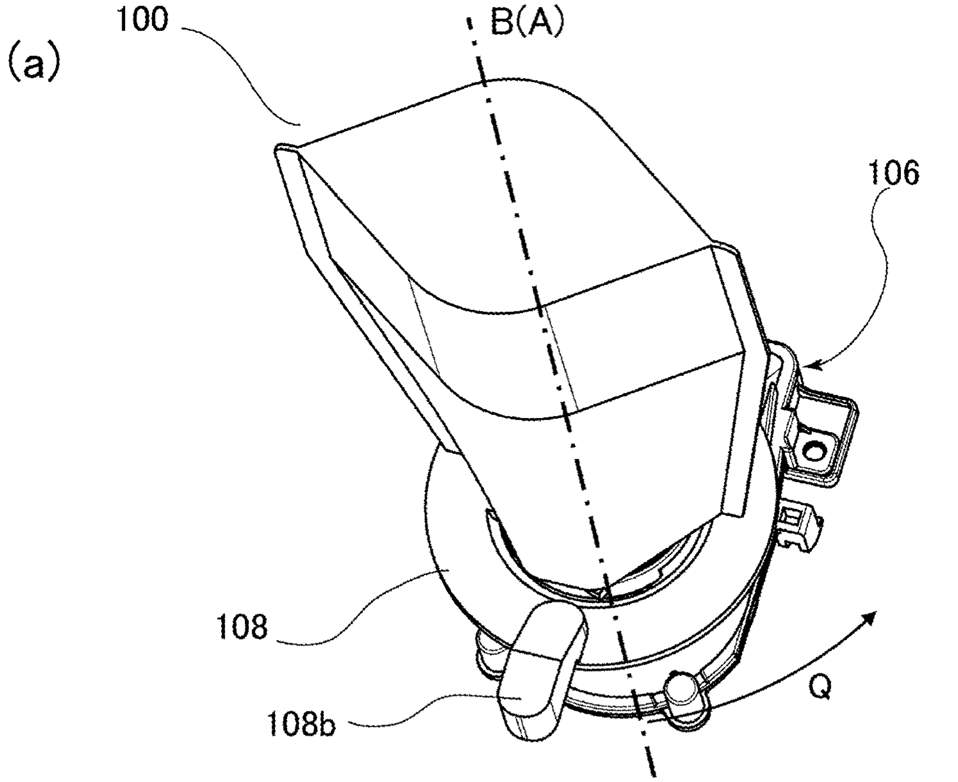
Figure 27:
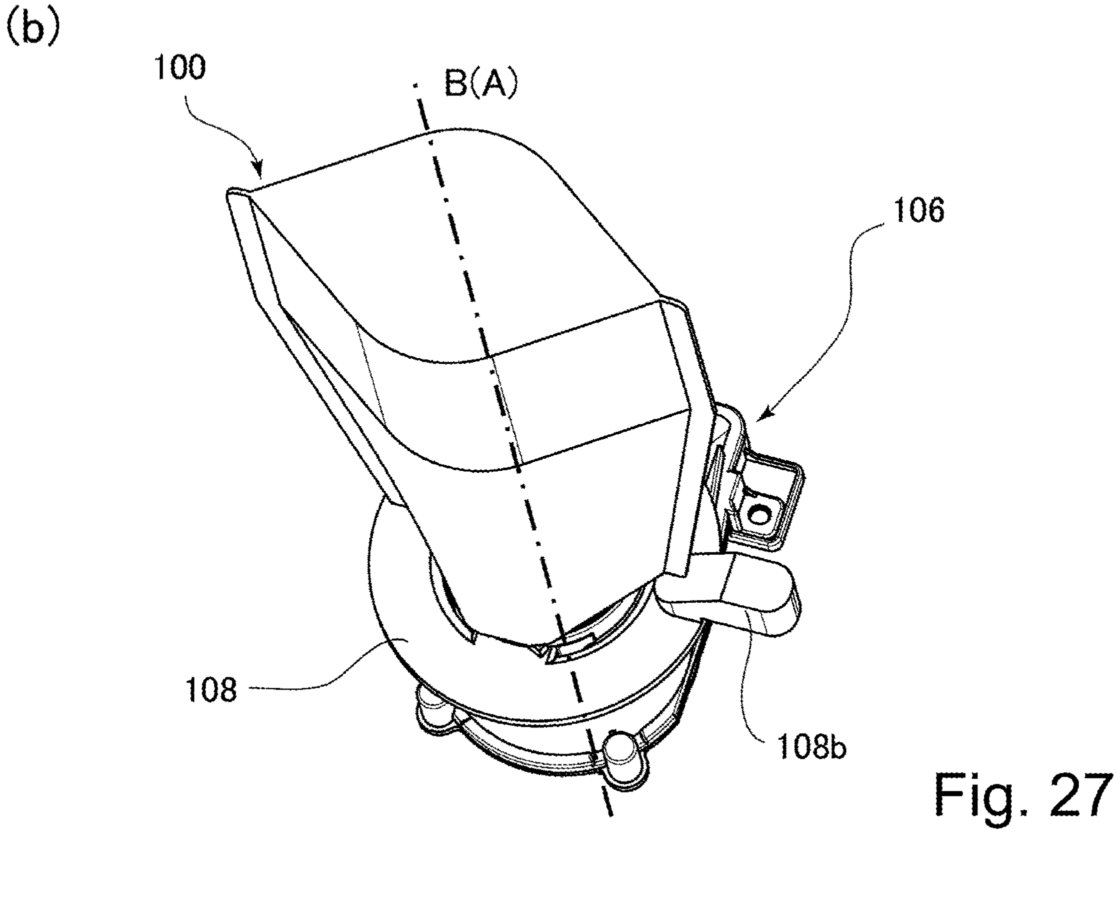

Part (a) of FIG. 27 is a perspective view showing the operating lever positioned in closed position and the toner pack, and part (b) of FIG. 27 is a perspective view showing the operating lever positioned in the open position and the toner pack.

Figure 28:
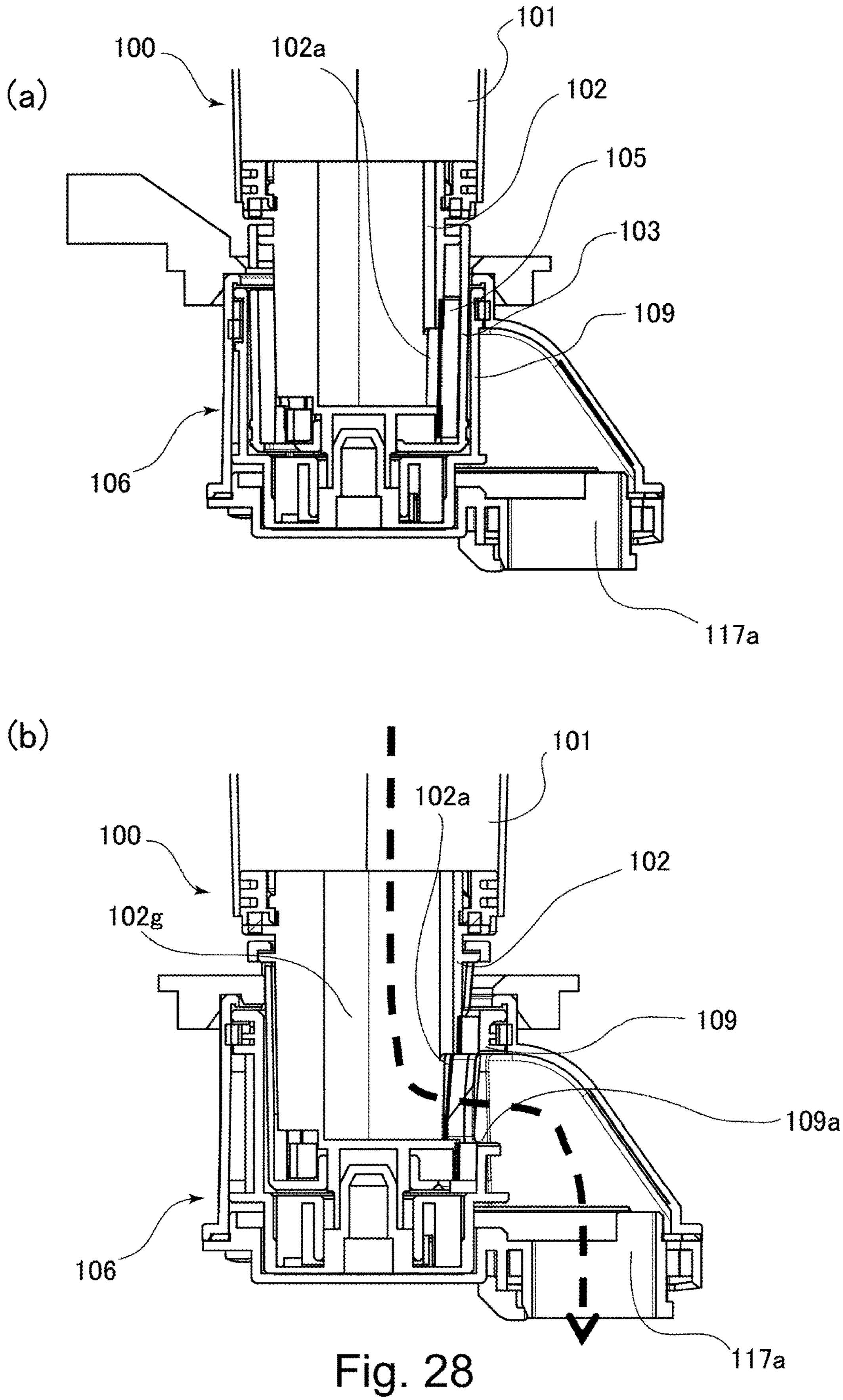

Part (a) of FIG. 28 is a sectional view showing the toner pack and the mounting portion when both the apparatus-side shutter and the pack-side shutter are in the shielding positions, and part (b) of FIG. 28 is a sectional view showing the toner pack and the mounting portion when both the apparatus-side shutter and the pack-side shutter are in the open positions.

Figure 29:
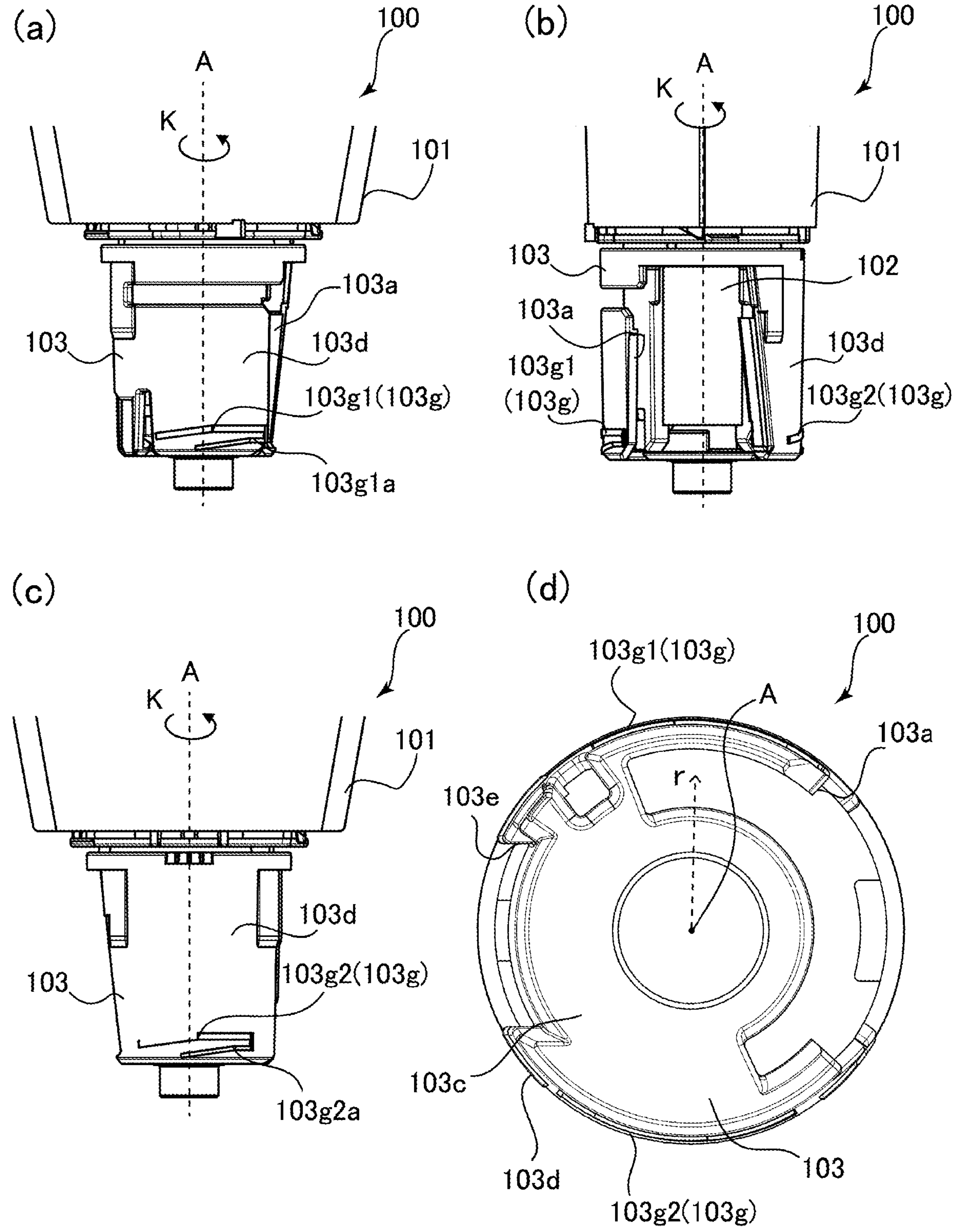

Part (a) of FIG. 29 is a view showing a first screw recessed portion, part (b) of FIG. 29 is a view showing the first screw recessed portion and a second screw recessed portion in the case where an opening (position) is viewed from a front thereof, part (c) of FIG. 29 is a view showing the second screw recessed portion, and part (d) of FIG. 29 is a bottom view showing the first screw recessed portion and the second screw recessed portion.

Figure 30:
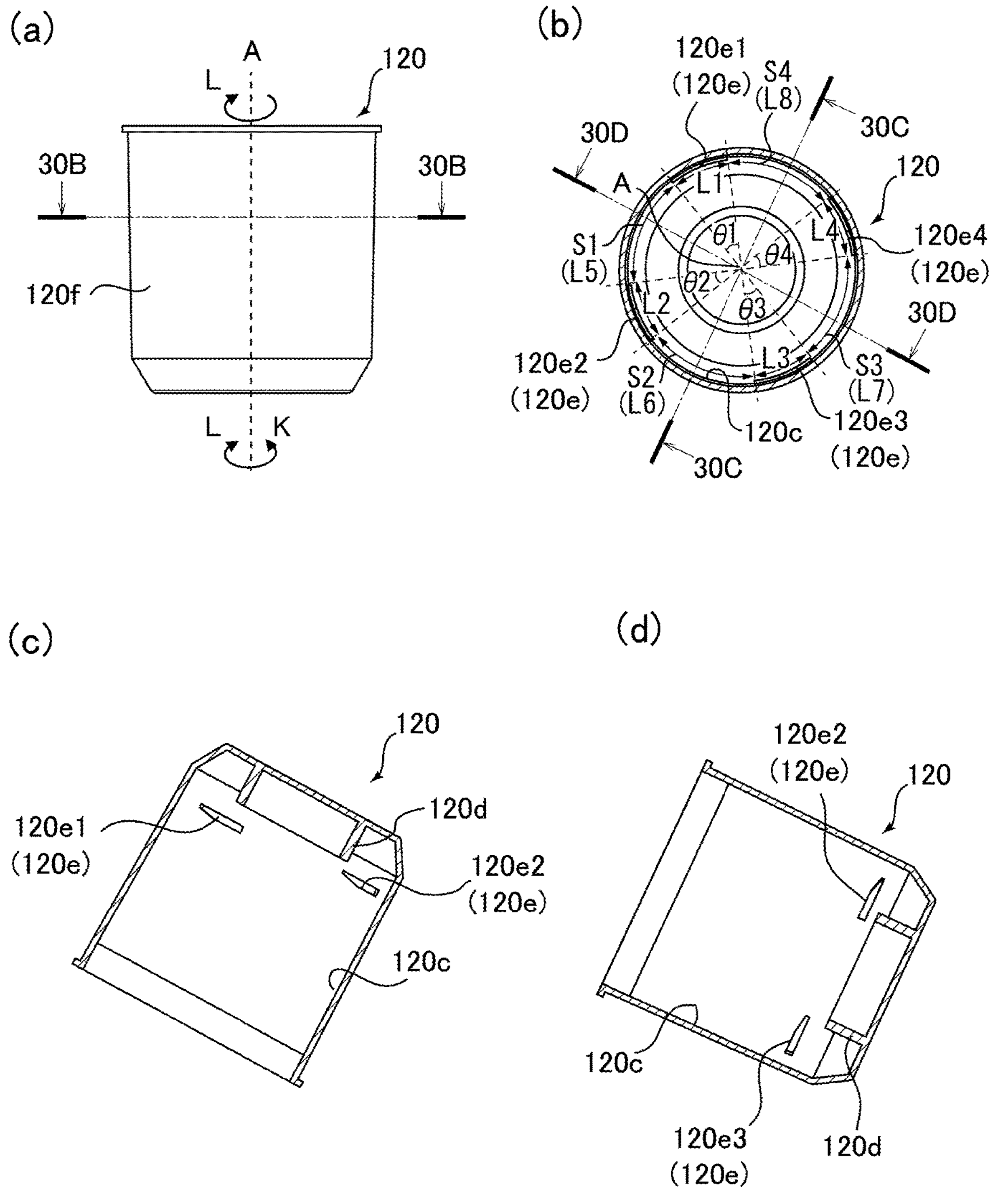

Part (a) of FIG. 30 is a front view showing the cap, part (b) of FIG. 30 is a sectional view showing a 30B-30B cross section of part (a) of FIG. 30, part (c) of FIG. 30 is a sectional view showing a 30C-30C cross section of part (b) of FIG. 30, and part (d) of FIG. 30 is a sectional view showing a 30D-30D cross section of part (b) of FIG. 30.

Figure 31:
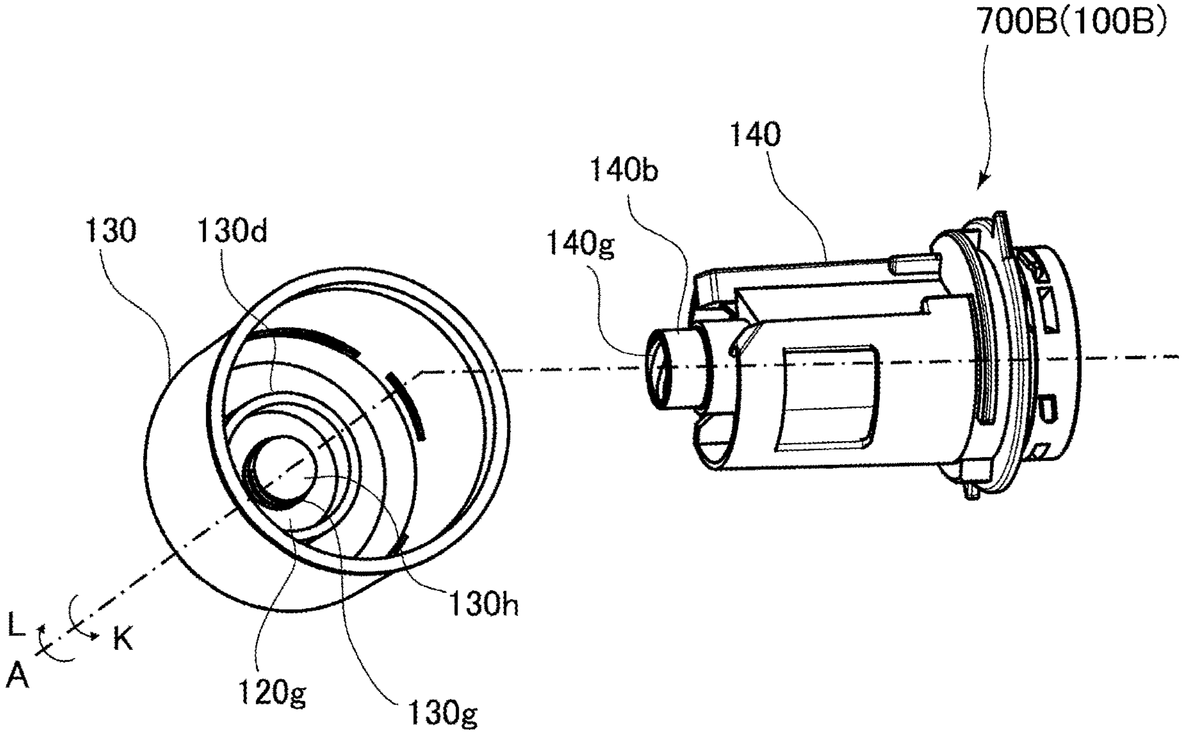

FIG. 31 is an exploded perspective view showing a cap and a nozzle according to a second embodiment.

Figure 32:
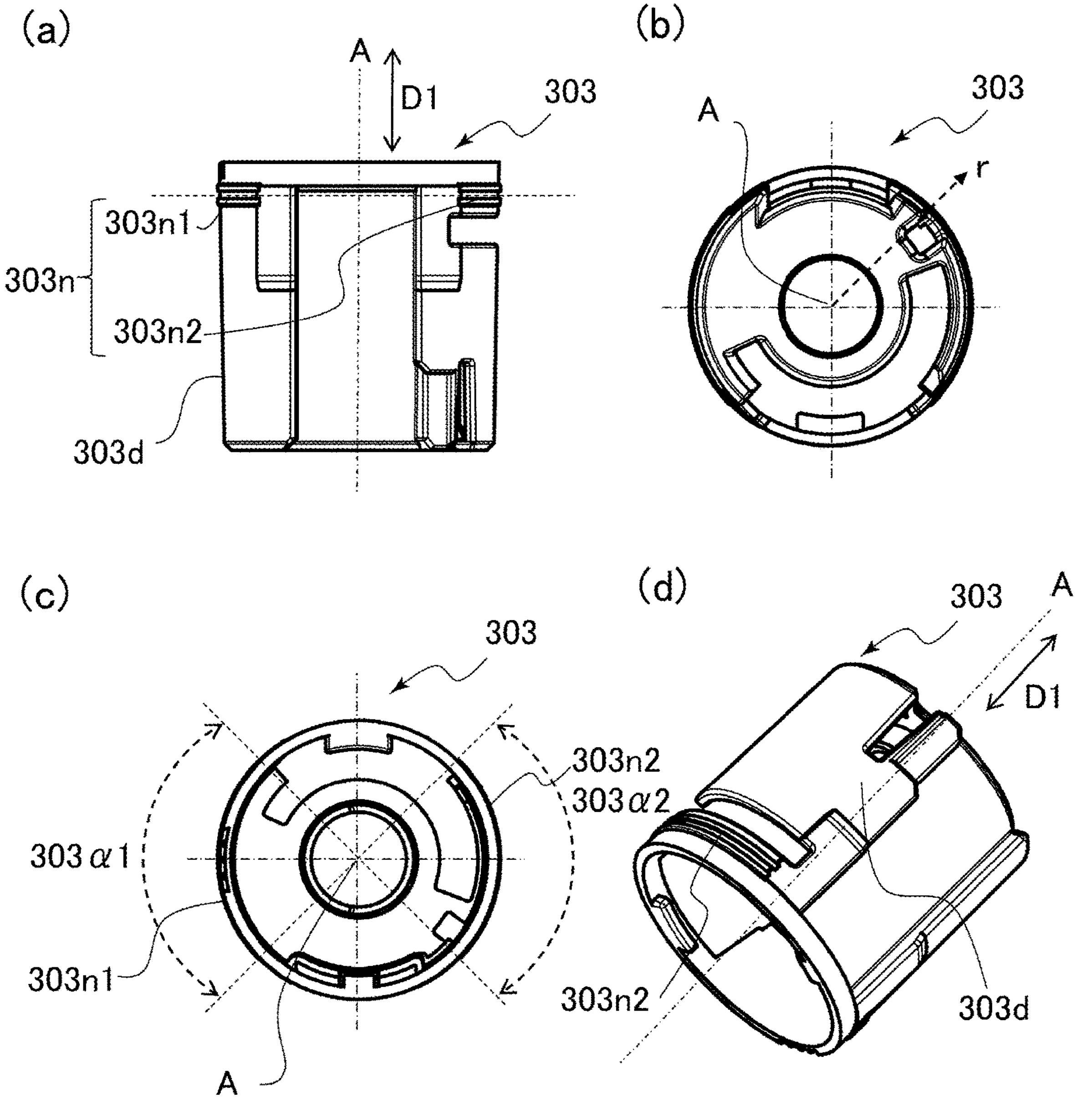

Part (a) of FIG. 32 is a front view showing a pack-side shutter according to a third embodiment, part (b) of FIG. 32 is a plan view showing the pack-side shutter, part (c) of FIG. 32 is a bottom view showing the pack-side shutter, and part (d) of FIG. 32 is a perspective view showing the pack-side shutter.

Figure 33:
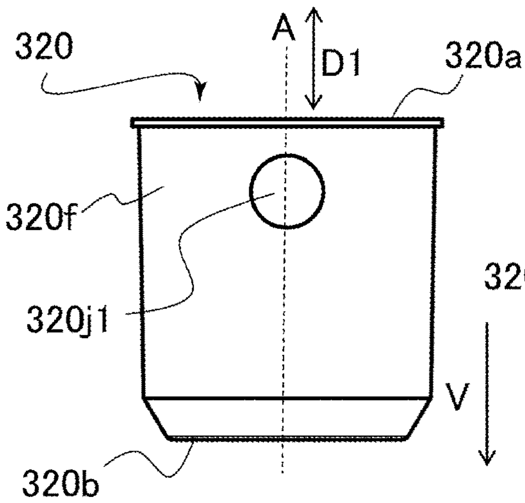
Figure 33:
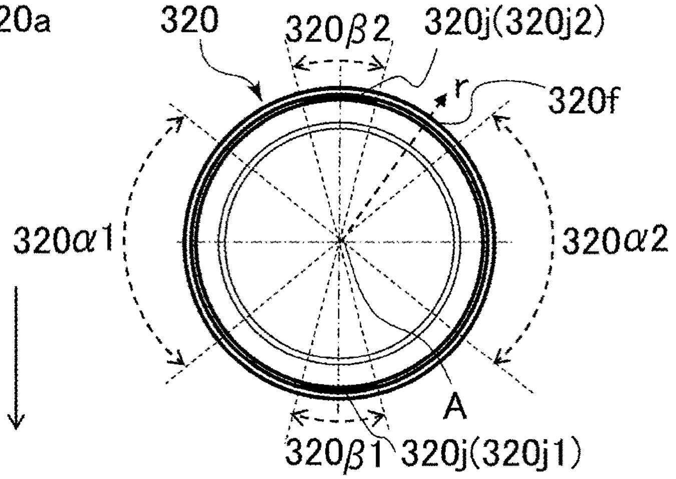
Figure 33:
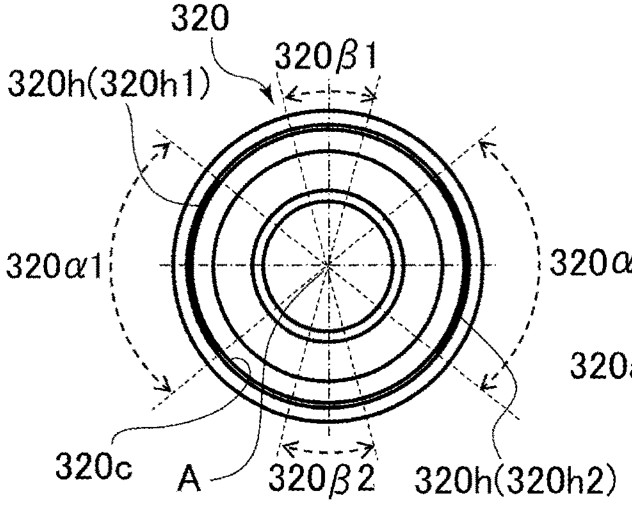
Figure 33:
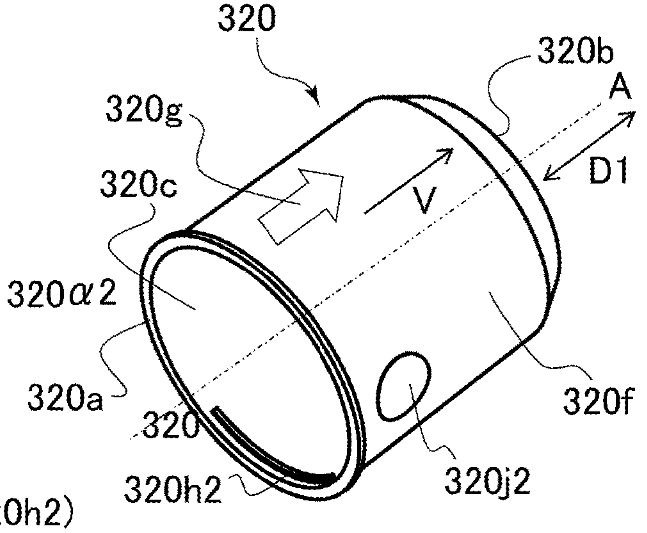

Part (a) of FIG. 33 is a front view showing a cap according to the third embodiment, part (b) of FIG. 33 is a plan view showing the cap, part (c) of FIG. 33 is a bottom view showing the cap, and part (d) of FIG. 33 is a perspective view showing the cap.

Figure 34:
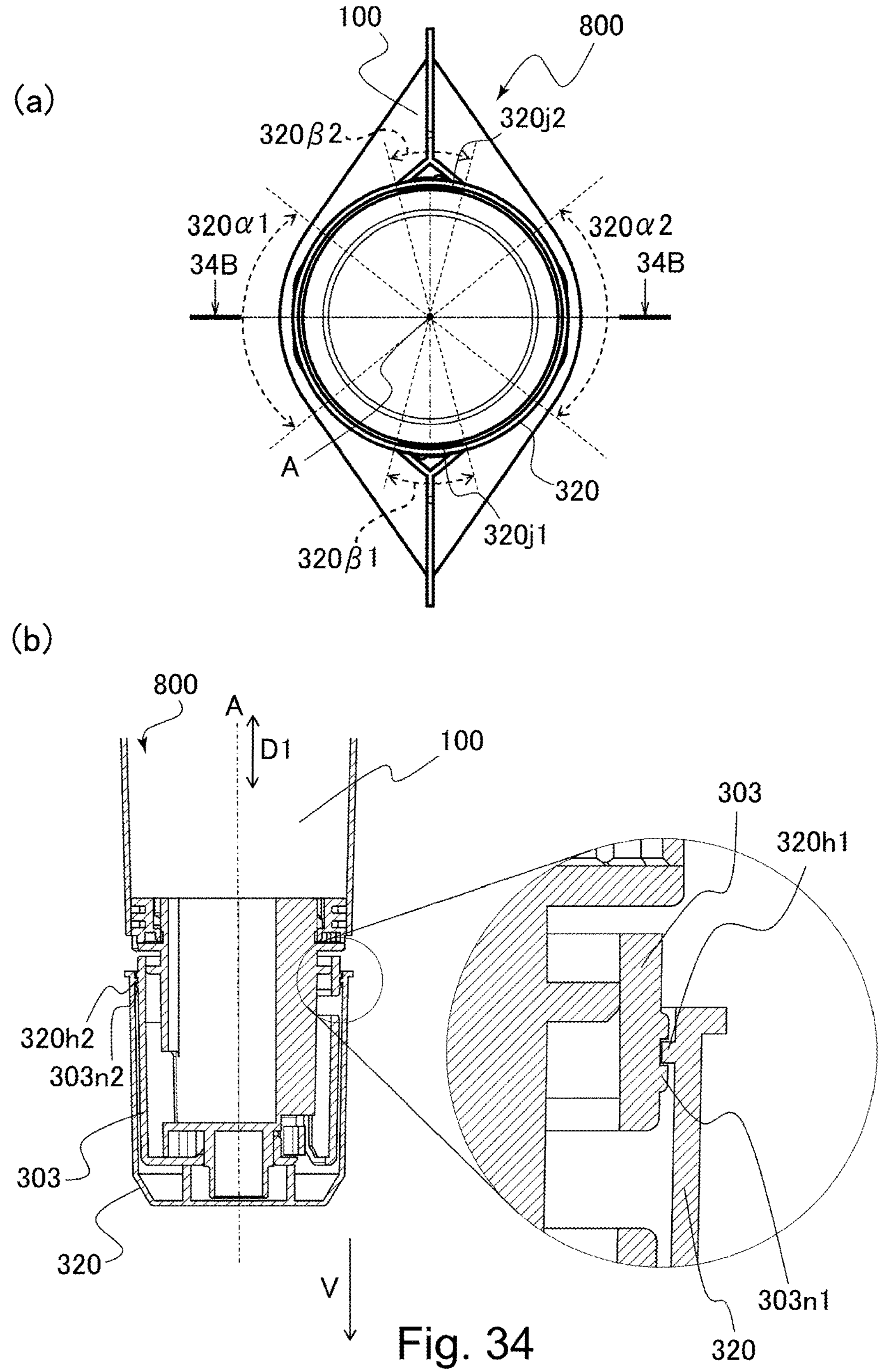

Part (a) of FIG. 34 is a view of an accommodating container as viewed in a dismounting direction, and part (b) of FIG. 34 is a sectional view showing a 34B-34B cross section of part (a) of FIG. 34 in the accommodating container.

Figure 35:
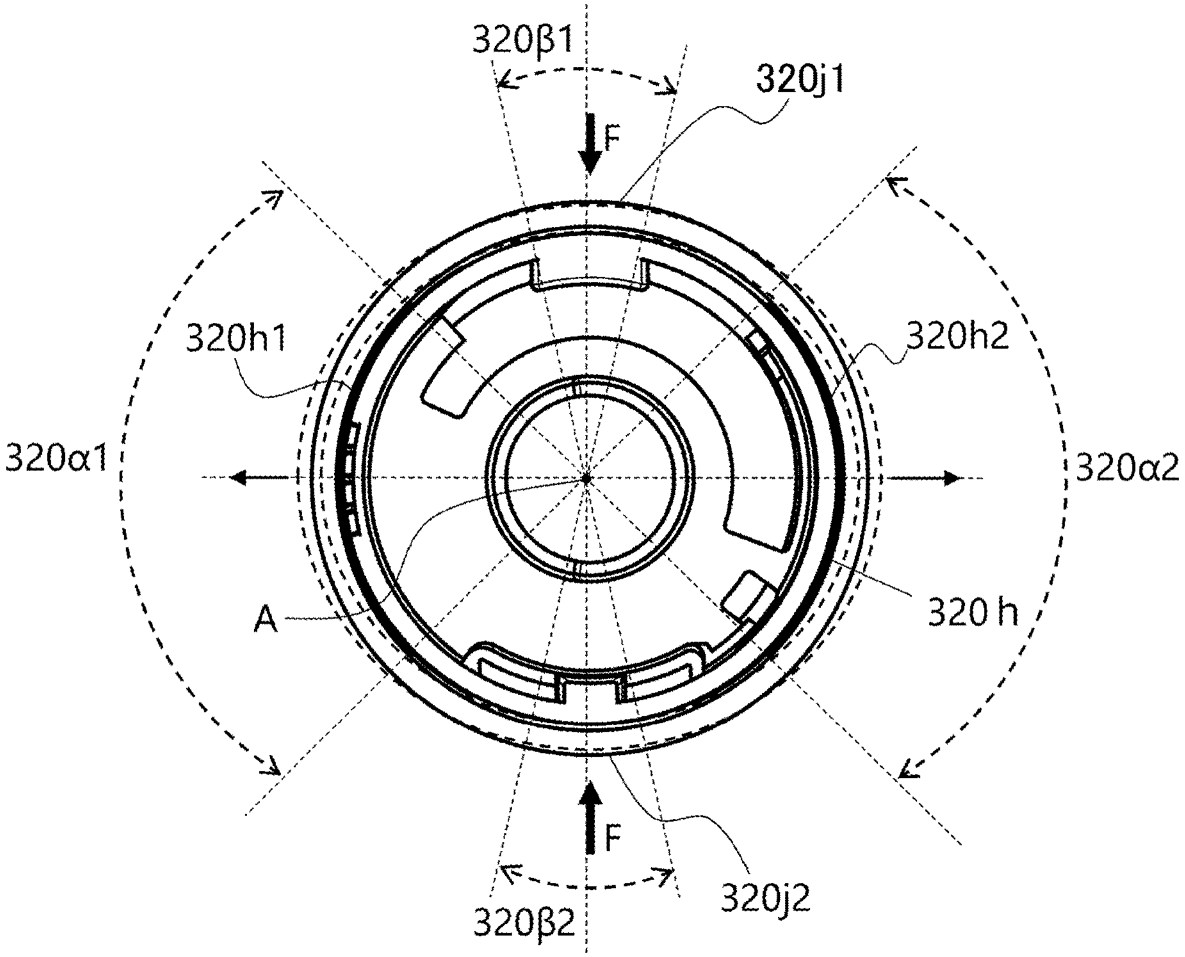

FIG. 35 is a bottom view showing the cap and the pack-side shutter when the cap according to the third embodiment is dismounted from the pack-side shutter.

Figure 36:
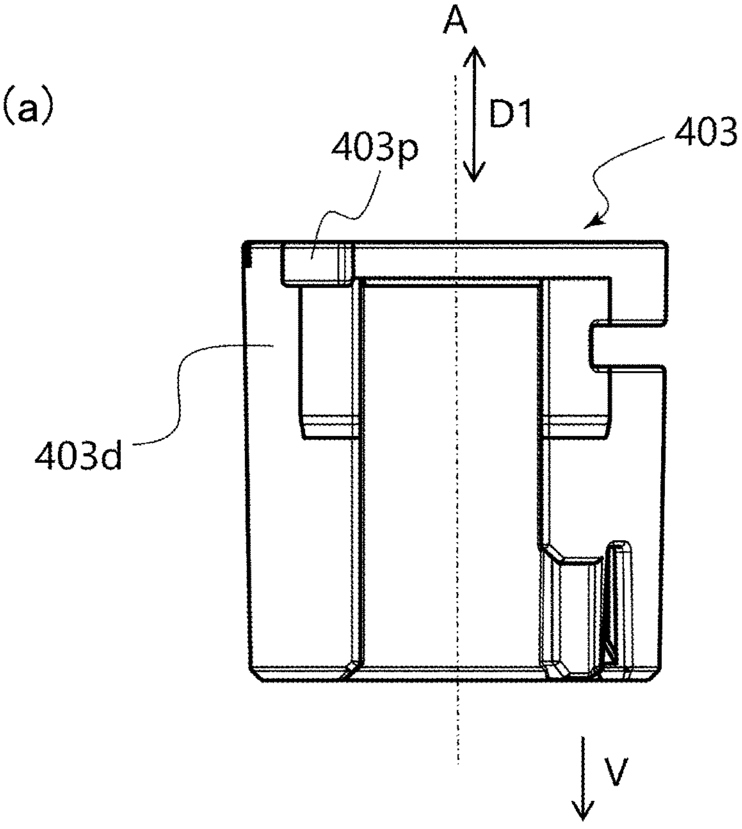
Figure 36:
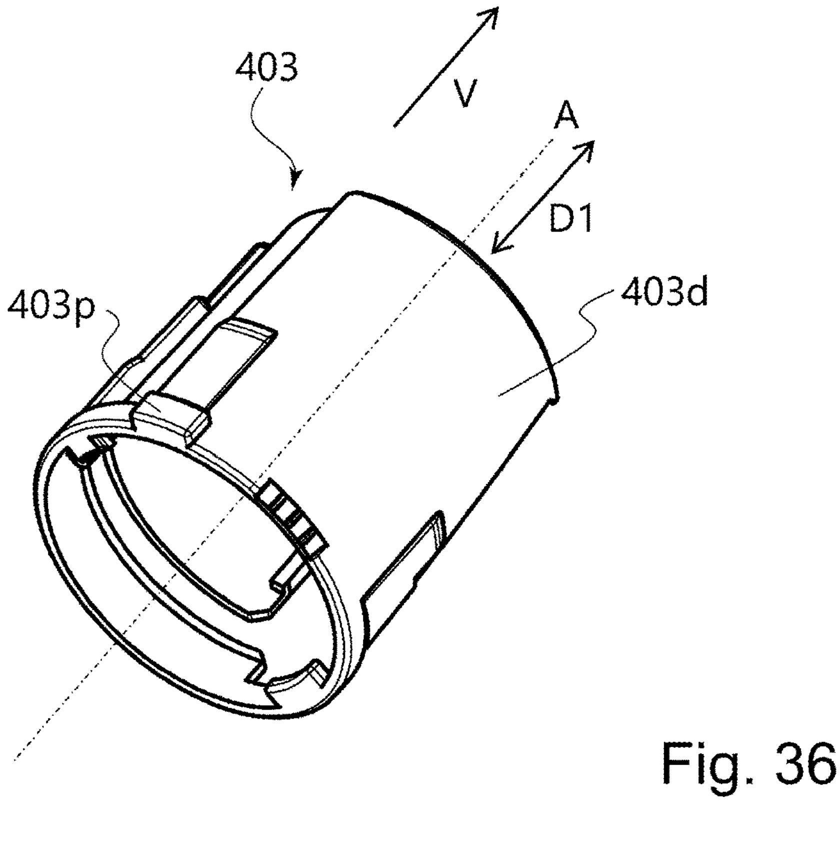

Part (a) of FIG. 36 is a front view showing a pack-side shutter according to a fourth embodiment, and part (b) of FIG. 36 is a perspective view showing the pack-side shutter.

Figure 37:
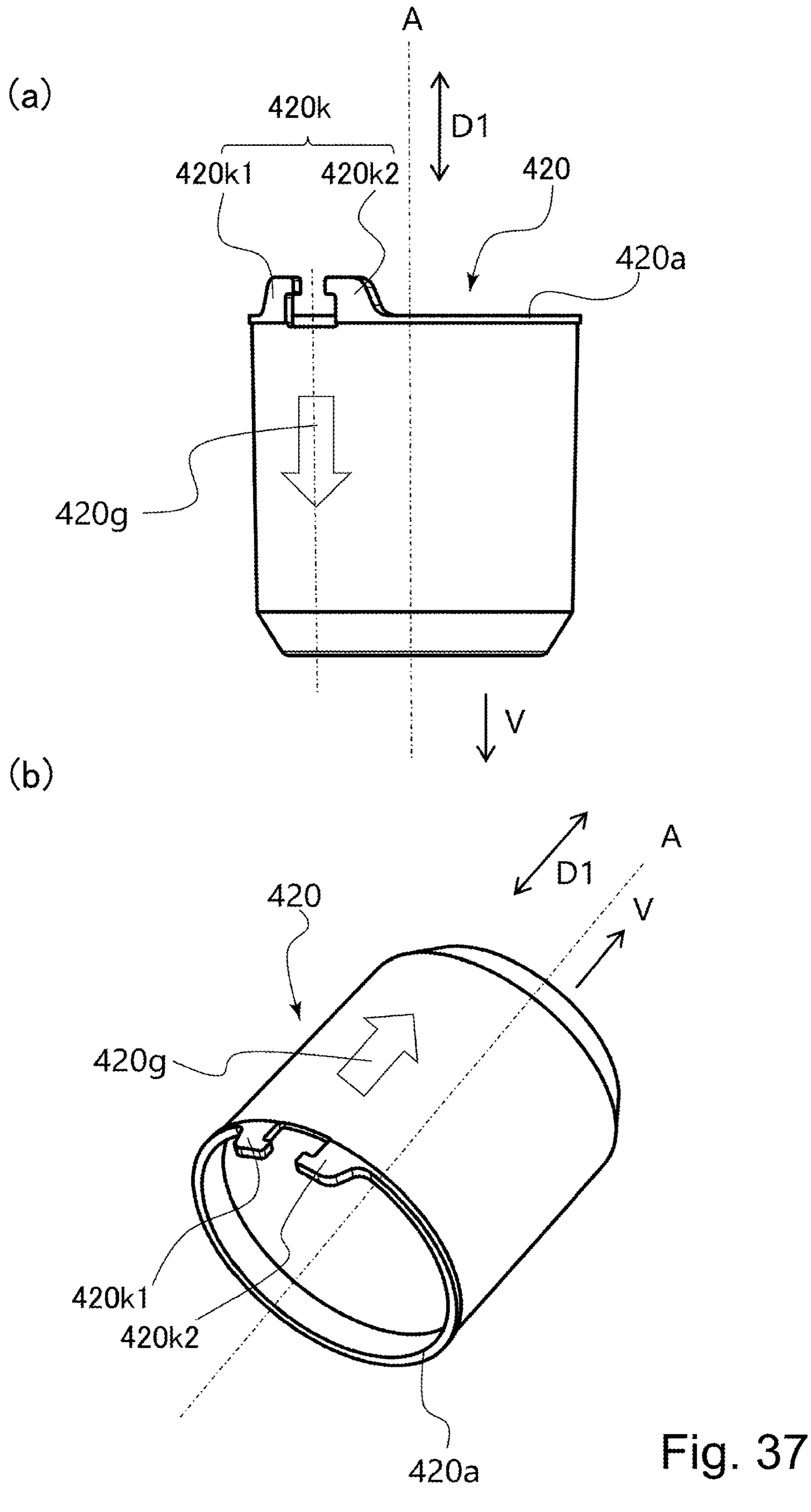

Part (a) of FIG. 37 is a front view showing a cap according to the fourth embodiment, and part (b) of FIG. 37 is a perspective view showing the cap.

Figure 38:
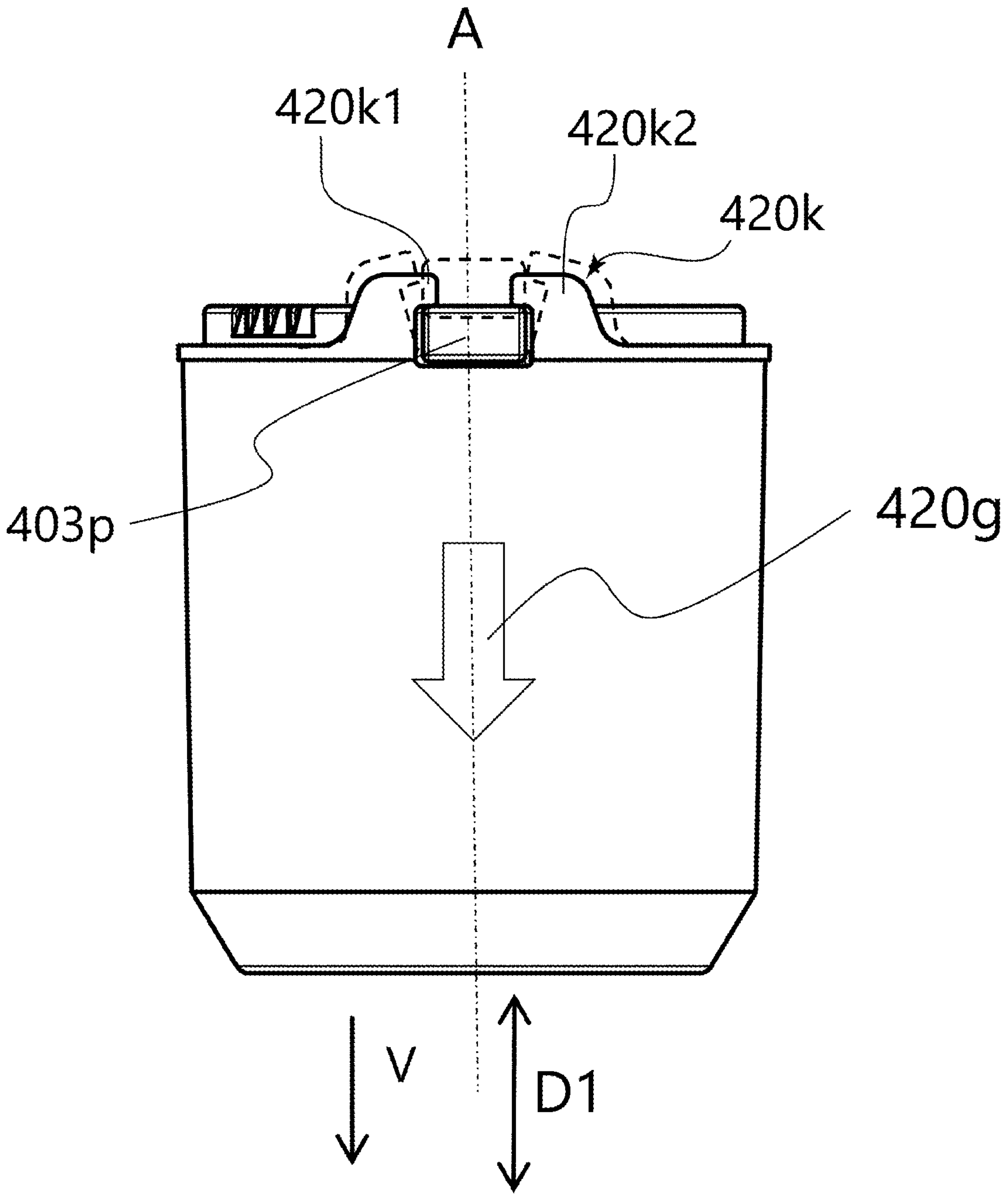

FIG. 38 is a front view showing the cap and the pack-side shutter when the cap according to the fourth embodiment is dismounted from the pack-side shutter.

Figure 39:
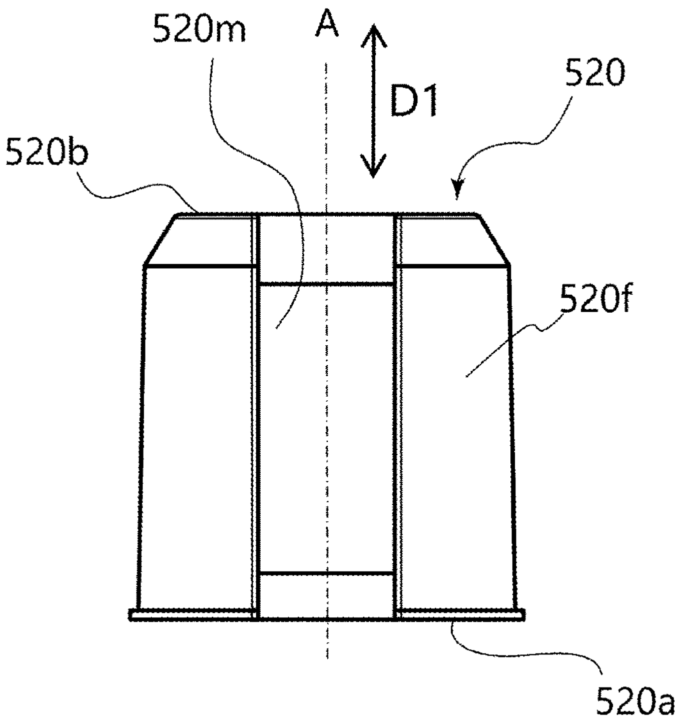
Figure 39:
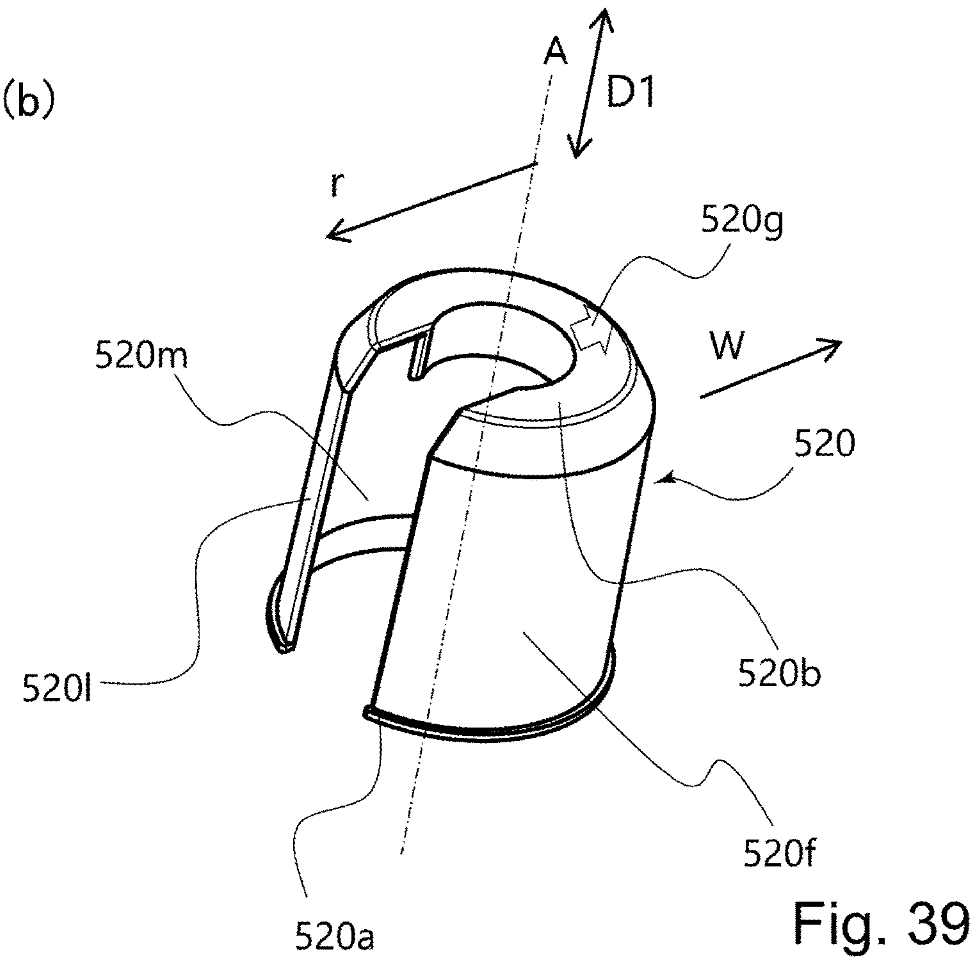

Part (a) of FIG. 39 is a front view showing a cap according to a fifth embodiment and part (b) of FIG. 39 is a perspective view showing the cap.

Figure 40:
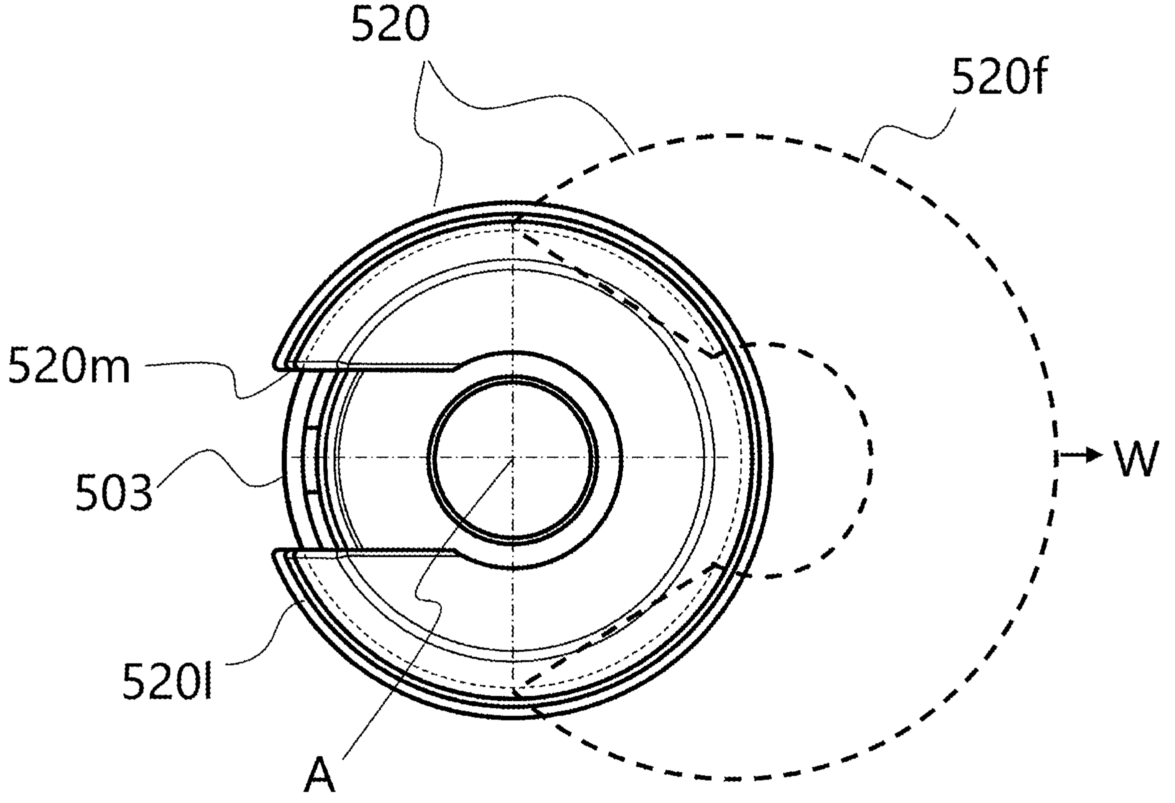

FIG. 40 is a plan view showing the cap and the pack-side shutter when the cap according to the fifth embodiment is dismounted from the pack-side shutter.

EMBODIMENTS FOR CARRYING OUT THE INVENTION

First Embodiment

Figure 1:
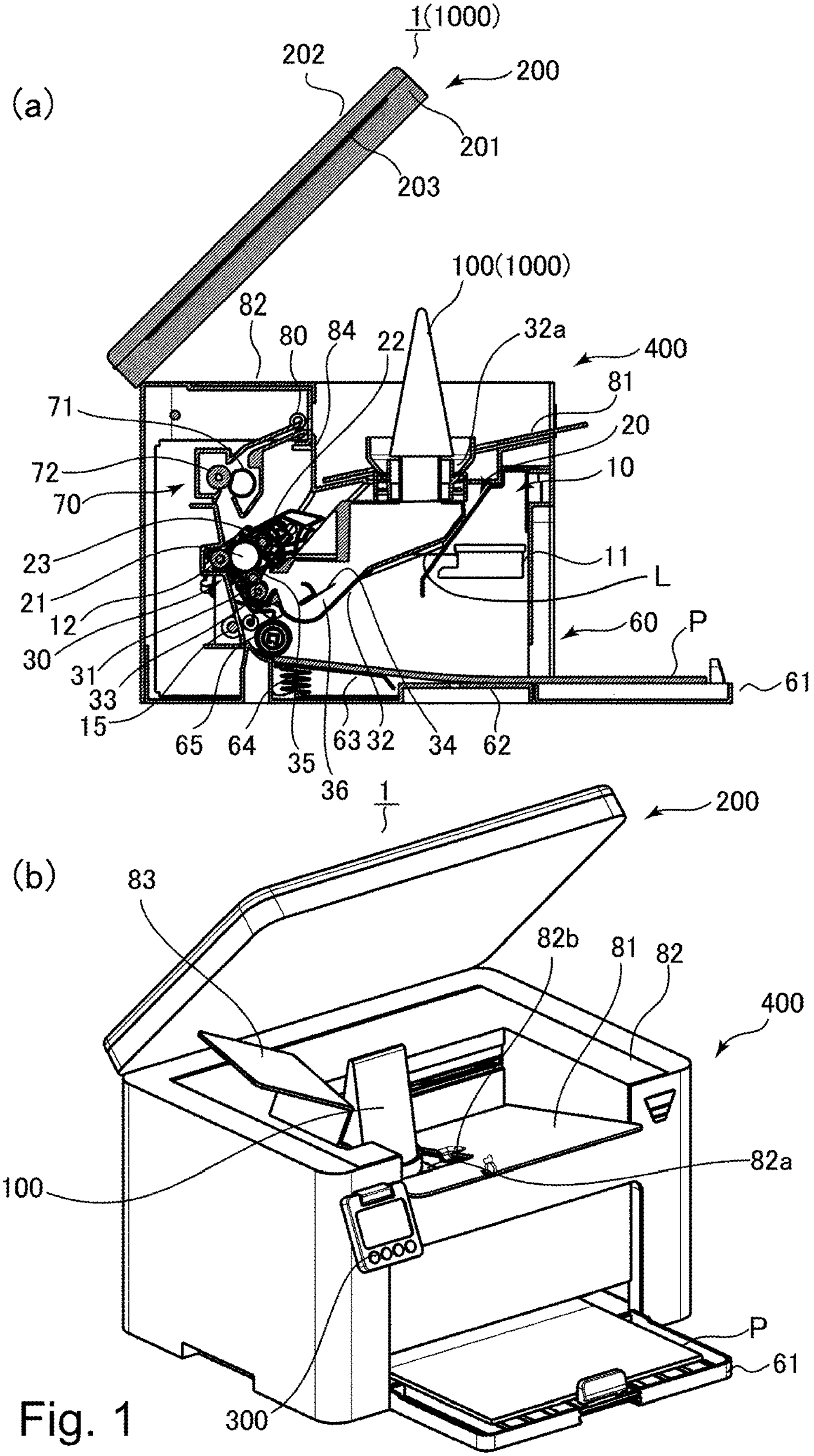
Figure 2:
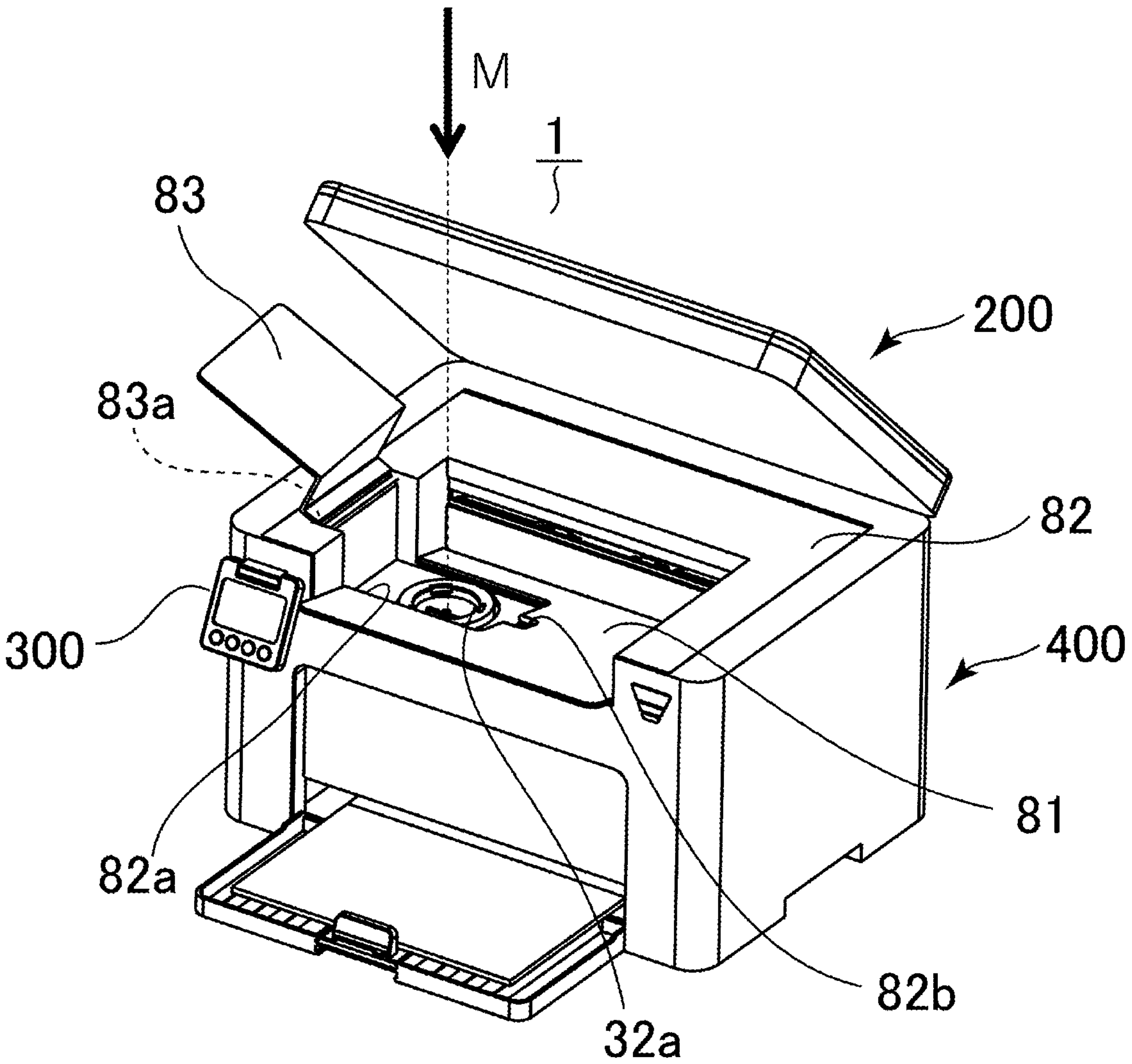
FIG. 2 is a perspective view showing an openable member and a supplying opening (port).

In the following, a first embodiment of the present invention will be described while making reference to the drawings. Part (a) of FIG. 1 is a schematic view showing a structure of an image forming apparatus 1 according to this embodiment. Part (b) of FIG. 1 is a perspective view showing the structure of the image forming apparatus 1. FIG. 2 is a perspective view showing an openable member 83 and a supplying opening 32*a*.

The image forming apparatus 1 is a monochromatic printer for forming an image on a recording material P on the basis of image information inputted from an external device. In the recording material P, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, an apparatus main assembly 400, a reading device (apparatus) 200 supported so as to be openable and closable relative to the apparatus main assembly 400, and an operating portion 300 mounted to an outer casing surface of the apparatus main assembly 400. The apparatus main assembly 400 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process unit 20 of an electrophotographic type, and a transfer roller 12 for transferring the toner image, formed on a photosensitive drum 21 of the process unit 20, onto the recording material. The process unit 20 includes the photosensitive drum 21, a charging roller 22 disposed at a periphery of the photosensitive drum 21, a pre-exposure device 23, and a developing device 30 including a developing roller 31.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage power source, so that the charging roller 22 electrically charges a surface of the photosensitive drum 21 uniformly to a predetermined potential. In this embodiment, the photosensitive drum 21 is charged to a negative polarity by the charging roller 22. The pre-exposure device 23 discharges (removes) a surface potential of the photosensitive drum 21, at a position in front of the charging portion in order to generate stable electric discharge at the charging portion.

The scanner unit 11 irradiates the photosensitive drum 21, by using a polygonal mirror, with laser light corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21 may be employed.

The developing device 30 includes the developing roller 31 for carrying a developer, a developing container 32 which is a casing for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 32 so as to oppose the photosensitive drum 21. The supplying roller 33 rotatably contacts the developing roller 31, and toner as a content accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily be required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage power source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by deposition of the toner on a surface region of the photosensitive drum 21 attenuated in charge amount by being exposed to light in an exposure step after being charged in a charging step.

Further, in this embodiment, the toner which is 6 [μm] in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing the magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

The developing container 32 is provided with an accommodating portion 36 for accommodating the toner and a stirring member 34 provided inside the accommodating portion 36. The stirring member 34 is rotated by being driven by an unshown motor, and thus stirs the toner in the developing container 32 and sends the toner toward the developing roller 31 and the supplying roller 33. Further, the stirring member 34 has a function of circulating the toner, peeled off from the developing roller 31 without being used for the development, in the developing container and of uniformizing the toner in the developing container. Incidentally, the stirring member 34 is not limited to a rotatable form. For example, a stirring member in a swingable form may also be employed.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable and closable by the apparatus main assembly 400, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the apparatus main assembly 400, and supports the recording materials P together with the tray portion 62 and the intermediary plate 63 in a state in which the front door 61 is opened relative to the apparatus main assembly 400.

The fixing portion 70 is of a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to a registration roller pair 15 by the pick-up roller 65, and is abutted against a nip of the registration roller pair 15, so that oblique movement of the recording material P is corrected. Then, the registration roller pair 15 is driven by being timed to a transfer timing of the toner image, and is conveyed toward a transfer nip formed by a transfer roller 12 and the photosensitive drum 21.

To the transfer roller 12, a transfer voltage is applied from a high transfer voltage power source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, toner particles are melted and are thereafter fixed, so that the toner image is fixed on the recording material P. The recording material P passed through the fixing portion 70 is discharged to an outside of the image forming apparatus 1 (outside of the printer) by a discharging roller pair 80, so that the discharged recording materials P are stacked on a discharge tray 81 formed at an upper portion of the apparatus main assembly 400.

The discharge tray 81 is inclined upward toward a downstream in a discharging direction of the recording material, and the recording material discharged on the discharge tray 81 slides down on the discharge tray 81, so that a trailing end of the recording material is aligned by a restricting surface 84.

The reading device 200 includes a reading unit 201 in which an unshown reading portion is built, and a platen (pressure plate) 202 supported by the reading unit 201 so as to be openable and closable. At an upper surface of the reading unit 201, an original supporting platen glass 203 which permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and thus a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

At an upper portion of the apparatus main assembly 400, a top cover 82 is provided, and at an upper surface of the top cover 82, the discharge tray 81 is formed. As shown in part (b) of FIG. 1 and FIG. 2, the openable member 83 is supported by the top cover 82 so as to be openable and closable about a rotation shaft 83*a* extending in the front-rear direction. On the discharge tray 81 of the top cover 82, an opening 82*a* which opens upward is formed.

The openable member 83 is constituted so as to be movable between a closed position where the openable member 83 covers a supplying opening 32*a* so that a toner pack 100 cannot be mounted to the developing container 32 and an open position where the supplying opening 32*a* is exposed so that the toner pack 100 can be mounted to the developing container 32. In a state in which the openable member 83 is positioned in the open position, the toner pack 100 is moved in a mounting direction M and is detachably mounted to the supplying opening 32*a*.

The openable member 83 functions as a part of the discharge tray 81 in the closed position. The openable member 83 and the opening 82*a* are formed on a left(-hand) side of the discharge tray 81. Further, the openable member 83 is opened in a left(-hand) direction by being hooked with user's finger(s) from a groove portion 82*b* provided on the top cover 82. The openable member 83 is formed in a substantially L-shape along a shape of the top cover 82.

The opening 82*a* of the discharge tray 81 opens so that the supplying opening 32*a* for toner supply formed at the upper portion of the developing container 32 is exposed, and the openable member 83 is opened, so that the user can access to the supplying opening 32*a*. Incidentally, in this embodiment, a type (direct supply type) in which the user supplies the toner from the toner pack 100 (see, parts (a) and (b) of FIG. 1), filled with the toner for supply, to the developing device 30 kept in a state in which the developing device 30 is mounted in the image forming apparatus 1 is employed. The toner pack 100 is exposed to the outside at least at a part thereof in a state in which the toner pack 100 is mounted to the mounting portion 106 (see, parts (a) and (b) of FIG. 22).

For this reason, in the case where a remaining toner amount of the process unit 20 becomes small, an operation in which the process unit 20 is taken out of the apparatus main assembly 400 and is exchanged with a new process unit becomes unnecessary, so that usability can be improved. Further, the toner can be supplied to the developing container 32 more inexpensively than exchange of entirety of the process unit 20. Incidentally, the direct supply type can be reduced in cost since there is no need to exchange various rollers and gears, and the like even when compared with the case where only the developing device 30 of the process unit 20 is exchanged. Incidentally, the image forming apparatus 1 and the toner pack 100 constitute an image forming system 1000.

[Mounting Portion]

Next, using part (a) of FIG. 3 to part (b) of FIG. 8, a constitution (structure) of the mounting portion 106 to which the toner pack 100 is mounted will be described. In this embodiment, the mounting portion 106 is a unit for mounting the toner pack 100 including the supplying opening 32*a* and is provided in the image forming apparatus 1 (see, FIG. 2). Part (a) of FIG. 3 is an exploded perspective view of the mounting portion 106. Part (b) of FIG. 3 is an exploded perspective view of the mounting portion 106 as viewed from a direction different from the direction in part (a) of FIG. 3. Part (a) of FIG. 4 and part (a) of FIG. 5 are a perspective view showing an outer appearance of the mounting portion 106 and a schematic view of the mounting portion 106 as viewed in the mounting direction M, respectively, when an operating lever 108 is in a closed position. Part (b) of FIG. 4 and part (b) of FIG. 5 are a perspective view showing an outer appearance of the mounting portion 106 and a schematic view of the mounting portion 106 as viewed in the mounting direction M, respectively, when the operating lever 108 is in an open position.

Part (a) of FIG. 6 is a perspective view of a apparatus-side shutter 109 as viewed from an upstream side of the mounting direction M. Part (b) of FIG. 6 is a perspective view of the apparatus-side shutter 109 different in point of view from part (a) of FIG. 6. Part (a) of FIG. 7 is a perspective view of a cover 110 as viewed from a downstream side of the mounting direction M. Part (b) of FIG. 7 is a perspective view of the cover 110 as viewed from an upstream side of the mounting direction M. Part (a) of FIG. 8 is a sectional view showing the mounting portion 106, and part (b) of FIG. 8 is a sectional view showing a 8B-8B cross section of part (a) of FIG. 8.

As shown in part (a) of FIG. 3 to part (b) of FIG. 4, the mounting portion 106 includes a main body base portion 2, and the main body base portion 2 includes a first frame 107, a second frame 117, and the cover 110. The cover 110 and the second frame 117 are fixed to the first frame 107. As shown in parts (a) and (b) of FIG. 7, the cover 110 includes a portion-to-be-engaged 110*h* engaged with an engaging portion 107*b* of a positioning portion 107*a* of the first frame 107 so as not to be rotated about a rotational axis B relative to the first frame 107. Further, with respect to the mounting portion M, on a side downstream of the cover 110, i.e., on a bottom side, a cut-away portion 110*k* is provided, and the cut-away portion 110*k* is provided with a first restricting surface 110*c* and a second restricting surface 110*d*. The first restricting surface 110*c* and the second restricting surface 110*d* are provided so as to oppose each other with respect to a circumferential direction about the rotational axis B.

Incidentally, the first frame 107, the cover 110, and the second frame 117 may be integrally constituted, not as separate members. As shown in parts (a) and (b) of FIG. 3, the second frame 117 is provided with an apparatus-side opening 117*a*, and the apparatus-side opening 117*a* communicates with an accommodating portion 36 (see, part (a) of FIG. 1) of the developing container 32.

Each of the operating lever 108 and the apparatus-side shutter 109 is mounted to the main body base portion 2 so as to be rotatable about the rotational axis B. The first frame 107 is provided with the positioning portion 107*a*. The positioning portion 107*a* projects inward than an inner peripheral surface 107*c* about the rotational axis B of the first frame 107 in a radial direction r of a virtual circle VC about the rotational axis B.

Further, the operating lever 108 as an operating portion is provided with a drive transmitting portion 108*a* and an operating portion 108*b*. A user is capable of rotating the operating lever 108 about the rotational axis B relative to the main body base portion 2 by operating the operating portion 108*b*. The drive transmitting portion 108*a* as a portion-to-be-engaged and a first portion-to-be-engaged is a projected portion projected inward than an inner peripheral surface about the rotational axis B of the operating lever 108 in the radial direction r of the phantom circle VC about the rotational axis B, as shown in part (a) of FIG. 3.

As shown in parts (a) and (b) of FIG. 6, the apparatus-side shutter 109 as a main apparatus shutter includes an inner peripheral surface 109*h*, a receiving opening 109*a* provided in the inner peripheral surface 109*h* and for receiving the toner from the toner pack 100, and a bottom 109*b*. The apparatus-side shutter 109 further includes a center boss 109*d* provided on the bottom 109*b*, a pack contact surface 109*g*, a rib-to-be-restricted 109*c*, and a portion 109*e* to which drive is transmitted and which is provided on the inner peripheral surface 109*h*. The portion 109*e* to which drive is transmitted, as a second portion-to-be-engaged is a projected portion projected inward in the radial direction r of the virtual circle VC about the rotational axis B as shown in part (b) of FIG. 6. To the inner peripheral surface 109*h*, an apparatus-side seal 111 is applied so as to surround the receiving opening 109*a* (see, part (b) of FIG. 4).

The apparatus-side shutter 109 is constituted so as to take a shielding position as a second shielding position and an open position as a second open position relative to the main body base portion 2. Specifically, the apparatus-side shutter 109 is, as shown in parts (a) and (b) of FIG. 6, rotated in an arrow K direction from the shielding position toward the open position and rotated in an arrow L direction from the open position toward the shielding position. Incidentally, these arrow K direction and arrow L direction are similar to arrow K direction and arrow L direction, respectively, of the pack-side shutter 103 shown in part (a) of FIG. 11. As regards the apparatus-side shutter 109, in the shielding position, the receiving opening 109*a* is shielded by the apparatus-side seal 111 and the cover 110, and in the open position, the receiving opening 109*a* is opened without being covered by the cover 110. That is, the receiving opening 109*a* does not communicate with the apparatus-side opening 117*a* of the second frame 117 when the apparatus-side shutter 109 is positioned in the shielding position, and communicates with the apparatus-side opening 117*a* of the second frame 117 when the apparatus-side shutter 109 is positioned in the shielding position.

In part (a) of FIG. 4 and part (a) of FIG. 5, the apparatus-side shutter 109 is positioned in the shielding position, and at this time, the receiving opening 109*a* of the apparatus-side shutter 109 does not communicate with the apparatus-side opening 117*a* of the second frame 117. Further, in part (b) of FIG. 4 and part (b) of FIG. 5, the apparatus-side shutter 109 is positioned in the open position, and at this time, the receiving opening 109*a* of the apparatus-side shutter 109 communicates with the apparatus-side opening 117*a* of the second frame 117. The apparatus-side shutter 109 is moved to the open position, whereby the toner can be replenished (supplied) from the toner pack 100 to the accommodating portion 36 of the developing container 32 through the receiving opening 109*a*.

Incidentally, the operating lever 108 and the apparatus-side shutter 109 are not drive-connected to each other, and therefore, even when the operating lever 108 is operated in a state in which the toner pack is not mounted, the apparatus-side shutter 109 is not rotated.

As shown in parts (a) and (b) of FIG. 8, the apparatus-side shutter 109 is constituted so as to be rotatable about the center boss 109*d* by engaging a large-diameter portion 109*d*1 of the center boss 109*d* with a cylindrical portion 110*j* of the cover 110. Here, the rib-to-be-restricted 109*c* provided on the bottom 109*b* of the apparatus-side shutter 109 is positioned between the first restricting surface 110*c* and the second restricting surface 110*d* of the cover 110. For this reason, the apparatus-side shutter 109 is rotatable only in movable range of the rib-to-be-restricted 109*c* between the first restricting surface 110*c* and the second restricting surface 110*d*. In other words, the apparatus-side shutter 109 is restricted in rotation range between the shielding position and the open position by the first restricting surface 110*c* and the second restricting surface 110*d* of the cover 110. For example, as shown in part (b) of FIG. 8, in a state in which the rib-to-be-restricted 109*c* contacts the first restricting surface 110*c*, the apparatus-side shutter 109 positioned in the shielding position cannot be rotated in the arrow L direction, i.e., a direction opposite to a direction toward the open position.

[Structure of Toner Pack]

Next, using part (a) of FIG. 9 to part (b) of FIG. 10, a basic structure of the toner pack 100 will be described. The toner pack 100 is mounted on the above-described mounting portion 106. Part (a) of FIG. 9 is side view of the toner pack 100 when the pack-side shutter 103 is in the shielding position. Part (b) of FIG. 9 is a side view of the toner pack 100 when the pack-side shutter 103 is in the open position. FIG. 10 is a exploded perspective view showing the toner pack 100 when the pack-side shutter 103.

The toner pack 100 includes, as shown in part (a) of FIG. 9 to FIG. 10, a pouch 101 accommodating the toner, a nozzle connected to the pouch 101, and the pack-side shutter 103. The nozzle 102 and the pack-side shutter 103 are connected to the pouch 101 and constitute a portion-to-be-mounted 700 mounted to the mounting portion 106.

The pouch 101 as an accommodating portion and a toner accommodating portion has flexibility, and is provided on one end side of the toner pack 100 with respect to an axial direction D1 (first direction) which is a direction of a rotational axis A of the pack-side shutter 103. That is, the pouch 101 and the nozzle 102 are arranged in the axial direction D1. The rotational axis A coincides with the rotational axis B of the apparatus-side shutter 109 when the toner pack 100 is mounted on the mounting portion 106, and therefore, in the following, both directions of the rotational axis A and the rotational axis B are referred to as the axial direction D1. The nozzle 102 and the pack-side shutter 103 are provided on the other end side of the toner pack 100 with respect to the axial direction D1. The pouch 101 is formed by subjecting, for example, a flexible polypropylene sheet to pouch processing, and has a bag shape such that one end portion 101*a* thereof opens. Incidentally, the pouch 101 may also be a bottle made of a resin material or a container made of paper or a vinyl resin material, or the like.

The nozzle 102 as a discharging portion is connected to the pouch 101, but a connecting method may be any method. For example, as the connecting method, there are a method using various adhesives such as a hot-melt adhesive, a method in which the pouch 101 is thermally welded to an outer periphery of the nozzle 102, and the like method.

The nozzle 102 includes a side surface 102*c* as an outer surface and a first outer surface extending along the rotational axis A, and the side surface 102*c* is provided with a discharging opening 102*a* constituted so as to communicate with an inside of the pouch 101 and provided with a recessed portion 102*e*. The recessed portion 102*e* is provided in a position different from the discharging opening 102*a* with respect to a rotational direction of the pack-side shutter 103. The toner accommodated in the pouch 101 is constituted so as to be discharged to an outside of the toner pack 100 through for discharging opening 102*a* by being compressed (squeezed) by the user and thus by being decreased in volume of the pouch 101. That is, inside the nozzle 102, a passage (discharge passage) (see, part (b) of FIG. 28) constituted so that the toner (content) passes toward a discharge opening (opening) 102*a* is formed. Incidentally, the nozzle 102 may be constituted by a plurality of members, not a single member. Further, the nozzle 102 may also be constituted integrally with the pouch 101. Further, a constitution in which a seal is provided between the pouch 101 and the discharge opening 102*a* of the nozzle 102 and in which the pouch 101 and the discharge opening 102*a* communicate with each other in the case where the seal is removed may be employed.

Outside the side surface 102*c* of the nozzle 102, the pack-side shutter 103 as a shutter is disposed. The pack-side shutter 103 is provided rotatably about the rotational axis A extending in the direction along the axial direction D1 and is provided with an opening 103*a*. Specifically, an inner peripheral surface 103*m* of the pack-side shutter 103 is slidably supported by an annular rib 102*m* of the nozzle 102. The pack-side shutter 103 is provided outside the side surface 102*c* with respect to the radial direction r (second direction) of the virtual circle VC about the rotational axis A. An arcuate surface of the side surface 102*c* is a curved surface projected toward an outside with respect to the radial direction r. An inside surface of the pack-side shutter 103, i.e., a surface opposing the side surface 102*c* is a curved surface extending along the side surface 102*c* of the nozzle 102, and a substantially rectangular pack-side seal 105 is mounted to the curved surface.

The pack-side shutter 103 is constituted so as to be rotatable about the rotational axis A between a shielding position (position shown in part (a) of FIG. 9) where the pack-side seal 105 shields the discharging opening 102*a* of the nozzle 102 and an open position (position shown in part (b) of FIG. 9) where the pack-side seal 105 opens the discharging opening 102*a*. When the pack-side shutter 103 is in the open position, the discharging opening 102*a* of the nozzle 102 is exposed from an opening 103*a* provided in the pack-side shutter 103.

When the pack-side shutter 103 positioned in the shielding position as a first shielding position shown in part (a) of FIG. 9 is rotated about the rotational axis A in an arrow K direction, the pack-side shutter 103 reaches the open position as a first open position shown in part (b) of FIG. 9. On the contrary, when the pack-side shutter 103 positioned in the open position is rotated in an arrow L direction, the pack-side shutter 103 reaches the shielding position. That is, the arrow K direction as a first rotational direction is a direction from the shielding position toward the open position with the rotational axis A as a center, and the arrow L direction as a second rotational direction is a direction from the open position toward the shielding position with the rotational axis A as the center. In a rotating operation of the pack-side shutter 103, the pack-side shutter 103 slides on the side surface 102*c* of the nozzle 102 through the pack-side seal 105.

Next, using FIG. 11 to FIG. 14, a detailed structure of the nozzle 102 and the pack-side shutter 103 will be described. Part (a) of FIG. 11 is an enlarged perspective view showing a neighborhood of the nozzle 102 when the pack-side shutter 103 is in the shielding position. Part (b) of FIG. 11 is a view of the toner pack 100 as viewed in the dismounting direction U in part (a) of FIG. 11. Part (a) of FIG. 12 is an enlarged perspective view showing a neighborhood of the nozzle 102 when the pack-side shutter 103 is in the open position. Part (b) of FIG. 12 is a view of the toner pack 100 as viewed in the dismounting direction U in part (a) of FIG. 12. FIG. 13 is an enlarged perspective view showing a neighborhood of the nozzle 102. FIG. 14 is a side view showing the nozzle 102 and the pack-side shutter 103. Incidentally, the dismounting direction U is a direction opposite to the mounting direction M and is a direction in which the toner pack 100 moves when the toner pack 100 is dismounted from the mounting portion 106.

As shown in parts (a) and (b) of FIG. 11, the nozzle 102 is provided with a portion-to-be-positioned 102*d* including a surface 102*d*1 and a surface 102*d*2 which are arranged in an arrow R direction with an interval from each other and which extends in a direction crossing the arrow R direction. As shown in part (b) of FIG. 11, the surface 102*d*1 and the surface 102*d*2 in this embodiments in a direction perpendicular to the arrow R direction and are parallel to each other. That is, in this embodiment, the arrow R direction is a normal direction to the surface 103*d*1 and the surface 102*d*2. The portion-to-be-positioned 102*d* engages with the positioning portion 107*a* (part (a) of FIG. 4) of the first frame 107 when the toner pack 100 is mounted on the mounting portion 106. By this, a position of the nozzle 102 relative to the first frame 107 (main body base portion 2) (a position thereof with respect to a rotational direction about the rotational axis A) is determined. In part (b) of FIG. 11, a rectilinear line CL1 passing through a center between the surface 102*d*1 and the surface 102*d*2 in the arrow R direction and extending in a direction perpendicular to the arrow R direction is in a phase such that the rectilinear line CL1 is rotated about 90° relative to a CL2 passing through a center between the rotational axis A and the discharging opening 102*a*.

Further, as shown in part (a) of FIG. 11 and FIG. 14, with respect to the direction of the rotational axis A, on a side downstream of the surface 102*d*1 and the surface 102*d*2 with respect to the mounting direction M, a surface 102*e*1 and a surface 102*e*2 is provided, respectively. The surface 102*d*1 and the surface 102*e*2 extend in the radial direction r of the virtual circle VC about the rotational axis A as shown in part (b) of FIG. 11. However, the direction in which the surface 102*e*1 and the 102*e*2 extend is not limited to the direction in this embodiment, but may be settable to a direction in which these surfaces do not interfere with the positioning portion 107*a* of the first frame 107.

As shown in FIG. 14, a side surface 102*e*3 is provided between the surface 102*d*1 and the surface 102*d*2 and between the surface 102*e*1 and the surface 102*e*2 in the arrow R direction. The side surface 102*e*3 is recessed inward from the side surface 102*c* in the radial direction r. The surface 102*d*1, the surface 102*d*2, the surface 102*e*1, the surface 102*e*2, and the side surface 102*e*3 form the recessed portion 102*e*.

Incidentally, the surface 102*d*1 and the surface 102*d*2 are not necessarily required to be parallel to each other as in this embodiment. For example, the surface 102*d*1 and the surface 102*d*2 may also be surfaces extending in the radial direction r of the virtual circle VC about the rotational axis A. In this case, the arrow R direction becomes a tangential direction of the virtual circle VC, so that the rectilinear line CL1 perpendicular to the arrow R direction is settable at an arbitrary angle relative to the rectilinear line CL2.

Further, as shown in parts (a) and (b) of FIG. 11, as viewed in a direction perpendicular to the axial direction D1 of the rotational axis A, a side surface 103*d* of the pack-side shutter 103 is provided with an opening 103*a*. As shown in part (a) of FIG. 11, when the pack-side shutter 103 is positioned in the shielding position, at least a part of the recessed portion 102*e* of the nozzle 102 is exposed from the opening 103*a*. This is because when the toner pack 100 is mounted to the mounting portion 106 in the state in which the pack-side shutter 103 is positioned in the shielding position, the surface 102*d*1 and the surface 102*d*2 of the recessed portion 102*e*, i.e., the portion-to-be-positioned 102*d* is engaged with the positioning portion 107*a*.

Further, as shown in part (b) of FIG. 11, the pack-side shutter 103 is provided with a portion 103*e* to which drive is transmitted, on a side opposite from the opening 103*a* while interposing the rotational axis A therebetween. In the case where the pack-side shutter 103 is positioned in the shielding position, the portion 103*e* to which drive is transmitted is provided on a side opposite from the recessed portion 102*e* of the nozzle while interposing the rotational axis A therebetween. The portion 103*e* to which drive is transmitted includes a surface 103*b*1, a surface 103*b*2, and a side surface 103*b*3, and is capable of engaging with the drive transmitting portion 108*a* of the operating lever 108 described later. Each of the surface 103*b*1 and the surface 103*b*2 extends in a direction perpendicular to the arrow R direction. FIG. 13 is an enlarged perspective view of a neighborhood of the pack-side shutter 103 as viewed from a side where the portion 103*e* to which drive is transmitted is disposed. Between the surface 103*b*1 and the surface 103*b*2, the side surface 103*b*3 recessed inward than the side surface 103*d* in the radial direction r.

Further, using part (a) of FIG. 11 to FIG. 14, a projected portion 102*b* of the nozzle 102 will be specifically described. As shown in parts (a) and (b) of FIG. 9, the toner pack 100 is directed to an attitude such that a second end portion side (the nozzle 102 side) is below a first end portion side (the pouch 101 side). Or, the toner pack 100 is directed so that at least a part of the nozzle 102 is positioned below the pouch 101 and so that the rotational axis A is parallel to a vertical direction. This attitude is an attitude when the toner pack 100 is mounted to the mounting portion 106 of the image forming apparatus 1. At this time, in part (a) of FIG. 11 and part (a) of FIG. 12, the mounting direction M becomes a downward direction, and the dismounting direction U becomes an upward direction.

The pack-side shutter 103 has an end surface 103*c* which is a lower end surface with respect to the vertical direction VD and which is as a shutter end surface constituting a bottom of the pack-side shutter 103. The nozzle 102 includes the projected portion 102*b* as a first projecting portion projected toward a downstream of the end surface 103*c* of the pack-side shutter 103 with respect to the mounting direction M, i.e., projected below the end surface 103*c*. As shown in part (a) of FIG. 11, the projected portion 102*b* is a cylindrical portion (portion having a cylindrical shape) about the rotational axis A. The projected portion 102*b* has a projected portion end surface 102*b*2 which is a lower end surface. The projected portion end surface 102*b*2 is provided with a hole including an inner peripheral surface 102*b*1 about the rotational axis A. Further, as shown in FIG. 10, the projected portion 102*b* is projected downward than the lower end surface 102*j* of the nozzle 102 is. Incidentally, in this embodiment, the end surface 103*c* of the pack-side shutter 103 and the end surface 102*j* of the nozzle 102 are end surfaces perpendicular to the rotational axis A, but the present invention is not limited thereto. These surfaces may only be required to be surfaces extending in a direction crossing the rotational axis A as viewed from a direction perpendicularly to the rotational axis A. Further, the projected portion 102*b* is not necessarily be provided on the nozzle 102.

Here, as shown in FIG. 15, the nozzle 102 of the toner pack 100 is provided with a claw portion 102*f* as a locking mechanism so that the pack-side shutter 103 is not rotated relative to the nozzle 102 during transportation or when the user treats the toner pack 100 alone. The pack-side shutter 103 is held in the shielding position by the claw portion 102*f*, so that the toner which is the content in the toner pack 100 can be prevented from leaking out.

FIG. 15 is a perspective view showing the claw portion 102*f* provided on the nozzle 102. Part (a) of FIG. 16 is a front view showing the claw portion 102*f*. Part (b) of FIG. 16 is a sectional view showing a 16B-16B cross section of part (a) of FIG. 16. Part (a) of FIG. 17 is a front view showing the claw portion 102*f*. Part (b) of FIG. 17 is a sectional view showing a 17B-17B cross section of part (a) of FIG. 17.

The claw portion 102*f* as a second restricting portion includes, as shown in FIG. 15 to part (b) of FIG. 16, an arm portion 102*f*3, an inclined releasing surface 102*f*1, and an abutting portion 102*f*2. The claw portion 102*f* is movable in the radial direction r of the virtual circle VC about the rotational axis A by elastic deformation of the arm portion 102*f*3. Specifically, the claw portion 102*f* is movable to a restricting position shown in part (b) of FIG. 16 and a non-restricting position which is an inside position than the restricting position with respect to the radial direction r and which is shown in part (b) of FIG. 26.

The abutting portion 102*f*2 opposes a restricting portion 103*h* of the pack-side shutter 103 positioned in the shielding position when the claw portion 102*f* is positioned in the restricting position as shown in part (b) of FIG. 16, with respect to the circumferential direction about the rotational axis A. At this time, a gap s is provided between the abutting portion 102*f*2 and the restricting portion 103*h*. Rotation of the pack-side shutter 103 in the arrow K direction is restricted by abutment of the restricting portion 103*h* against the abutting portion 102*f*2. Incidentally, a size of the gap s may be set arbitrarily, and a rotation range in which the pack-side shutter 103 is rotatable within a range of the gap s is regarded as the shielding position. That is, the rotation of the pack-side shutter 103 from the shielding position in the arrow K direction is restricted by the claw portion 102*f* positioned in the restricting position.

Further, when the claw portion 102*f* is positioned in the non-restricting position, the abutting portion 102*f*2 is positioned inside the restricting portion 103*h* of the pack-side shutter 103 with respect to the radial direction r of the virtual circle VC about the rotational axis A. For this reason, the pack-side shutter 103 is capable of being rotated about the rotational axis A without interfering with the abutting portion 102*f*2.

As shown in part (a) of FIG. 6 and part (b) of FIG. 26, the apparatus-side shutter 109 is provided with a restriction releasing rib 109*j* extending in the axial direction D1. The restriction releasing rib 109*j* is contactable to the inclined releasing surface 102*f*1 of the claw portion 102*f* when the toner pack 100 is mounted to the mounting portion 106. Incidentally, as shown in part (b) of FIG. 11, part (b) of FIG. 16, part (b) of FIG. 22 and part (b) of FIG. 26, the pack-side shutter 103 is provided with an opening 103*j*, and the opening 103*j* extends from the end surface (bottom) 103*c* toward the side surface 103*d* of the pack-side shutter 103. The restriction releasing rib 109*j* provided in the apparatus-side shutter 109 penetrates through the opening 103*j* and is capable of contacting the inclined releasing surface 102*f*1 of the claw portion 102*f* disposed inside the pack-side shutter 103.

The inclined releasing surface 102*f*1 is inclined with respect to the mounting direction M (axial direction D1) so as to extend inward in the radial direction r toward a downstream of the mounting direction M. Further, when the toner pack 100 is mounted to the mounting portion 106, the inclined releasing surface 102*f*1 converts a direction of a force received from the restriction releasing rib 109*j* by the claw portion 102*f* into an inward direction with respect to the radial direction r. By this, the claw portion 102*f* is moved inward from the restricting position to the non-restricting position in the radial direction r by pressing the inclined releasing surface 102f1 by the restriction releasing rib 109j. In other words, when the toner pack 100 is mounted to the mounting portion 106, the claw portion 102f is moved from the restricting position to non-restricting position by being pressed by the mounting portion 106.

The above-described abutting portion 102f2 of the claw portion 102f abuts against the restricting portion 103h of the pack-side shutter 103 and thus restricts rotation of the pack-side shutter 103 in the arrow K direction. Next, a constitution in which rotation of the pack-side shutter 103 in the arrow L direction opposite to the arrow K direction will be described.

As shown in part (b) of FIG. 17, the pack-side shutter 103 includes a rotation restricting rib 103k, and the nozzle 102 includes a rotation restricting surface 102k as a restricting portion and a first restricting portion opposing the rotation restricting rib 103k with respect to the circumferential direction about the rotational axis A. When the pack-side shutter 103 is positioned in the shielding position, the rotation restricting rib 103k opposes the rotation restricting surface 102k with a small gap therebetween. Then, when the pack-side shutter 103 positioned in the shielding position is intended to be rotated in the arrow L direction, the rotation restricting rib 103k abuts against the rotation restricting surface 102k, so that the rotation of the pack-side shutter 103 in the arrow L direction is restricted.

As shown in part (a) of FIG. 17 to part (b) of FIG. 18, the claw portion 102f is disposed downstream of the rotation restricting surface 102k and the rotation restricting rib 103k with respect to the mounting direction M. This is because the claw portion 102f is disposed in a position where the claw portion 102f is easily pressed by the restriction releasing rib 109j of the apparatus-side shutter 109 when the toner pack 100 is mounted to the mounting portion 106. By this, the size of the opening 103j provided in the pack-side shutter 103 can be made small, so that it is possible to not only ensure rigidity of the pack-side shutter 103 but also suppress access to the claw portion 102f by the user. Incidentally, arrangement of the claw portion 102f, the rotation restricting surface 102k, and the rotation restricting rib 103k is not limited thereto, but may also be arbitrarily changed.

As described above, in a state in which the toner pack 100 is mounted to the mounting portion 106, the rotation of the pack-side shutter 103 in each of the arrow K direction and the arrow L direction is restricted, so that the pack-side shutter 103 is easily held at the shielding position. When the pack-side shutter 103 is rotated in the arrow K direction in a state in which the toner pack 100 is mounted to the mounting portion 106 and in which the claw portion 102f is positioned in the non-restricting position, the discharging opening 102a of the nozzle 102 is exposed as shown in part (a) of FIG. 12.

Further, as shown in part (a) of FIG. 11 and FIG. 13, the pack-side shutter 103 is provided with three radial direction positioning portions 103f. These radial direction positioning portions 103f project toward an outside than the side surface 103d in the radial direction r. Each of the radial direction positioning portions 103f is disposed on a side upstream of the pack-side shutter 103 with respect to the mounting direction M.

[Cap]

Next, a cap 120 mounted on the toner pack 100 will be described using part (a) of FIG. 18 to part (b) of FIG. 20. Part (a) of FIG. 18 is a perspective view showing the cap 120 and the toner pack 100. Part (b) of FIG. 18 is a front view showing a state in which the cap 120 is mounted to the toner pack 100. Part (a) of FIG. 19 is a front view showing the cap 120. Part (b) of FIG. 19 is a perspective view showing the cap 120. Part (a) of FIG. 20 is a view of the toner pack 100 as viewed in the dismounting direction U. Part (b) of FIG. 20 is a sectional view showing a 20B-20B cross section of part (a) of FIG. 20 in the accommodating container 800.

As shown in parts (a) and (b) of FIG. 18, the cap 120 is mounted to the portion-to-be-mounted 700 as an end portion constituted by the nozzle 102 and the pack-side shutter 103 of the toner pack 100. The cap 120 is mounted to the portion-to-be-mounted 700, and thus covers at least a part of the portion-to-be-mounted 700. In this embodiment, the cap 120 is mounted to the pack-side shutter 103 by being engaged with a screw recessed portion 103g as a second screw portion provided on the side surface (outer peripheral surface) 103d of the pack-side shutter 103. The side surface 103d as a second outer surface is disposed outside than the side surface 102c of the nozzle 102 with respect to the radial direction r, and covers at least a part of the side surface 102c with respect to the circumferential direction of the virtual circle VC about the rotational axis A. The toner pack 100 and the cap 120 constitute the accommodating container 800 as a container for accommodating the content such as the toner and as a toner container. Further, the accommodating container 800 and the image forming apparatus 1 constitute an image forming system 1000 (see, part (a) of FIG. 1).

Part (a) of FIG. 29 is a view showing a first screw recessed portion 103g1. Part (b) of FIG. 29 is a view showing the first screw recessed portion 103g1 and a second screw recessed portion 103g2 in the case where the opening 103a is viewed in front. Part (c) of FIG. 29 is a view showing the second screw recessed portion 103g2. Part (d) of FIG. 29 is a bottom view showing the first screw recessed portion 103g1 and the second screw recessed portion 103g2.

As shown in parts (a) to (d) of FIG. 29, the screw recessed portion includes the first screw recessed portion 103g1 and the second screw recessed portion 103g2 which are groove portions formed in recessed shapes. These first screw recessed portion 103g1 and second screw recessed portion 103g2 are provided on the side surface 103d of the pack-side shutter 103 while avoiding the opening 103a and the portion 103e to which drive is transmitted. The first screw recessed portion 103g1 and the second screw recessed portion 103g2 are disposed so as to different in phase by about 180 degrees with respect to the circumferential direction of the virtual circle about the rotational axis A and which oppose each other with respect to radial direction r.

The first screw recessed portion 103g1 is a recessed groove which opens at an upstream end portion with respect to the arrow K direction and which is closed at a downstream end portion with respect to the arrow K direction. Further, the first screw recessed portion 103g1 includes a cap stopping portion 103g1a narrowed in groove width toward the arrow K direction. Similarly, the second screw recessed portion 103g2 is a recessed groove which opens at an upstream end portion with respect to the arrow K direction and which is closed at a downstream end portion with respect to the arrow K direction. Further, the second screw recessed portion 103g2 includes a cap stopping portion 103g2a narrowed in groove width toward a downstream of the arrow K direction. In other words, at least a part of the first screw recessed portion 103g1 and the second screw recessed portion 103g2 is constituted so as to become narrow in groove width toward the arrow K direction.

As shown in parts (a) and (b) of FIG. 19, the cap 120 includes a cap opening 120a, a bottom 120b, an inner peripheral surface 120c, an annular rib 120d, a screw projected portion 120e, and a cap outer surface 120f. The annular rib 120*d* includes an annular rib top surface 120*d*1 and extends from a surface 120*g*, opposite from the bottom 120*b*, toward a downstream, i.e., upward with respect to the dismounting direction U. The surface 120*g* as an opposing surface opposes the end surface 103*c* of the pack-side shutter 103 and the projected portion 102*b* of the nozzle 102. The screw projected portion 120*e* as a first screw portion is provided on the inner peripheral surface 120*c* as an inner surface extending along the rotational axis A and projects from the inner peripheral surface 120*c* toward the inside in the radial direction r. The screw projected portion 120*e* is capable of engaging with the screw recessed portion 103*g* of the pack-side shutter 103 by rotating the cap 120 in the arrow K direction. The screw projected portion 120*e* is engaged with the screw recessed portion 103*g*, so that the cap 120 is mounted to the pack-side shutter 103. Incidentally, the inner peripheral surface 120*c* of the cap 120 is constituted so as to surround at least a part of the side surface 103*d* of the pack-side shutter 103, and surrounds entirety of the side surface 103*d* in this embodiment.

Part (a) of FIG. 30 is a front view showing the cap 120. Part (b) of FIG. 30 is a sectional view showing a 30B-30B cross section of part (a) of FIG. 30. Part (c) of FIG. 30 is a sectional view showing a 30C-30C cross section of part (b) of FIG. 30. Part (d) of FIG. 30 is a sectional view showing a 30D-30D cross section of part (c) of FIG. 30.

The screw projected portion 120*e* includes, as shown in parts (a) to (d) of FIG. 30, a first screw projected portion 120*e*1, a second screw projected portion 120*e*2, a third screw projected portion 120*e*3, and a fourth screw projected portion 120*e*4 each formed in a projected shape from the inner peripheral surface 120*c*. These first screw projected portion 120*e*1, second screw projected portion 120*e*2, third screw projected portion 120*e*3, and fourth screw projected portion 120*e*4 are arranged and disposed in the circumferential direction of the virtual circle about the rotational axis A with a gap from each other.

The first screw projected portion 120*e*1 and the third screw projected portion 120*e*3 are disposed so as to be different in phase by about 180 degrees with respect to the circumferential direction of the virtual circle about the rotational axis A and oppose each other with respect to the radial direction r. The second screw projected portion 120*e*2 and the fourth screw projected portion 120*e*4 are disposed so as to be different in phase by about 180 degrees with respect to the circumferential direction of the virtual circle about the rotational axis A and oppose each other with respect to the radial direction r. That is, the first screw projected portion 120*e*1, the second screw projected portion 120*e*2, the third screw projected portion 120*e*3, and the fourth screw projected portion 120*e*4 are disposed so as to be different in phase by about 90 degrees with respect to the circumferential direction.

Specifically, with respect to the circumferential direction, a gap S1 is provided between the first screw projected portion 120*e*1 and the second screw projected portion 120*e*2, and a gap S2 is provided between the second screw projected portion 120*e*2 and the third screw projected portion 120*e*3. With respect to the circumferential direction, a gap S3 is provided between the third screw projected portion 120*e*3 and the fourth screw projected portion 120*e*4, and a gap S4 is provided between the fourth screw projected portion 120*e*4 and the first screw projected portion 120*e*1. That is, with respect to the circumferential direction, the first screw projected portion 120*e*1 as a first portion and the second screw projected portion 120*e*2 as a second portion are disposed adjacently with the gap S2. In other words, the first screw projected portion 120*e*1, the second screw projected portion 120*e*2, and the gap S1 are positioned on a circumference of a circle about the rotational axis A as viewed in the rotational axis A. Further, a length of a portion overlapping with the gap S1 of the circumference is longer than a length of a portion overlapping with the first screw projected portion 120*e*1 and the second screw projected portion 120*e*2 of the circumference.

Further, with respect to the circumferential direction, a length L5 of the gap S1 is longer than a length L1 of the first screw projected portion 120*e*1 and a length L2 of the second screw projected portion 120*e*2. With respect to the circumferential direction, a length L6 of the gap S2 is longer than the length L2 of the second screw projected portion 120*e*2 and a length L3 of the third screw projected portion 120*e*3. With respect to the circumferential direction, a length L7 of the gap S3 is longer than the length L3 of the third screw projected portion 120*e*3 and a length LA of the fourth screw projected portion 120*e*4. With respect to the circumferential direction, a length L8 of the gap S4 is longer than the length L4 of the fourth screw projected portion 120*e*4 and the length L1 of the first screw projected portion 120*e*1.

Further, the first screw projected portion 120*e*1, the second screw projected portion 120*e*2, the third screw projected portion 120*e*3, and the fourth screw projected portion 120*e*4 are formed in an arcuate shape as viewed in a direction (axial direction D1) of the rotational axis A. Circumferential angles θ1, θ2, θ3, and θ4 of the first screw projected portion 120*e*1, the second screw projected portion 120*e*2, the third screw projected portion 120*e*3, and the fourth screw projected portion 120*e*4, respectively, are 90 degrees or less. In this embodiment, each of the circumferential angles θ1, θ2, θ3, and θ4 is set equally.

The screw projected portion 120*e* of the cap 120 is thus formed, so that when the cap 120 is dismounted from the toner pack 100, the cap 120 is rotated in the arrow L direction by the circumferential angle θ1 (θ2, θ3, θ4). The circumferential angle θ1 (θ2, θ3, θ4) is smaller than 90 degrees and is smaller than 45 degrees in this embodiment. For this reason, the cap 120 can be easily dismounted only by rotating the cap 120 relative to the toner pack 100 by a relatively small angle.

When the cap 120 is mounted to the toner pack 100, the pack-side shutter 103 of the toner pack 100 is covered with the cap 120. In this state, when the cap 120 is rotated in the arrow K direction, the first screw recessed portion 103*g*1 and the second screw recessed portion 103*g*2 which are formed on the pack-side shutter 103 enter the gaps S1 and S3 or the gaps S2 and S4. Further, when the cap 120 is rotated in the arrow K direction, the first screw projected portion 120*e*1 and the third screw projected portion 120*e*3 of the cap 120 or the second screw projected portion 120*e*2 and the fourth screw projected portion 120*e*4 of the cap 120 engage with the first screw recessed portion 103*g*1 and the second screw recessed portion 103*g*2. The first screw recessed portion 103*g*1 and the second screw recessed portion 103*g*2 are provided with the cap stopping portions 103*g*1*a* and 103*g*2*a*, and therefore, with rotation of the cap 120 in the arrow K direction, a sliding resistance between the screw projected portion 120*e* and the screw recessed portion 103*g* becomes large. For this reason, the user is capable of easily recognizing a fastening degree of the cap 120.

Here, the case where the accommodating container 800 including the toner pack 100 and the cap 120 is directed so that the rotational axis A becomes parallel to the vertical direction VD and so that the nozzle 102 is positioned below the pouch 101 will be considered. Such an attitude of the accommodating container 800 is similar to an attitude when the toner pack 100 is mounted to the mounting portion 106. At this time, the annular rib 120*d* extends upward from the surface 120*g*. Further, the bottom 120*b* is a surface which is an end surface of the cap 120 with respect to the mounting direction M and which is perpendicular to the rotational axis A, and constitutes the bottom of the accommodating container 800 in the state in which the cap 120 is mounted to the toner pack 100. Further, the bottom 120*b* extends in the horizontal direction when the accommodating container 800 is in the attitude shown in part (b) of FIG. 18 and part (a) of FIG. 19. For this reason, the accommodating container 800 is constituted so as to be capable of being self-standing by contact of the bottom 120*b* as a surface with an installation surface.

As shown in part (b) of FIG. 20, the cap 120 is mounted on the pack-side shutter 103 of the portion-to-be-mounted 700 so as to cover the portion-to-be-mounted 700 of the toner pack 100. At this time, the annular rib 120*d* of the cap 120 is provided outside the projected portion 102*b* of the nozzle 102 with respect to the radial direction r and is provided so as to surround the projected portion 102*b*. In other words, the annular rib 120*d* as a second projected portion is disposed so as not to overlap with the projected portion 102*b* as viewed in the vertical direction (the dismounting direction U or the mounting direction M). Between the projected portion end surface 102*b*2 as an end of the projected portion 102*b* and the surface 120*g*, a gap m as a distance is provided. Between the annular rib top surface 120*d*1 as an end of the annular rib 120*d* and the end surface 103*c* of the pack-side shutter 103, a gap n as a distance is provided.

In this embodiment, magnitudes of the gaps m and n satisfy a relationship of m>n. For this reason, even when the cap 120 is externally shocked during transportation or the like, before the projected portion end surface 102*b*2 contacts the surface 120*g*, the annular rib top surface 120*d*1 contacts the end surface 103*c* of the pack-side shutter 103. That is, it is possible to reduce a degree of collision of the projected portion end surface 102*b*2 with the surface 120*g*. The projected portion end surface 102*b*2 is, as described later, abutted against a pack contact surface 109*g* (see, part (a) of FIG. 6) of the apparatus-side shutter 109 when the toner pack 100 is mounted to the mounting portion 106, and performs positioning of the toner pack 100 with respect to the mounting direction M. Accordingly, the projected portion end surface 102*b*2 is protected by the cap 120, so that positioning accuracy of the toner pack 100 relative to the mounting portion 106 with respect to the mounting direction M can be improved.

Further, as shown in FIG. 10, FIG. 18 and part (b) of FIG. 20, in the state in which the cap 120 is mounted to the toner pack 100, the cap opening 120*a* is disposed downstream of the portion-to-be-positioned 102*d* and the portion 103*e* to which drive is transmitted, with respect to the dismounting direction U. That is, the portion-to-be-positioned 102*d* and the portion 103*e* to which drive is transmitted are covered and protected by the cap outer surface 120*f* of the cap 120. Incidentally, the portion-to-be-positioned 102*d* is used for positioning the nozzle 102 relative to the first frame 107 (the main apparatus base portion 2) with respect to the rotational direction about the rotational axis A. The portion 103*e* to which drive is transmitted is used in a rotational operation of the pack-side shutter 103 by the operating lever 108 by being engaged with the drive transmitting portion 108*a* of the operating lever 108.

Further, as shown in part (b) of FIG. 20, portions of the portion-to-be-mounted 700 of the toner pack 100 other than the recessed screw recessed portion 103*g* are spaced from the inner peripheral surface 120*c* of the cap 120. By this, the respective portions of the portion-to-be-mounted 700 are protected from the shock by the cap 120.

Further, in the state in which the cap 120 is mounted to the portion-to-be-mounted 700 of the toner pack 100, even when the toner leaks out through the discharging opening 102*a* of the nozzle 102, the cap 120 becomes a saucer for the leaked toner. For this reason, the user is capable of reducing a degree of deposition of the toner on user's hand(s) or the like without touching the leaked toner. Incidentally, in the case where the content accommodated in the toner pack 100 is a liquid, the toner leaked out onto the cap 120 is dried on the cap 120 with a lapse of time. By this, it is possible to reduce a degree of deposition of the content on the user's hand(s) or the like.

[Mounting of Toner Pack to Mounting Portion]

Next, using FIG. 21 to part (b) of FIG. 26, a state when the toner pack 100 is mounted to the mounting portion 106 will be described. Part (a) of FIG. 21 is a perspective view showing the toner pack 100 to which the cap 120 is mounted. Part (b) of FIG. 21 is a perspective view showing a state in which the cap 120 is dismounted from the toner pack 100. Part (a) and (b) of FIG. 22 are perspective views each showing a state in which the toner pack 100 is being mounted onto the mounting portion 106 as viewed in a different angle. Part (a) of FIG. 23 is a sectional view showing a state in which the toner pack 100 is being mounted onto the mounting portion 106. Part (b) of FIG. 23 is a sectional view showing a state in which mounting of the toner pack 100 to the mounting portion 106 is completed.

Part (a) of FIG. 24 is a sectional view showing a 24A-24A cross section of part (a) of FIG. 23. Part (b) of FIG. 24 is a sectional view showing a 24B-24B cross section of part (a) of FIG. 23. Part (a) of FIG. 25 is a sectional view showing a 25A-25A cross section of part (b) of FIG. 23. Part (b) of FIG. 25 is a sectional view showing a 25B-25B cross section of part (b) of FIG. 25. Part (a) of FIG. 26 is a perspective view showing a state when the toner pack 100 is mounted to the apparatus-side shutter 109. Incidentally, in part (a) of FIG. 26, the pouch 101 of the toner pack 100 and the pack-side shutter 103 are omitted, so that only the nozzle 102 is illustrated. Part (b) of FIG. 26 is a sectional view showing the 17B-17B cross section of part (a) of FIG. 17 in a state in which mounting of the toner pack 100 to the mounting portion 106 is completed. Incidentally, for ease of view, in part (a) of FIG. 23 to part (b) of FIG. 25, cut surfaces of the pack-side shutter 103 and the cover 110 are hatched, and in part (b) of FIG. 26, a cut surface of the nozzle 102 is hatched.

When the toner pack 100 is mounted to the mounting portion 106, as shown in parts (a) and (b) of FIG. 21, the user first rotates the cap 120 in the arrow L direction. That is, a movement direction (arrow L direction) of the cap 120 for releasing engagement of the cap 120 with the pack-side shutter 103 is the same as a movement direction (arrow L direction) of the pack-side shutter 103 when the pack-side shutter 103 is moved from the open position to the shielding position (closed position). By this, the cap 120 is dismounted from the portion-to-be-mounted 700 of the toner pack 100 by released in engagement between the screw recessed portion 103*g* and the screw projected portion 120*e* (see, part (b) of FIG. 19). At this time, even when the pack-side shutter 103 is rotated together with the cap 120 in the arrow L direction due to friction between the screw recessed portion 103*g* and the screw projected portion 120*e*, the rotation restricting rib 103*k* and the rotation restricting surface 102*k* abut against each other (see, part (b) of FIG. 17). By this, rotation of the pack-side shutter 103 in the arrow L direction is restricted, so that only the cap 120 can be rotated in the arrow L direction relative to the pack-side shutter 103 in a rest state.

Next, the user dismounts the cap 120 from the toner pack 100, and exposed the portion 103*e* to which drive is transmitted, the projected portion 102*b*, and the portion-to-be-positioned 102*d* of the portion-to-be-mounted 700 (see, parts (a) and (b) of FIG. 11). The portion-to-be-mounted 700 of the toner pack 100 is mountable to the mounting portion 106 of the image forming apparatus 1 in a state in which the cap 120 is dismounted. Incidentally, the cap 120 can be mounted again to the portion-to-be-mounted 700 of the toner pack 100.

Then, the user mounts, as shown in parts (a) and (b) of FIG. 22, the toner pack 100 onto the mounting portion 106 in a state in which the apparatus-side shutter 109 is in the shielding position, by moving the toner pack 100, in a state in which the pack-side shutter 103 is in the shielding position, in the mounting direction M. At this time, the user positionally aligns the recessed portion 102*e* of the nozzle 102 and the opening 103*a* of the pack-side shutter 103 with the positioning portion 107*a* of the first frame 107. At the same time, the user also aligns a position of the portion 103*e*, to which drive is transmitted, of the pack-side shutter 103 with a position of the drive transmitting portion 108*a* of the operating lever 108.

After such positional alignment of the toner pack 100 with the mounting portion 106, the user gradually mounts the toner pack 100 onto the mounting portion 106 by moving the toner pack 100 in the mounting direction M. Then, as shown in part (b) of FIG. 23, with the inner peripheral surface 102*b*1 of the projected portion 102*b* of the nozzle 102, a small-diameter portion 109*d*2 of the center boss 109*d* of the apparatus-side shutter is engaged. By this, a position of the nozzle 102 relative to the apparatus-side shutter 109 with respect to the radial direction r is determined.

At this time, the drive transmitting portion 108*a* of the operating lever 108 and the portion 103*e*, to which drive is transmitted, of the pack-side shutter 103 engage with each other, as shown in part (a) of FIG. 24. At the same time, as shown in part (b) of FIG. 24, the side surfaces 110*f* and 110*g* of the cover 110 come close to or engage with the surfaces 102*e*1 and 102*e*2, respectively, forming the recessed portion 102*e* of the nozzle 102. Further, as shown in parts (a) and (b) of FIG. 24, the portion 103*e*, to which drive is transmitted, of the pack-side shutter 103 engages with the portion 109*e*, to which drive is transmitted, of the apparatus-side shutter 109 and the drive transmitting portion 108*a* of the operating lever 108. By this, the rotational axis A of the pack-side shutter 103 and the rotational axis B of the apparatus-side shutter 109 are substantially coaxial with each other.

Further, the surfaces 102*e*1 and 102*e*2 of the recessed portion 102*e* of the nozzle 102 engage with the side surfaces 110*f* and 110*g*, respectively, of the cover 110, so that the nozzle 102 of the toner pack 100 does not rotate relative to the main body base portion 2 including the cover 110. In other words, when the toner pack 100 is mounted on the image forming apparatus 1, the recessed portion 102*e* engages with the cover 110 of the image forming apparatus 1, and thus restricts rotation of the nozzle 102 relative to the image forming apparatus 1. Then, the operating lever 108, the pack-side shutter 103, and the apparatus-side shutter 109 are rotatable substantially integrally relative to the main body base portion 2 and the nozzle 102 with the rotational axis B as a center.

Specifically, when the operating lever 108 is rotated, the drive transmitting portion 108*a* of the operating lever 108 presses the surface 103*b*1 or 103*b*2 of the pack-side shutter 103, so that the pack-side shutter 103 is rotated. Thereafter, the surface 103*b*1 or 103*b*2 constituting the portion 103*e* to which drive is transmitted of the pack-side shutter 103 presses the portion 109*e*, to which drive is transmitted of the apparatus-side shutter 109, so that the apparatus-side shutter 109 is rotated.

In a state in which the mounting of the toner pack 100 to the mounting portion 106 is completed, the three radial direction positioning portions 103*f* (see, part (a) of FIG. 11 and FIG. 13) of the pack-side shutter 103 contact the inner peripheral surface 109*h* (see, part (a) of FIG. 6) of the apparatus-side shutter 109. By this, a position, with respect to the radial direction r, of the toner pack 100 on an upstream side of the mounting direction M is determined.

Further, as shown in part (a) of FIG. 25, the projected portion end surface 102*b*2 of the projected portion 102*b* of the nozzle 102 abuts against the pack contact surface 109*g*, so that a position of the toner pack 100 with respect to the mounting direction M is determined. Incidentally, as regards the positioning of the projected portion 102*b* of the nozzle 102, a constitution in which the outer peripheral surface of the projected portion 102*b* is engaged with the cylindrical portion 110*j* of the cover 110 (see, parts (a) and (b) of FIG. 6) may be employed.

Further, as shown in part (b) of FIG. 25, the portion-to-be-positioned 102*d* provided on the nozzle 102 engages with the positioning portion 107*a* of the first frame 107. By this, rotation of the nozzle 102 of the toner pack 100 relative to the first frame 107 (main assembly base portion 2) is restricted.

Further, as shown in parts (a) and (b) of FIG. 26, when the toner pack 100 is mounted to the mounting portion 106, as described above, the claw portion 102*f* provided on the nozzle 102 is moved from the restricting position to the non-restricting position (position shown in part (b) of FIG. 26). Specifically, the claw portion 102*f* is moved inward from the restricting position toward the non-restricting position in the radial direction r by pressing of the inclined releasing surface 102*f*1 by the restriction releasing rib 109*j*. By this, rotation restriction of the pack-side shutter 103 in the arrow K direction is released.

[Operation of Operating Lever]

Parts (a) of FIG. 27 is a perspective view showing the operating lever 108 positioned in the closed position and the toner pack 100. Part (b) of FIG. 27 is a perspective view showing the operating lever 108 positioned in the open position and the toner pack 100. Part (a) of FIG. 28 is a sectional view showing the toner pack 100 and the mounting portion 106 when both the apparatus-side shutter 109 and the pack-side shutter 103 are positioned in the shielding positions. Part (b) of FIG. 28 is a sectional view showing the toner pack 100 and the mounting portion 106 when both the apparatus-side shutter 109 and the pack-side shutter 103 are positioned in the open positions.

As described above, in the state in which the toner pack 100 is mounted to the mounting portion 106, the operating lever 108, the pack-side shutter 103, and the apparatus-side shutter 109 are integrally rotatable about the rotational axis B relative to the main assembly base portion 2 and the nozzle 102. In a state in which the toner pack 100 is mounted to the mounting portion 106 and in which the operating lever

108 is positioned in the closed position, as shown in part (a) of FIG. 28, the discharging opening 102*a* is shielded by the pack-side shutter 103, the pack-side seal 105, and the apparatus-side shutter 109. For this reason, the toner in the pouch 101 is constituted so that the toner cannot reach the apparatus-side opening 117*a* of the second frame 117.

As shown in parts (a) and (b) of FIG. 27, when the operating lever 108 is rotated from the closed position to the open position in an arrow Q direction in the state in which the toner pack 100 is mounted to the mounting portion 106, the pack-side shutter 103 and the apparatus-side shutter 109 are rotated from the shielding positions to the open positions.

Specifically, the drive transmitting portion 108*a* of the operating lever 108 presses the surface 103*b*1 of the pack-side shutter 103. By this, the pack-side shutter 103 is rotated together with the operating lever 108 from the shielding position to the open position. In other words, the pack-side shutter 103 is rotated from the shielding position to the open position in interrelation with the rotation of the operating lever 108 through engagement between the drive transmitting portion 108*a* and the surface 103*b*1 as an engaging portion and a first engaging portion. Further, the surface 103*b* of the pack-side shutter 103 rotated from the shielding position to the open position presses, the portion 109*e*, to which the drive is transmitted, of the apparatus-side shutter 109. By this, the apparatus-side shutter 109 is rotated together with the pack-side shutter 103 from the shielding position to the open position. In other words, the apparatus-side shutter 109 is rotated in interrelation with the rotation of the operating lever 108 through engagement between the surface 103*b*2 as a second engaging portion, and the portion 109*e* to which drive is transmitted.

Then, as shown in part (b) of FIG. 28, the discharging opening 102*a* of the nozzle 102 is opened by movement of the pack-side shutter 103, the pack-side seal 105, and the apparatus-side shutter 109. That is, the pouch 101 of the toner pack 100 and the accommodating portion 36 communicate with each other by way of the discharging opening 102*a*, the receiving opening 109*a*, and the apparatus-side opening 117*a*. The toner in the pouch 101 is supplied together with the air to the accommodating portion 36 of the developing container 32 by way of the discharging opening 102*a*, the receiving opening 109*a*, and the apparatus-side opening 117*a* by compression of the pouch 101 by the user.

The user rotates the operating lever 108 from the open position to the closed position when the supply of the toner from the toner pack 100 to the developing container 32 is completed. When the operating lever 108 is rotated from the open position to the closed position, the drive transmitting portion 108*a* of the operating lever 108 presses the surface 103*b*2 of the pack-side shutter 103. By this, the pack-side shutter 103 is rotated together with the operating lever 108 from the open position to the shielding position. Further, the surface 103*b*1 of the pack-side shutter 103 rotated from the open position to the shielding position presses, the portion 109*e*, to which the drive is transmitted, of the apparatus-side shutter 109. By this, the apparatus-side shutter 109 is rotated together with the pack-side shutter 103 from the open position to the shielding position. Thus, in the case where the operating lever 108 is rotated from the open position to the shielding position, the surface 103*b*2 constitutes the engaging portion, and the surface 103*b*1 constitutes the second engaging portion.

In this state, the user pulls out the toner pack 100 from the mounting portion 106, so that a supplying operation of the toner is completed. To the toner pack 100 after the supplying operation is completed, the user may mount the cap 120 or may separately dispose of the cap 120 and the toner pack 100.

As described above, according to this embodiment, it is possible to provide one form of the accommodating container 800 mountable to the image forming apparatus 1. Especially, the cap 120 is mounted to the portion-to-be-mounted 700 of the toner pack 100, so that the portion-to-be-mounted 700 can be protected. Particularly, the cap 120 is capable of protecting the portion 103*e* to which drive is transmitted, of the portion-to-be-mounted 700, the projected portion 102*b*, and the portion-to-be-positioned 102*d*. The portion 103*e* to which drive is transmitted, the projected portion 102*b*, and the portion-to-be-positioned 102*d* are used for positioning of the toner pack 100 (the nozzle 102) relative to the mounting portion 106 and for the rotational operation of the pack-side shutter 103 by the operating lever 108. For this reason, the portion 103*e* to which drive is transmitted, the projected portion 102*b*, and the portion-to-be-positioned 102*d* are prevented from being broken by an external shock (impact), or the like before the toner supply, so that the toner supply from the toner pack 100 toward the developing container 32 can be appropriately performed.

Second Embodiment

Next, although a second embodiment of the present invention will be described, in the second embodiment, a cap is configured so as to be mountable to a nozzle. For this reason, constituent elements similar to those in the first embodiment will be omitted from illustration or will be described by adding the same reference numerals or symbols to the figures.

FIG. 31 is an exploded perspective view showing a cap 130 and a nozzle 140. A portion-to-be-mounted 700B of a toner pack 100B in this embodiment includes the nozzle 140 and an unshown pack-side shutter as shown in FIG. 31. The pack-side shutter in this embodiment is one prepared by omitting the screw recessed portion 103*g* from the pack-side shutter 103 in the first embodiment, and therefore will be omitted from description.

The nozzle 140 includes a projected portion 140*b*, and an inner peripheral surface of the projected portion 140*b* is provided with a screw recessed portion 140*g*. The cap 130 includes a boss portion 130*h* projected from a surface 120*g* along a rotational axis A. At a side surface of the boss portion 130*h*, a screw projected portion 130*g* engageable with a screw recessed portion 140*g* is provided. Incidentally, the nozzle 140 has a constitution similar to the constitution of the nozzle 102 in the first embodiment except for the projected portion 140*b*. Further, the cap 130 has a constitution similar to the constitution of the cap 120 in the first embodiment except for the boss portion 130*h*.

In a state in which the screw projected portion 130*g* and the screw recessed portion 140*g* are contacted to each other, when the cap 130 is rotated in an arrow K direction, the screw projected portion 130*g* and the screw recessed portion 140*g* are engaged with each other, so that the cap 130 is mounted to the nozzle 140. On the other hand, when the cap 130 is rotated in an arrow L direction, engagement between the screw projected portion 130*g* and the screw recessed portion 140*g* is released, so that the cap 130 is dismounted from the nozzle 140.

Also, in this embodiment, by mounting the cap 130 to the portion-to-be-mounted 700 of the toner pack 100B, the portion-to-be-mounted 700 can be protected.

Third Embodiment

A third embodiment of the present invention will be described. Constituent elements similar to those in the first embodiment will be omitted from illustration or will be described by adding the same reference numerals or symbols to the figures.

Part (a) of FIG. 32 is a front view of a pack-side shutter 303. Part (b) of FIG. 32 is a plan view of the pack-side shutter 303. Part (c) of FIG. 32 is a bottom view of the pack-side shutter 303. Part (d) of FIG. 32 is a perspective view of the pack-side shutter 303. Part (a) of FIG. 33 is a front view of a cap 320. Part (b) of FIG. 33 is a plan view of the cap 320. Part (c) of FIG. 33 is a bottom view of the cap 320. Part (d) of FIG. 34 is a perspective view of the cap 320. Part (a) of FIG. 34 is a view of an accommodating container 800 as viewed along a rotational axis A from a cap 320 side. Part (b) of FIG. 34 is a sectional view showing a 34B-34B cross section of part (a) of FIG. 34. FIG. 35 is a bottom view showing the cap 320 and the pack-side shutter 303 when the cap 320 is dismounted from the pack-side shutter 303.

The pack-side shutter 303 in this embodiment will be described. As shown in parts (a) to (d) of FIG. 32, the pack-side shutter 303 includes a recessed portion **303*n* (portion-to-be-engaged) 303*n*. The recessed portion 303*n* is a groove portion provided along the circumferential direction about the rotational axis A at a side surface (outer peripheral surface) 303*d* of the pack-side shutter 303. The recessed portion 303*n* includes a first recessed portion 303*n*1 (first portion-to-be-engaged) and a second recessed portion 303*n*2 (second portion-to-be-engaged). The first recessed portion 303*n*1 and the second recessed portion 303*n*2 are provided in a region 303*a*1 and a region 303*a*2 of the side surface 303*d*, respectively, which are on opposite sides to each other with respect to the rotational axis A in a direction perpendicular to the rotational axis A as viewed in a direction of the rotational axis A. Further, the first recessed portion 303*n*1 and the second recessed portion 303*n*2 are provided at an end portion of the side surface 303*d* on a side close to the pouch 101** in the direction of the rotational axis A.

Next, the cap 320 in this embodiment will be described. The cap 320 is constituted so as to be dismounted from the pack-side shutter 303 by being linearly moved relative to the pack-side shutter 303 in a direction which is an axial direction D1 (first direction, the direction of the rotational axis A) and in which the cap 320 is separated from the pouch 101. That is, a dismounting direction V of the cap is a direction along the direction (axial direction D1) of the rotational axis A.

The cap 320 is, as shown in parts (a) to (d) of FIG. 33, a cylindrical member about the rotational axis A and includes a projected portion **320*h* (engaging portion) and a portion-to-be-urged (pressed) 320*j*. The projected portion 320*h* is provided on an inner peripheral surface 320*c* about the rotational axis A. The projected portion 320*h* extends along a circumferential direction about the rotational axis A of the inner peripheral surface 320*c* and projected from the inner peripheral surface 320*c* toward an inside in the radial direction r with the rotational axis A as a center. The projected portion 320*h* includes a first projected portion 320*h*1 (first engaging portion) and a second projected portion 320*h*2 (second engaging portion). The first projected portion 320*h*1 and the second projected portion 320*h*2 are provided in a region 320*al* and a region 320*a*2 of the inner peripheral surface 302*c*, respectively, which are on opposite sides to each other with respect to the rotational axis A in a direction perpendicular to the rotational axis A as viewed in the direction of the rotational axis A. Further, the first projected portion 320*h*1 and the second projected portion 320*h*2 are provided at an end portion of the cap 320 on a side (side where there is an opening of the cap) close to the pouch 101 in the direction of the rotational axis A. The first projected portion 320*h*1 and the second projected portion 320*h*2 may preferably be provided in positions closer to an opening 320*a* of the cap 320 than to a bottom 320*b* of the cap 320**.

The portion-to-be-urged **320*j* is provided on an outer peripheral surface 320*f* of the cap 320 about the rotational axis A, and has a projected shape projected from the outer peripheral surface 320*f* in the radial direction r. The portion-to-be-urged 320*j* includes a first portion-to-be-urged 320*j*1 and a second portion-to-be-urged 320*j*2. The first portion-to-be-urged 320*j*1 and the second portion-to-be-urged 320*j*2 are provided in a region 320β1 and a region 320β2 of the outer peripheral surface 320*f*, respectively, which are on opposite sides to each other with respect to the rotational axis A in a direction perpendicular to the rotational axis A as viewed in the direction of the rotational axis A. As shown in parts (b) and (c) of FIG. 33, each of the region 320β1 and the region 320β2 of the outer peripheral surface 320*f* is provided between the region 320α1 and the region 320α2 of the inner peripheral surface with respect to the circumferential direction about the rotational axis A. That is, each of the first portion-to-be-urged 320*j*1 and the second portion-to-be-urged 320*j*2 is provided between the first projected portion 320*h*1 and the second projected portion 320*h*2** with respect to the circumferential direction about the rotational axis A.

Incidentally, in this embodiment, if the user is capable of visually recognizing the portion-to-be-urged **320*j*, the portion-to-be-urged 320*j* may also be a recessed-shape portion provided on the outer peripheral surface 320*f*, a seal stuck to the outer peripheral surface 320*f*, or a pattern or an illustration drawn on the outer peripheral surface 320*f***.

Further, the outer peripheral surface **320*f* of the cap 320 is provided with an arrow-shaped projected portion 320*g* directed in the dismounting direction V. The arrow-shaped projected portion 320*g* is provided between the first portion-to-be-urged 320*j*1 and the second portion-to-be-urged 320*g*2 with respect to the circumferential direction. This arrow-shaped projected portion 320*g* may be constituted by a projected-shape portion or a recessed-shape portion, but may also be free from unevenness or may be a seal or the like. The user visually recognize the arrow-shaped projected portion 320*g*, and thus is capable of recognizing the dismounting direction of the cap 320**.

Part (a) of FIG. 34 is a view of an accommodating container 800 in a state in which the cap 320 is mounted to the pack-side shutter 303, as viewed from a bottom side. Part (b) of FIG. 34 includes a sectional view showing a 34B-34B cross section of part (a) of FIG. 34 and a partially enlarged view thereof.

In a state in which the cap 320 is mounted to the pack-side shutter 303, as shown in part (b) of FIG. 34, the first projected portion **320*h*1 and the second projected portion 320*h*2 of the cap 320 are engaged with the first recessed portion 303*n*1 and the second recessed portion 303*n*2 of the pack-side shutter 303, respectively. As regards the cap 320, the first projected portion 320*h*1 and the second projected portion 320*h*2 thereof are engaged with the first recessed portion 303*n*1 and the second recessed portion 303*n*2 of the pack-side shutter 303, respectively, so that movement of the cap 320 relative to the pack-side shutter 303** in the dismounting direction V is restricted.

Here, a manner of dismounting the cap 320 will be described with reference to FIG. 35. Each of the first projected portion **320*h*1 and the second projected portion 320*h*2 is disposed so as to be deviated in phase from the first portion-to-be-urged 320*j*1 and the second portion-to-be-urged 320*j*2 by about 90 degrees in the circumferential direction. When the cap 320 is dismounted from the pack-side shutter 303 (toner pack 100), the user urges (presses) the portion-to-be-urged 320*j* of the cap 320 toward an inside with respect to the radial direction r. By this, the cap is deformed in an elliptical shape indicated by a broken line, so that the first projected portion 320*h*1 and the second projected portion 302*h*2 of the cap 320 are separated from the first recessed portion 303*n*1 and the second recessed portion 303*n*2 of the pack-side shutter 303, respectively, in the radial direction r. By this, engagement between the first projected portion 320*h*1 and the first recessed portion 303*n*1 and engagement between the second projected portion 302*h*2 and the second recessed portion 303*n*2 are released, so that the cap 320 can be dismounted from the pack-side shutter 303. In other words, in the case where the first portion-to-be-urged 320*j*1 and the second portion-to-be-urged 320*j*2 are urged toward the rotational axis A, the first projected portion 320*h*1 is separated from the first recessed portion 303*n*1 and thus the engagement of these portions is released, and the second projected portion 320*h*2 is separated from the second recessed portion 303*n*2 and thus the engagement of these portions is released. Thus, the user urges the first portion-to-be-urged 320*j*1 and the second portion-to-be-urged 320*j*2 with his/her thump and forefinger, so that the user is capable of easily dismounting the cap 320 from the toner pack 100** only by an operation with his/her one hand.

Incidentally, in this embodiment, the portion-to-be-urged of the pack-side shutter 303 was the recessed portion, and the engaging portion of the cap 320 was the projected portion, but the present invention is not limited thereto. The portion-to-be-urged of the pack-side shutter 303 may be a projected portion, and the engaging portion of the cap 320 may be a recessed portion. That is, it may only be required that either one of the engaging portion of the cap 320 and the portion-to-be-urged of the pack-side shutter 303 in provided with the projected portion, and the other is provided with the recessed portion.

Fourth Embodiment

A fourth embodiment of the present invention will be described. Constituent elements similar to those in the first embodiment will be omitted from illustration or will be described by adding the same reference numerals or symbols to the figures.

Part (a) of FIG. 36 is a front view showing a pack-side shutter 403. Part (b) of FIG. 36 is a perspective view showing the pack-side shutter 403. Part (a) of FIG. 37 is a front view showing a cap 420. Part (b) of FIG. 37 is a perspective view showing the cap 420. FIG. 38 is a front view showing the cap 420 and the pack-side shutter 403 when the cap 420 is dismounted from the pack-side shutter 403. The pack-side shutter 403 includes a projection **403*p* as a portion-to-be-engaged as shown in parts (a) and (b) of FIG. 36. The projection 403*p* has a projected shape projecting from a side surface 403*d* of the pack-side shutter 403** with the rotational axis A as a center toward the outside in the radial direction about the rotational axis A.

As shown in parts (a) and (b) of FIG. 37, the cap 420 includes a biting portion **420*k* as an engaging portion. The biting portion 420*k* is provided so as to project from an opening 420*a* of the cap 420 in a direction opposite to the dismounting direction V. The biting portion 420*k* includes a first engaging arm 420*k*1 and a second engaging arm 420*k*2. The second engaging arm 420*k*2 is disposed in a position different from a position of the first engaging arm 420*k*1 with respect to the circumferential direction about the rotational axis A of the cap 420. The first engaging arm 420*k*1 and the second engaging arm 420*k*2 are constituted so as to be elastically deformed in a direction in which these arms are separated from each other in the circumferential direction. In a state in which the cap 420 is mounted to the pack-side shutter 403 (toner pack 100), the projection 403*p* of the pack-side shutter 403 is bitten (caught) between the first engaging arm 420*k*1 and the second engaging arm 420*k*2 of the cap 420. In other words, the projection 403*p* of the pack-side shutter 403 is sandwiched between the first engaging arm 420*k*1 and the second engaging arm 420*k*2 of the cap 420. By this, movement of the cap 420 relative to the pack-side shutter 403** in the dismounting direction V is restricted.

As shown in FIG. 38, when the cap 420 is intended to be moved in the dismounting direction V relative to the pack-side shutter 403, the first engaging arm **420*k*1 and the second engaging arm 420*k*2 of the biting portion 420*k* are elastically deformed in a direction in which these portions are separated from each other by receiving a force from the projection 403*p*. By this, the first engaging arm 120*k*1 and the second engaging arm 120*k*2 get over the projection 403*p* of the pack-side shutter 403, so that the cap 420 is dismounted from the pack-side shutter 403. In other words, the cap 420 is constituted so as to be linearly moved in the dismounting direction V relatively to the pack-side shutter 403, whereby engagement of the cap 420 with the pack-side shutter 403 is released. The biting portion 420*k* of the projection 403*p* is constituted so as to be capable of being visually recognized by the user, so that the user can easily dismounting the cap 420 from the pack-side shutter 403**.

Further, the outer peripheral surface **420*f* of the cap 420 is provided with an arrow-shaped projected portion 420*g* directed in the dismounting direction V. The arrow-shaped projected portion 420*g* is provided between the first engaging arm 120*k*1 and the second engaging arm 120*k*2 with respect to the circumferential direction. This arrow-shaped projected portion 420*g* may be constituted by a projected-shape portion or a recessed-shape portion, but may also be free from unevenness or may be a seal or the like. The user visually recognize the arrow-shaped projected portion 420*g*, and thus is capable of recognizing the dismounting direction of the cap 420**.

Fifth Embodiment

A fifth embodiment of the present invention will be described. Constituent elements similar to those in the first embodiment will be omitted from illustration or will be described by adding the same reference numerals or symbols to the figures.

Part (a) of FIG. 39 is a front view of a cap 520 according to this embodiment. Part (b) of FIG. 39 is a respective view of the cap 520. FIG. 40 is a plan view showing the cap 520 and the pack-side shutter 503 when the cap 520 is dismounted from the pack-side shutter 503.

The cap 520 includes a slit **520*m* as shown in parts (a) and (b) of FIG. 39. The slit 520*m* is provided in a side wall 520*l*** which is the side wall 520*l* of the cap 520 with the rotational axis A (center axis, first direction) as a center and which extends in the direction of the rotational axis A. The slit 520*m* penetrates through the side wall 520*l* from an inside toward an outside of the side wall 520*l* in the radial direction r with the rotational axis A as a center, and extends from an opening 520*a* to a bottom 520*b* in the direction of the rotational axis A.

A dismounting direction W of the cap 520 is a direction crossing (direction perpendicular to) the rotational axis A as shown in FIG. 40. When the user moves the cap 520 in the dismounting direction W for dismounting the cap 520 from the pack-side shutter 503, an end portion of the side wall 520*l* forming the slit 520*m* of the cap 520 receives a force from the pack-side shutter 503. By this, the side wall 520*l* is elastically deformed, so that a width of the slit 520*m* is expanded as indicated by a broken line of FIG. 40. Then, the slit 520*m* gets over the pack-side shutter 503, so that the user is capable of dismounting the cap 520 from the pack-side shutter 503. The slit 520*m* is a portion where when the cap 520 is dismounted, the pack-side shutter 503 and the nozzle 102 passes from an inside toward the outside of the cap 520.

Thus, the slit 520*m* is provided in the side wall 520*l* of the cap 520, so that the user easily recognizes the dismounting direction W and thus is capable of easily dismounting the cap 520.

Further, in order to make the user easy to recognize the dismounting direction W, as shown in part (b) of FIG. 39, on the bottom of the cap 520, an arrow-shaped projected portion 520*g* directed in the dismounting direction W is provided. This arrow-shaped projected portion 520*g* may be constituted by a projected-shape portion or a recessed-shape portion, but may also be free from unevenness or may be a seal or the like. Further, the arrow-shaped projected portion may also be provided on an outer peripheral surface 520*f* of the cap 520, not on the bottom 520*b*.

Other Embodiment

Incidentally, if the cap is capable of protecting the portion-to-be-mounted of the toner pack, the cap may also be mounted to any member of the toner pack without limiting the portion-to-be-mounted to the nozzle or the pack-side shutter.

Further, in either of the above-described embodiments, the toner was accommodated in the pouch 101 of the toner pack 100, but the present invention is not limited thereto. For example, as the content accommodated in the pouch 101, other than the toner, ink may be used, and powder or a liquid is capable of being accommodated in the pouch 101. Further, the powder accommodatable in the pouch 101 is not limited to the toner. In the case where the ink is accommodated in the pouch 101, the toner pack 100 may be mounted to an image forming apparatus of an ink jet type.

Further, in either of the above-described embodiments, the pack-side shutter 103 and the apparatus-side shutter 109 were constituted so as to be rotatable about the rotational axes A and B between the shielding position and the open position, but the present invention is not limited thereto. For example, the pack-side shutter 103 and the apparatus-side shutter 109 may be constituted so as to be movable between the shielding position and the open position by being linearly moved parallel to the mounting direction M.

Further, in either of the above-described embodiments, the pack-side shutter 103 was constituted so as to open the discharging opening 102*a* of the nozzle 102 only in the open position, but the present invention is not limited thereto. For example, the pack-side shutter 103 may be a rotatable member which opens the discharging opening 102*a* of the nozzle 102 irrespective of a rotation position. At that time, the discharging opening 102*a* of the nozzle 102 may employ a constitution in which the discharging opening 102*a* is closed by a seal when the toner pack 100 is not yet mounted to the mounting portion 106 and then the seal is removed by a mounting operation of the toner pack 100 onto the mounting portion 106 or after the toner pack 100 is mounted. Further, a constitution in which the pack-side shutter 103 of the toner pack 100 is omitted may be employed.

Further, in either of the above-described embodiments, the pack-side shutter 103 was provided with the screw recessed portion 103*g* which is a female screw, and the cap 120 was provided with the screw projected portion 120*e* which is a male screw, but the present invention is not limited thereto. For example, the pack-side shutter 103 may be provided with the male screw, and the cap 120 may be provided with the female screw. Similarly, also in the second embodiment, the nozzle 140 may be provided with the male screw, and the cap 130 may be provided with the female screw. That is, it may only be required that either one of the cap 120 and the pack-side shutter 103 is provided with the projected portion, and the other of the cap 120 and the pack-side shutter 103 is provided with the recessed portion engageable with the projected portion.

Further, the above-described embodiments may also be arbitrarily combined with each other.

Further, disclosure of this embodiment includes the following constitution examples and method examples.

(Constitution 1)

A container for use with an image forming apparatus and for accommodating a content of powder or a liquid, the container comprising:

- an accommodating portion configured to accommodate the content;
- an end portion including a discharging portion which includes a discharge opening for permitting discharge of the content to an outside of the container and a passage configured so that the content passes through the passage toward the discharge opening, and including a shutter configured to be movable relative to the discharging portion between a shielding position where the shutter shields the discharge opening and an open position where the shutter opens the discharge opening; and
- a cap mounted to the end portion so as to cover at least a part of the end portion and configured to be dismounted from the end portion by being rotated relative to the end portion.

(Constitution 2)

A container according to Constitution 1, wherein the shutter is configured to be rotatable about a rotational axis between the shielding position and the open position, and

- wherein the discharging portion has an outer surface extending along the rotational axis and provided with the discharge opening.

(Constitution 3)

A container according to Constitution 2, wherein in a case that the container is directed so that the rotational axis is parallel to a vertical direction and so that the discharging portion is below the accommodating portion,

- the shutter has a shutter end surface which is a lower end surface in the vertical direction,
- the discharging portion includes a first projecting portion projecting downward than the shutter end surface, and the cap includes an opposing surface opposing the shutter end surface and the first projecting portion and includes a second projecting portion which is disposed so as not to overlap with the first projecting portion as viewed in the vertical direction and which extends upward from the opposing surface toward the shutter end surface.

(Constitution 4)

A container according to Constitution 3, wherein a distance between an end of the second projecting portion of the cap and the shutter end surface is shorter than a distance between an end of the first projecting portion of the discharging portion and the opposing surface of the cap.

(Constitution 5)

A container according to Constitution 3 or 4, wherein the second projecting portion is provided outside the first projecting portion of the discharging portion with respect to a radial direction of a virtual circle about the rotational axis and is provided so as to surround the first projecting portion.

(Constitution 6)

A container according to any one of Constitutions 3 to 5, wherein the container is configured to be capable of self-standing with a surface thereof, as a bottom surface, on a side opposite from the opposing surface of the cap.

(Constitution 7)

A container according to any one of Constitutions 2 to 5, wherein the cap has a surface configured to become a bottom surface for self-standing the container.

(Constitution 8)

A container according to any one of Constitutions 2 to 7, wherein the cap is mounted to the discharging portion and is configured to be dismounted from the discharging portion by being rotated relative to the discharging portion.

(Constitution 9)

A container according to any one of Constitutions 2 to 7, wherein the cap is mounted to the shutter and is configured to be dismounted from the shutter by being rotated relative to the shutter.

(Constitution 10)

A container according to Constitution 9, wherein the shutter is rotatable about the rotational axis in a first rotational direction from the shielding position toward the open position and in a second rotational direction opposite to the first rotational direction, wherein the discharging portion includes a first restricting portion for restricting rotation of the shutter, positioned in the shielding position, in the second rotational direction, and wherein the cap is dismounted from the shutter by being rotated in the second rotational direction about the rotational axis relative to the shutter.

(Constitution 11)

A container according to Constitution 10, wherein the discharging portion includes a second restricting portion movable to a restricting position where the second restricting portion restricts rotation of the shutter, positioned in the shielding position, in the first rotational direction and to a non-restricting position where the second restricting portion does not restrict the rotation of the shutter.

(Constitution 12)

A container according to Constitution 11, wherein the end portion of the container is detachably mountable to a mounting portion of the image forming apparatus in a state in which the cap is dismounted, and wherein the second restricting portion is moved from the restricting position to the non-restricting position by being urged by the mounting portion when the container is mounted to the mounting portion of the image forming apparatus.

(Constitution 13)

A container according to any one of Constitutions 10 to 12, wherein in a case that the outer surface of the discharging portion is a first outer surface, the shutter includes a second outer surface extending along the rotational axis and a second screw portion provided at the second outer surface, the cap includes an inner surface which is an inner surface extending along the rotational axis and which surrounds at least a part of the second outer surface with respect to a circumferential direction of a virtual circle about the rotational axis and includes a first screw portion provided at the inner surface, and the cap is mounted to the shutter by engagement of the first screw portion with the second screw portion.

(Constitution 14)

A container according to Constitution 13, wherein the first screw portion includes a first portion and a second portion which are adjacent to each other and disposed with a gap with respect to the circumferential direction, and wherein as viewed in a direction of the rotational axis, with respect to the circumferential direction, a length of the gap is longer than a length of the first portion and a length of the second portion.

(Constitution 15)

A container according to Constitution 14, wherein the first portion and the second portion are formed in an arcuate shape as viewed in the direction of the rotational axis, and a circumferential angle of each of the first portion and the second portion is 90 degrees or less.

(Constitution 16)

A container according to any one of Constitutions 13 to 15, wherein the first screw portion is formed in a projection shape from the inner surface, wherein the second screw portion is a groove portion formed in a recessed groove shape at the second outer surface, and wherein at least a part of the second screw portion is configured to become narrow in width of a groove toward the first direction.

(Constitution 17)

A container according to any one of Constitutions 1 to 16, wherein the accommodating portion has a bag shape of which one end portion is open, and wherein the one end portion of the accommodating portion is connected to the discharging portion.

(Constitution 18)

A container according to any one of Constitutions 1 to 17, wherein the accommodating portion is constituted by polypropylene and has flexibility.

(Constitution 19)

A container for use with an image forming apparatus and for accommodating a content of powder or a liquid, the container comprising:

an accommodating portion configured to accommodate the content;

an end portion including a discharging portion which includes a discharge opening for permitting discharge of the content to an outside of the container and a passage configured so that the content passes through the passage toward the discharge opening, and including a shutter configured to be movable relative to the discharging portion between a shielding position where the shutter shields the discharge opening and an open position where the shutter opens the discharge opening; and a cap mounted to the shutter so as to cover at least a part of the end portion.

(Constitution 20)

A toner container according to Constitution 19, wherein the cap has a surface configured to become a bottom surface for self-standing the container.

(Constitution 21)

A container according to Constitution 19 or 20, wherein the accommodating portion has a bag shape of which one end portion is open positioned, and wherein the one end portion of the accommodating portion is connected to the discharging portion.

(Constitution 22)

A container according to any one of Constitutions 19 to 21, wherein the accommodating portion is constituted polypropylene and has flexibility.

(Constitution 23)

A toner container comprising:

a toner accommodating portion configured to accommodate toner;

a nozzle communicating with the toner accommodating portion and aligned with the toner accommodating portion in a first direction, the nozzle being provided with an opening forming a part of a discharging passage for permitting discharge of the toner to an outside of the toner container;

a shutter configured to move between an open position where the shutter opens the opening and a closed position where the shutter closes the opening; and a cap mounted to the shutter so as to cover at least a part of the shutter and configured to engage with the shutter and to disengage with the shutter, wherein the opening of the nozzle is provided at a side surface extending along the first direction of the nozzle, and wherein in a second direction perpendicular to the first direction, the shutter is provided outside the side surface of the nozzle.

(Constitution 24)

A toner container according to Constitution 23, wherein a movement direction of the cap for releasing the engagement of the cap with the shutter is the same as a movement direction of the shutter when the shutter is moved from the open position to the closed position.

(Constitution 25)

A toner container according to Constitution 24, wherein the nozzle includes a restricting portion for restricting movement of the shutter, positioned in the closed position, in a direction from the open position toward the closed position.

(Constitution 26)

A toner container according to any one of Constitutions 23 to 25, wherein the cap is configured so that the engagement of the cap with the shutter is released by being rotated about a rotational axis, extending in the first direction, relative to the shutter.

(Constitution 27)

A toner container according to Constitution 23, wherein the cap is configured so that the engagement of the cap with the shutter is released by being linearly moved relative to the shutter in a direction which is the first direction and in which the cap is separated from the toner accommodating portion.

(Constitution 28)

A toner container according to any one of Constitutions 23 to 27, wherein the shutter is configured so as to rotate about a rotational axis extending in the first direction between the open position and the closed position and includes an outer peripheral surface with the rotational axis as a center and a portion-to-be-engaged provided at the outer peripheral surface, wherein the cap is a cylindrical member having an inner peripheral surface with the rotational axis as a center and includes an engaging portion at the inner peripheral surface, wherein either one of the engaging portion and the portion-to-be-engaged is a projected portion, and the other one of the engaging portion and the portion-to-be-engaged is a recessed portion, and wherein the engaging portion and the portion-to-be-engaged are engaged with each other.

(Constitution 29)

A toner container according to Constitution 28, wherein the portion-to-be-engaged includes a first portion-to-be-engaged and a second portion-to-be-engaged, wherein the cap is provided with a portion-to-be-urged thereof, for being urged from an outside, at an outer peripheral surface thereof with the rotational axis as a center, and wherein in a case that the cap is viewed in a direction of the rotational axis, the engaging portion of the cap includes a first engaging portion and a second engaging portion which are on sides opposite from each other with respect to the rotational axis in a direction perpendicular to the rotational axis and which engage with the first portion-to-be-engaged and the second portion-to-be-engaged, respectively, the portion-to-be-engaged of the cap includes a first portion-to-be-urged and a second portion-to-be-urged on sides opposite from each other with respect to the rotational axis in a direction perpendicular to the rotational axis, and each of the first portion-to-be-urged and the second portion-to-be-urged is provided between the first engaging portion and the second engaging portion in a circumferential direction about the rotational axis.

(Constitution 30)

A toner container according to Constitution 29, wherein in a case that the first portion-to-be-urged and the second portion-to-be-urged are urged toward an inside with respect to a radial direction about the rotational axis, the first engaging portion is configured so that engagement between the first engaging portion and the first portion-to-be-engaged is released by separation of the first engaging portion from the first portion-to-be-engaged, and the second engaging portion is configured so that engagement between the second engaging portion and the second portion-to-be-engaged is released by separation of the second engaging portion from the second portion-to-be-engaged.

(Constitution 31)

A toner container according to Constitution 29 or 30, wherein the portion-to-be-urged is provided in a projected shape at the outer peripheral surface of the cap.

(Constitution 32)

A toner container according to Constitution 29 or 30, wherein the portion-to-be-urged is provided in a recessed shape at the outer peripheral surface of the cap.

(Constitution 33)

A toner container according to Constitution 29 or 30, wherein the portion-to-be-urged is a seal stuck to the outer peripheral surface of the cap.

(Constitution 34)

A toner container according to Constitution 23, wherein the shutter is configured so as to rotate about a rotational axis thereof, extending in the first direction, between the open position and the closed position, and includes a portion-to-be-engaged projecting from the outer peripheral surface with the rotational axis as a center, wherein the cap is cylindrical member having an inner peripheral surface with the rotational axis as a center, and includes an engaging portion engaging with the portion-to-be-engaged at an end portion thereof on a toner accommodating portion side with respect to a direction of the rotational axis, wherein the engaging portion includes a first engaging arm extending toward the toner accommodating portion in the direction of the rotational axis and a second engaging arm which extends toward the toner accommodating portion in the direction of the rotational axis and which is provided in a position different from a position of the first engaging arm with respect to a circumferential direction about the rotational axis, and wherein the portion-to-be-engaged is sandwiched between the first engaging arm and the second engaging arm in the circumferential direction.

(Constitution 35)

A toner container according to Constitution 34, wherein in a case that the cap is linearly moved relative to the shutter in a direction which is the direction of the rotational axis and in which the cap is separated from the toner accommodating portion, the first engaging arm and the second engaging arm are configured so that engagement thereof with the portion-to-be-engaged is released by being elastically deformed in directions in which the first engaging arm and the second engaging arm are separated from each other with respect to the circumferential direction by a force received from the portion-to-be-engaged of the shutter.

(Constitution 36)

A toner container according to Constitution 23, wherein the cap is configured so that the engagement of the cap with the shutter is released by being linearly moved in the second direction relative to the shutter.

(Constitution 37)

A toner container according to Constitution 36, wherein the shutter is configured so as to rotate about a rotational axis, extending in the first direction, between the open position and the closed position, wherein the cap is a cylindrical member with the rotational axis as a center and includes a side wall which is a side wall with the rotational axis as a center and which extends in a direction of the rotational axis, wherein the side wall is provided with a slit which penetrates from an inside to an outside of the side wall in a radial direction about the rotational axis and which extends from an opening portion toward a bottom surface of the cap in the direction of the rotational axis, and wherein in a case that the cap is moved relative to the shutter in a direction crossing the rotational axis, the cap is configured to be dismounted from the shutter by the side wall being elastically deformed by a force received from the shutter and by widening a width of the slit.

(Constitution 38)

A toner container comprising:

a toner accommodating portion configured to accommodate toner;

a nozzle communicating with the toner accommodating portion and aligned with the toner accommodating portion in a first direction, the nozzle being provided with an opening forming a part of a discharging passage for permitting discharge of the toner to an outside of the toner container;

a shutter configured to move between an open position where the shutter opens the opening and a closed position where the shutter closes the opening; and a cap detachably mounted to the shutter so as to cover at least a part of the shutter, wherein the cap is configured so that by rotation of the cap relative to the shutter about a rotational axis extending in the first direction, the cap engages with the shutter and disengages with the shutter.

(Constitution 39)

A toner container according to Constitution 38, wherein a rotational direction of the cap for releasing the engagement of the cap with the shutter is the same as a rotational direction of the shutter when the shutter is moved from the open position to the closed position.

(Constitution 40)

A toner container according to Constitution 38 or 39, wherein the nozzle includes a restricting portion for restricting rotation of the shutter, positioned in the closed position, in a direction from the open position toward the closed position.

INDUSTRIAL APPLICABILITY

According to the present invention, there is provided a container for use with an image forming apparatus and for accommodating a content of powder and a liquid.

The present invention is not restricted to the foregoing embodiments, but can be variously changed and modified without departing from the spirit and the scope of the present invention. Accordingly, the following claims are attached hereto to make public scope of the present invention.

This application claims the Conventional Priority based on Japanese Patent Application 2021-158542 filed Sep. 28, 2021, all disclosure of which is incorporated by reference herein.

The invention claimed is:

1. A container for use with an image forming apparatus and for accommodating a content of powder or a liquid, the container comprising:

an accommodating portion configured to accommodate the content;

an end portion including a discharging portion that includes a discharge opening for permitting discharge of the content to outside of the container and a passage configured so that the content passes through the passage toward the discharge opening, and the end portion including a shutter configured to be rotatable about a rotational axis relative to the discharging portion between a shielding position where the shutter shields the discharge opening and an open position where the shutter opens the discharge opening, the shutter being rotatable from the shielding position to the open position in a first rotational direction and from the open position to the shielding position in a second rotational direction; and a cap mounted to the shutter so as to cover at least a part of the end portion and configured to be dismounted from the end portion by being rotated about the rotational axis relative to the shutter in the second rotational direction.

2. A container according to claim 1, wherein the discharging portion has an outer surface extending along the rotational axis and provided with the discharge opening.

3. A container according to claim 2, wherein, in a case that the container is oriented such that the rotational axis is parallel to a gravity direction and such that the discharging portion is below the accommodating portion:

the shutter has a shutter end surface that is a lower end surface in the gravity direction, the discharging portion includes a first projecting portion projecting more downward than the shutter end surface, and the cap includes an opposing surface opposing the shutter end surface and the first projecting portion, and the cap includes a second projecting portion which is disposed so as not to overlap with the first projecting portion as viewed in the gravity direction and which extends upward from the opposing surface toward the shutter end surface.

4. A container according to claim 3, wherein a distance between an end of the second projecting portion of the cap and the shutter end surface is shorter than a distance between an end of the first projecting portion of the discharging portion and the opposing surface of the cap.

5. A container according to claim 3, wherein the second projecting portion is provided outside the first projecting portion of the discharging portion with respect to a radial direction of a virtual circle about the rotational axis and the second projection portion is provided so as to surround the first projecting portion.

6. A container according to claim 3, wherein the container is configured to be capable of self-standing with a surface thereof, as a bottom surface, on a side opposite from the opposing surface of the cap.

7. A container according to claim 1, wherein the cap has a surface configured to become a bottom surface for self-standing the container.

8. A container according to claim 1, wherein the discharging portion includes a first restricting portion for restricting rotation of the shutter, positioned in the shielding position, in the second rotational direction.

9. A container according to claim 8, wherein the restricting portion is a first restricting portion and the discharging portion includes a second restricting portion movable to a restricting position where the second restricting portion restricts rotation of the shutter, positioned in the shielding position, in the first rotational direction and to a non-restricting position where the second restricting portion does not restrict the rotation of the shutter.

10. A container according to claim 9, wherein the end portion of the container is detachably mountable to a mounting portion of the image forming apparatus in a state in which the cap is dismounted, and wherein the second restricting portion is moved from the restricting position to the non-restricting position by being urged by the mounting portion when the container is mounted to the mounting portion of the image forming apparatus.

11. A container according to claim 8, wherein the outer surface of the discharging portion is a first outer surface, wherein the shutter includes a second outer surface extending along the rotational axis and a second screw portion provided at the second outer surface, wherein the cap includes an inner surface extending along the rotational axis and which surrounds at least a part of the second outer surface with respect to a circumferential direction of a virtual circle about the rotational axis, and a first screw portion is provided at the inner surface, and wherein the cap is mounted to the shutter by engagement of the first screw portion with the second screw portion.

12. A container according to claim 11, wherein the first screw portion includes a first portion and a second portion that are adjacent to each other and disposed with a gap with respect to the circumferential direction, and wherein, as viewed in a direction of the rotational axis, with respect to the circumferential direction, a length of the gap is longer than a length of the first portion and a length of the second portion.

13. A container according to claim 12, wherein the first portion and the second portion are formed in an arcuate shape as viewed in the direction of the rotational axis, and wherein a circumferential angle of each of the first portion and the second portion is 90 degrees or less.

14. A container according to claim 11, wherein the first screw portion is formed in a projection shape from the inner surface, wherein the second screw portion is a groove portion formed in a recessed groove shape at the second outer surface, and wherein at least a part of the second screw portion is configured to become narrow in width of a groove toward the first direction.

15. A container according to claim 1, wherein the accommodating portion has a bag shape of which one end portion is open, and wherein the one end portion of the accommodating portion is connected to the discharging portion.

16. A container according to claim 15, wherein the accommodating portion is constituted by polypropylene and has flexibility.

17. A toner container comprising:

a toner accommodating portion configured to accommodate toner;

a nozzle communicating with the toner accommodating portion and aligned with the toner accommodating portion in a first direction, the nozzle being provided with an opening forming a part of a discharging passage for permitting discharge of the toner to outside of the toner container;

a shutter configured to move between an open position where the shutter opens the opening and a closed position where the shutter closes the opening; and a cap mounted to the shutter so as to cover at least a part of the shutter, the cap being configured to engage with the shutter and to disengage with the shutter, wherein the opening of the nozzle is provided at a side surface extending along the first direction of the nozzle, wherein, in a second direction perpendicular to the first direction, the shutter is provided outside the side surface of the nozzle, and wherein a movement direction of the cap for releasing the engagement of the cap with the shutter is the same as a movement direction of the shutter when the shutter is moved from the open position to the closed position.

18. A toner container according to claim 17, wherein the nozzle includes a restricting portion for restricting movement of the shutter, positioned in the closed position, in a direction from the open position toward the closed position.

19. A toner container according to claim 17, wherein the cap is configured so that the engagement of the cap with the shutter is released by the cap being rotated about a rotational axis, extending in the first direction, relative to the shutter.

20. A toner container according to claim 17, wherein the cap is configured so that the engagement of the cap with the shutter is released by the cap being linearly moved relative to the shutter in a direction which is the first direction and in which the cap is separated from the toner accommodating portion.

21. A toner container according to claim 17, wherein the shutter is configured so as to rotate about a rotational axis extending in the first direction between the open position and the closed position, and the shutter includes an outer peripheral surface with the rotational axis as a center and a portion-to-be-engaged provided at the outer peripheral surface, wherein the cap is a cylindrical member having an inner peripheral surface with the rotational axis as a center and includes an engaging portion at the inner peripheral surface, wherein either one of the engaging portion and the portion-to-be-engaged is a projected portion, and the other one of the engaging portion and the portion-to-be-engaged is a recessed portion, and wherein the engaging portion and the portion-to-be-engaged are engaged with each other.

22. A toner container according to claim 21, wherein the portion-to-be-engaged includes a first portion-to-be-engaged and a second portion-to-be-engaged, wherein the cap is provided with a portion-to-be-engaged for being urged from outside at an outer peripheral surface thereof with the rotational axis as a center, and wherein, in a case that the cap is viewed in a direction of the rotational axis, (i) the engaging portion of the cap includes a first engaging portion and a second engaging portion which are on sides opposite from each other with respect to the rotational axis in a direction perpendicular to the rotational axis and which engage with the first portion-to-be-engaged and the second portion-to-be-engaged, respectively, (ii) the portion-to-be-engaged of the cap includes a first portion-to-be-urged and a second portion-to-be-urged on sides opposite from each other with respect to the rotational axis in a direction perpendicular to the rotational axis, and (iii) each of the first portion-to-be-urged and the second portion-to-be-urged is provided between the first engaging portion and the second engaging portion in a circumferential direction about the rotational axis.

23. A toner container according to claim 22, wherein in a case that the first portion-to-be-engaged and the second portion-to-be-engaged are urged toward an inside with respect to a radial direction about the rotational axis, the first engaging portion is configured so that engagement between the first engaging portion and the first portion-to-be-engaged is released by separation of the first engaging portion from the first portion-to-be-engaged, and the second engaging portion is configured so that engagement between the second engaging portion and the second portion-to-be-engaged is released by separation of the second engaging portion from the second portion-to-be-engaged.

24. A toner container according to claim 22, wherein the portion-to-be-urged is provided in a projected shape at the outer peripheral surface of the cap.

25. A toner container according to claim 22, wherein the portion-to-be-urged is provided in a recessed shape at the outer peripheral surface of the cap.

26. A toner container according to claim 22, wherein the portion-to-be-urged is a seal stuck to the outer peripheral surface of the cap.

27. A toner container according to claim 17, wherein the shutter is configured so as to rotate about a rotational axis thereof, extending in the first direction, between the open position and the closed position, and the shutter includes a portion-to-be-engaged projecting from the outer peripheral surface with the rotational axis as a center, wherein the cap is cylindrical member having an inner peripheral surface with the rotational axis as a center, and the cap includes an engaging portion engaging with the portion-to-be-engaged at an end portion thereof on a toner accommodating portion side with respect to a direction of the rotational axis, wherein the engaging portion includes a first engaging arm extending toward the toner accommodating portion in the direction of the rotational axis and a second engaging arm which extends toward the toner accommodating portion in the direction of the rotational axis and which is provided in a position different from a position of the first engaging arm with respect to a circumferential direction about the rotational axis, and wherein the portion-to-be-engaged is sandwiched between the first engaging arm and the second engaging arm in the circumferential direction.

28. A toner container according to claim 27, wherein, in a case that the cap is linearly moved relative to the shutter in a direction which is the direction of the rotational axis and in which the cap is separated from the toner accommodating portion, the first engaging arm and the second engaging arm are configured so that engagement thereof with the portion-to-be-engaged is released by being elastically deformed in directions in which the first engaging arm and the second engaging arm are separated from each other with respect to the circumferential direction by a force received from the portion-to-be-engaged of the shutter.

29. A toner container according to claim 17, wherein the cap is configured so that the engagement of the cap with the shutter is released by being linearly moved in the second direction relative to the shutter.

30. A toner container according to claim 29, wherein the shutter is configured so as to rotate about a rotational axis, extending in the first direction, between the open position and the closed position, wherein the cap is a cylindrical member with the rotational axis as a center and includes a side wall with the rotational axis as a center and which extends in a direction of the rotational axis, wherein the side wall is provided with a slit which penetrates from an inside to an outside of the side wall in a radial direction about the rotational axis and which extends from an opening portion toward a bottom surface of the cap in the direction of the rotational axis, and wherein, in a case that the cap is moved relative to the shutter in a direction crossing the rotational axis, the cap is configured to be dismounted from the shutter by the side wall being elastically deformed by a force received from the shutter and by widening a width of the slit.

31. A toner container comprising:

a toner accommodating portion configured to accommodate toner;

a nozzle communicating with the toner accommodating portion and aligned with the toner accommodating portion in a first direction, the nozzle being provided with an opening forming a part of a discharging passage for permitting discharge of the toner to outside of the toner container;

a shutter configured to move between an open position where the shutter opens the opening and a closed position where the shutter closes the opening; and a cap detachably mounted to the shutter so as to cover at least a part of the shutter, wherein the cap is configured so that by rotation of the cap relative to the shutter about a rotational axis extending in the first direction, the cap engages with the shutter and disengages with the shutter, and wherein the nozzle includes a restricting portion for restricting rotation of the shutter, positioned in the closed position, in a direction from the open position toward the closed position.

32. A toner container according to claim 31, wherein a rotational direction of the cap for releasing the engagement of the cap with the shutter is the same as a rotational direction of the shutter when the shutter is moved from the open position to the closed position.

* * * * *